US012545040B2

(12) United States Patent
Christensen et al.

(10) Patent No.: US 12,545,040 B2
(45) Date of Patent: Feb. 10, 2026

(54) CRAFTING APPARATUS

(71) Applicant: Cricut, Inc., South Jordan, UT (US)

(72) Inventors: John Barrus Christensen, Bluffdale, UT (US); Bryan Fred Bihlmaier, Provo, UT (US); Donald Christopher Sutton, South Jordan, UT (US); John Douglas Dalton, South Jordan, UT (US); Ryun Bates Noble, Salt Lake City, UT (US); Kyle Kenneth Johnson, Eagle Mountain, UT (US); Grayson Stopp, San Francisco, CA (US); Bayden Filleul, Taumarunui (NZ); Kurt Stalsberg, Salt Lake City, UT (US); James Lynch, Dublin (IE); Norman Stevenson, Dublin (IE)

(73) Assignee: Cricut, Inc., South Jordan, UT (US)

( * ) Notice: Subject to any disclaimer, the term of this patent is extended or adjusted under 35 U.S.C. 154(b) by 0 days.

(21) Appl. No.: 18/260,152

(22) PCT Filed: Jan. 27, 2022

(86) PCT No.: PCT/US2022/014014
§ 371 (c)(1),
(2) Date: Jun. 30, 2023

(87) PCT Pub. No.: WO2022/164974
PCT Pub. Date: Aug. 4, 2022

(65) Prior Publication Data

US 2024/0075760 A1 Mar. 7, 2024

Related U.S. Application Data

(60) Provisional application No. 63/142,488, filed on Jan. 27, 2021.

(51) Int. Cl.
*B41J 29/02* (2006.01)
*B41J 11/70* (2006.01)
(Continued)

(52) U.S. Cl.
CPC ............... *B41J 29/02* (2013.01); *B41J 11/70* (2013.01); *B41J 13/106* (2013.01); *B41J 29/06* (2013.01)

(58) Field of Classification Search
CPC ... B41J 29/02; B41J 29/06; B41J 11/70; B41J 13/106; F16P 5/00
(Continued)

(56) References Cited

U.S. PATENT DOCUMENTS

| | | | | |
|---|---|---|---|---|
| 456,234 A * | 7/1891 | Fairfield | .................. | B65H 1/04 271/22 |
| 2,140,092 A * | 12/1938 | Prezioso | ................ | F16H 15/52 400/693 |

(Continued)

FOREIGN PATENT DOCUMENTS

| | | |
|---|---|---|
| CN | 1378915 A | 11/2002 |
| CN | 108093627 A | 5/2018 |

(Continued)

OTHER PUBLICATIONS

International Search Report and Written Opinion relating to application No. PCT/US2022/014014, dated May 3, 2022.

(Continued)

*Primary Examiner* — Adam J Eiseman
*Assistant Examiner* — Fred C Hammers
(74) *Attorney, Agent, or Firm* — Honigman LLP; Grant Griffith

(57) ABSTRACT

A crafting apparatus (10) includes a working portion (22) and a base portion (20). The working portion (22) includes a lower surface (32) and an upper surface (34). The upper
(Continued)

surface (34) defines a working three dimensional Cartesian coordinate system (X-Y-Z). The base portion (20) includes a lower surface (24) and an upper surface (26). The lower surface (32) of the working portion (22) is disposed adjacent to the upper surface (26) of the base portion (20). The lower surface (24) defines a non-working three dimensional Cartesian coordinate system ($X_S$-$Y_S$-$Z_S$). The upper surface (34) of the working portion (22) extends relative to the lower surface (24) of the base portion (20) at an angle ($\theta_{22}$) for angularly-offsetting the working three dimensional Cartesian coordinate system (X-Y-Z) from the non-working three dimensional Cartesian coordinate system ($X_S$-$Y_S$-$Z_S$). Methods (200, 300) are also disclosed.

7 Claims, 38 Drawing Sheets

(51) Int. Cl.
*B41J 13/10* (2006.01)
*B41J 29/06* (2006.01)

(58) Field of Classification Search
USPC .................................... 83/859; 400/642, 691
See application file for complete search history.

(56) References Cited

U.S. PATENT DOCUMENTS

| | | | | |
|---|---|---|---|---|
| 3,900,098 A * | 8/1975 | Effinger | B41J 11/04 | D18/49 |
| 4,386,864 A * | 6/1983 | Wang | B41J 13/106 | 400/208 |
| 4,544,065 A * | 10/1985 | Mueller | B41J 29/06 | 312/196 |
| 4,586,839 A * | 5/1986 | Iwagami | B41J 13/106 | 400/621 |
| 2016/0185039 A1 | 6/2016 | Carbone et al. | | |
| 2020/0247150 A1 | 8/2020 | Hoffman et al. | | |
| 2020/0282443 A1* | 9/2020 | Kürten | B21D 28/02 | |
| 2023/0001599 A1* | 1/2023 | Crystal | B26D 7/20 | |

FOREIGN PATENT DOCUMENTS

| | | | |
|---|---|---|---|
| CN | 111506015 | A | 8/2020 |
| EP | 0805043 | A2 | 11/1997 |
| EP | 1205416 | A2 | 5/2002 |
| EP | 3760445 | A1 | 1/2021 |
| JP | U1982-176593 | | 6/1984 |
| JP | 1987167150 | | 7/1987 |
| JP | 1993-066800 | | 6/1995 |
| JP | H09030194 | | 2/1997 |
| JP | 2014-108883 | A | 6/2014 |
| JP | H10247789 | | 7/2020 |
| KR | 10-2007-0023190 | A | 2/2007 |
| KR | 10-0860571 | | 9/2008 |
| KR | 10-2011-0111129 | A | 10/2011 |
| KR | 1020110111129 | | 10/2011 |
| KR | 101525501 | B1 | 6/2015 |

OTHER PUBLICATIONS

JPO. Office Action relating to applicaiton No. JP 2023-542533, dated Oct. 21, 2024.

National Institute of Industrial Property (INPI). Preliminary Office Action relating to applicaiton No. BR112023015068-0, dated Apr. 24, 2025.

* cited by examiner

300

CRAFTING APPARATUS

CROSS-REFERENCE TO RELATED APPLICATIONS

This application claims priority under 35 U.S.C. § 119(e) to U.S. Patent Application No. 63/142,488 filed Jan. 27, 2021, the disclosure of which is considered part of the disclosure of this application and is hereby incorporated by reference in its entirety.

TECHNICAL FIELD

The present disclosure relates generally to electronic cutting systems and methods of use. In particular, the present disclosure relates to a crafting apparatus and methods for operating the same.

BACKGROUND

This section provides background information related to the present disclosure and is not necessarily prior art.

While conventional crafting devices have proven to be acceptable for various applications, such devices are nevertheless susceptible to improvements that may enhance their overall performance and cost. Therefore, a need exists to develop improved crafting devices that advance the art.

SUMMARY

One aspect of the disclosure provides a crafting apparatus. The crafting apparatus includes a: working portion; and a base portion. The working portion includes a lower surface and an upper surface. The upper surface defines a working three dimensional Cartesian coordinate system. The base portion includes a lower surface and an upper surface. The lower surface defines a non-working three dimensional Cartesian coordinate system. The lower surface of the working portion is disposed adjacent to the upper surface of the base portion. The upper surface of the working portion extends relative to the lower surface of the base portion at an angle for angularly-offsetting the working three dimensional Cartesian coordinate system from the non-working three dimensional Cartesian coordinate system.

Implementations of the disclosure may include one or more of the following optional features. In some implementations, the working portion includes: a rail; a carriage, and one or both of a printing device and a cutting device. The carriage is movably-disposed upon the rail in a X-direction of the working three dimensional Cartesian coordinate system. One or both of the printing device and the cutting device are removably-secured to the carriage for conducting work on a workpiece in a Z-direction of the working three dimensional Cartesian coordinate system.

In some examples, the crafting apparatus also includes a pair of pinch-roller mechanisms and an intermediate drive roller. The intermediate drive roller imparts movement to a workpiece in a Y-direction of the working three dimensional Cartesian coordinate system.

In some implementations, the angle that angularly-offsets the working three dimensional Cartesian coordinate system from the non-working three dimensional Cartesian coordinate system is between 0° and 90°. In other implementations, the angle that angularly-offsets the working three dimensional Cartesian coordinate system from the non-working three dimensional Cartesian coordinate system is approximately 45°.

In other examples, the crafting apparatus includes one or more workpiece support arms. The one or more workpiece support arms are connected to the working portion. The one or more workpiece support arms are configured for arrangement in one of a stowed orientation and a deployed orientation relative the working portion. In yet other examples, the crafting apparatus includes a safety breakaway coupling. The safety breakaway coupling permits selective disconnection of the one or more workpiece support arms from the working portion.

Another aspect of the disclosure provides a method for utilizing a crafting apparatus for conducting work upon a workpiece. The crafting apparatus including a working surface of a working portion defined by a working three dimensional Cartesian coordinate system that is angularly offset at an angle from a lower surface of a base portion defined by a non-working three dimensional Cartesian coordinate system. The method includes: arranging an actuator of the crafting apparatus in a first orientation; configuring one or more workpiece management components of the crafting apparatus in a first arrangement. The one or more workpiece management components is/are connected to the actuator. The method further includes arranging the workpiece upon the angularly offset working surface and at least proximate the one or more workpiece management components; transitioning the actuator from the first orientation to a second orientation for configuring the one or more workpiece management components in a second arrangement for securing the workpiece against gravity to the angularly offset working surface while also moveably-securing the workpiece in a first direction of the working three dimensional Cartesian coordinate system relative to the working surface; and actuating one or more working components of the crafting apparatus for conducting work upon the workpiece.

This aspect may include one or more of the following optional features. In some examples, configuring the one or more workpiece management components of the crafting apparatus includes urging one or more workpiece stoppers in a deployed orientation. In other examples, configuring the one or more workpiece management components of the crafting apparatus includes arranging components of a cam actuator connected to a pinch roller arm in a first orientation for arranging a passive roller of the pinch roller arm away from an active drive roller. In yet other examples, configuring the one or more workpiece management components of the crafting apparatus includes configuring a vacuum source in a deactivated state. In yet another example, configuring the one or more workpiece management components of the crafting apparatus includes arranging one or more workpiece guides in a deployed orientation.

In some examples, arranging the workpiece upon the angularly offset working surface and at least proximate the one or more workpiece management components includes: reeling a portion of the workpiece from a roll of workpiece material; and arranging a leading edge of the portion of the workpiece reeled from the roll of workpiece material upon the angularly offset working surface and at least proximate the one or more workpiece management components.

In some implementations, transitioning the actuator from the first orientation to the second orientation for configuring the one or more workpiece management components in the second arrangement for securing the workpiece against gravity to the angularly offset working surface while also moveably-securing the workpiece in the first direction of the working three dimensional Cartesian coordinate system relative to the working surface includes: urging one or more workpiece stoppers in a retracted orientation; arranging components of a cam actuator connected to a pinch roller arm in a second orientation for arranging a passive roller of the pinch roller arm toward an active drive roller for applying a pinching force to the workpiece; and configuring a vacuum source in an activated state for drawing air into one or more workpiece suction channels for creating a pressure differential for urging a bottom surface of the workpiece to the angularly offset working surface.

In other examples, upon determining that work conducted on the workpiece is complete, the method further includes: transitioning the actuator from the second orientation back to the first orientation for configuring the one or more workpiece management components from the second arrangement back to the first arrangement; and releasing the workpiece from the working surface. Furthermore, configuring the one or more workpiece management components from the second arrangement back to the first arrangement includes arranging components of the cam actuator connected to the pinch roller arm back to a first orientation for arranging the passive roller of the pinch roller arm away from the active drive roller for removing the pinching force (from the workpiece; configuring the vacuum source in a deactivated state for ceasing the pressure differential for no longer urging the bottom surface of the workpiece to the angularly offset working surface; and separating the workpiece that was reeled from the roll of workpiece material.

In other implementations, arranging the workpiece upon the angularly offset working surface and at least proximate the one or more workpiece management components includes: obtaining the workpiece that is defined by a preconfigured shape that is not derived from a roll of workpiece material; arranging a leading edge of the workpiece having the preconfigured shape that is not derived from a roll of workpiece material upon the angularly offset working surface and at least proximate the one or more workpiece management components; and arranging one or more support arms of the crafting apparatus in a deployed orientation, whereby the one or more support arms are aligned with the angularly offset working surface for supporting the workpiece.

In yet other examples, transitioning the actuator from the first orientation to the second orientation for configuring the one or more workpiece management components in the second arrangement for securing the workpiece against gravity to the angularly offset working surface while also moveably-securing the workpiece in the first direction of the working three dimensional Cartesian coordinate system relative to the working surface includes: urging one or more workpiece stoppers in a retracted orientation; arranging components of a cam actuator connected to a pinch roller arm in a second orientation for arranging a passive roller of the pinch roller arm toward an active drive roller for applying a pinching force to the workpiece; and configuring a vacuum source in an activated state for drawing air into one or more workpiece suction channels for creating a pressure differential for urging a bottom surface of the workpiece to the angularly offset working surface.

In yet other implementations, upon determining that work conducted on the workpiece is complete, the method further includes: transitioning the actuator from the second orientation back to the first orientation for configuring the one or more workpiece management components from the second arrangement back to the first arrangement; and releasing the workpiece from the working surface.

In other examples, configuring the one or more workpiece management components from the second arrangement back to the first arrangement includes: arranging components of the cam actuator connected to the pinch roller arm back to a first orientation for arranging the passive roller of the pinch roller arm away from the active drive roller for removing the pinching force from the workpiece; configuring the vacuum source in a deactivated state for ceasing the pressure differential for no longer urging the bottom surface of the workpiece to the angularly offset working surface; and separating the workpiece that was reeled from the roll of workpiece material.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Embodiments of the present disclosure relate generally to a crafting apparatus 10 and methods for utilizing the same. In particular, the present disclosure relates to a crafting apparatus 10 including an angled (see, e.g., angle $\theta_{22}$ at FIGS. 1, 3-4, and 17) working surface (see, e.g., working surface 34 at, for example, FIG. 1) and workpiece management components that are utilized prior to and/or during the act of conducting "work" upon a workpiece W. Because the angled $\theta_{22}$ working surface 34 is not parallel to an underlying ground surface or floor F (see, e.g., FIG. 1) and/or an upper surface $S_U$ (see, e.g., FIGS. 1, 3, and 17) of a support member S (e.g., a table) that supports the crafting apparatus 10, the workpiece management components prevent the workpiece W from sliding off of the angled $\theta_{22}$ working surface 34 as a result of a gravitational pull (see, e.g., arrow G at FIGS. 1, 3, 7-8, and 17) on the workpiece W that would otherwise cause the angled $\theta_{22}$ working surface 34 to undesirably function as a workpiece slide. Additionally, the present disclosure relates to a crafting apparatus 10 having a "door-less" and/or a "large-form" configuration, as described in greater detail below.

Figure 24:
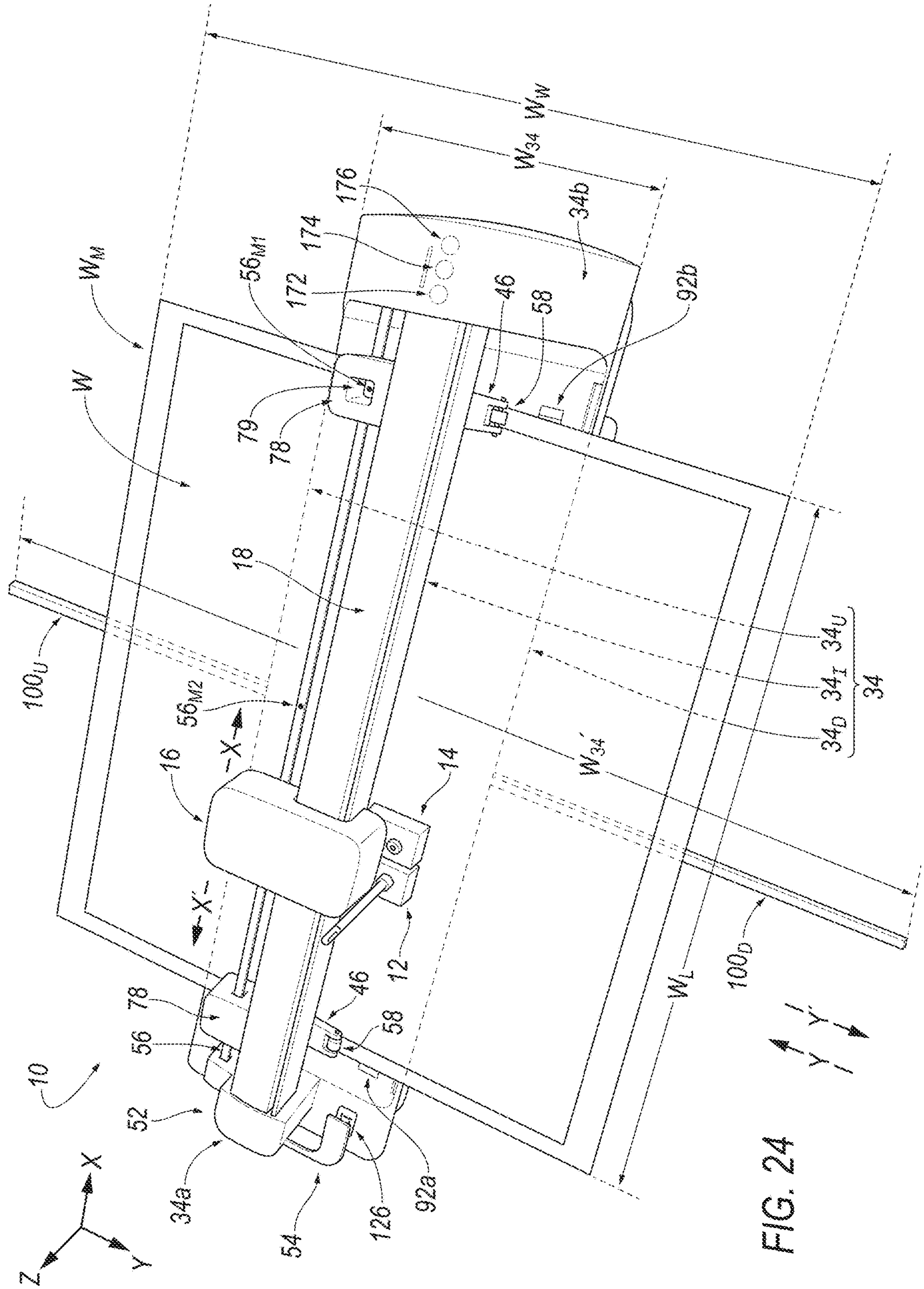
FIG. 24 is a top right perspective view of the crafting apparatus of FIG. 23 and a preconfigured workpiece (that is not derived from the roll of workpiece material arranged upon the roll holder of FIG. 5) arranged upon a workpiece support mat that is supported by: the working surface; and the workpiece support arms arranged in the deployed orientation of FIGS. 17 and 23.

Furthermore, the crafting apparatus 10 may be selectively reconfigured in order to conduct work on a workpiece W that is derived from at least two different types of workpiece sources (see, e.g., a first type of workpiece source $W_R$ at FIGS. 3, 5, and 13B-13C and a second type of workpiece source $W+W_M$ seen at FIG. 24). In a first example, with reference to FIGS. 3, 5, and 13B-13C, the first type of workpiece source $W_R$ may be a roll of workpiece material whereby a portion of a length of workpiece material W reeled from the roll of workpiece material $W_R$ may be interfaced with the crafting apparatus 10 while a remainder of the roll of workpiece material defined by the roll of workpiece material $W_R$ is not interfaced with the working surface 34 of the crafting apparatus 10. In another example, with reference to FIG. 24, the second type of workpiece source $W+W_M$ may not be derived from a roll, but, rather, from a relatively "large" workpiece W having substantially flat, preconfigured shape (having, e.g., a length $W_L$ and a width $W_W$) that may or may not be supported by a support mat $W_M$).

Yet even further, because the crafting apparatus 10 is designed to be "door-less", a plurality of components of the crafting apparatus 10 that conduct "work" upon the workpiece W are always exposed to the surrounding environment. Accordingly, the crafting apparatus 10 includes an aesthetically-pleasing design whereby structure (e.g., one or both of a front door and a rear door) are not included in the design of the crafting apparatus 10, and, as a result, does not cover or obfuscate the plurality of components of the crafting apparatus 10 that conduct "work" upon the workpiece W even when the crafting apparatus 10 is not conducting "work" upon the workpiece W.

Referring to FIGS. 1-13C and 15-24, an exemplary crafting apparatus is shown generally at 10. A method for utilizing the crafting apparatus 10 when the crafting apparatus 10 is selectively configured for conducting "work" upon a first type of workpiece source (e.g., a roll of workpiece material $W_R$) is shown generally at 200 in FIGS. 14A-14D. Another method for utilizing the crafting apparatus 10 when the crafting apparatus 10 is selectively configured for conducting "work" upon a second type of workpiece source (e.g., a relatively "large" workpiece W having substantially flat, preconfigured shape $W_L$, $W_W$ that may or may not be supported by a support mat $W_M$) is shown generally at 300 in FIGS. 25A-25E.

Figure 1:
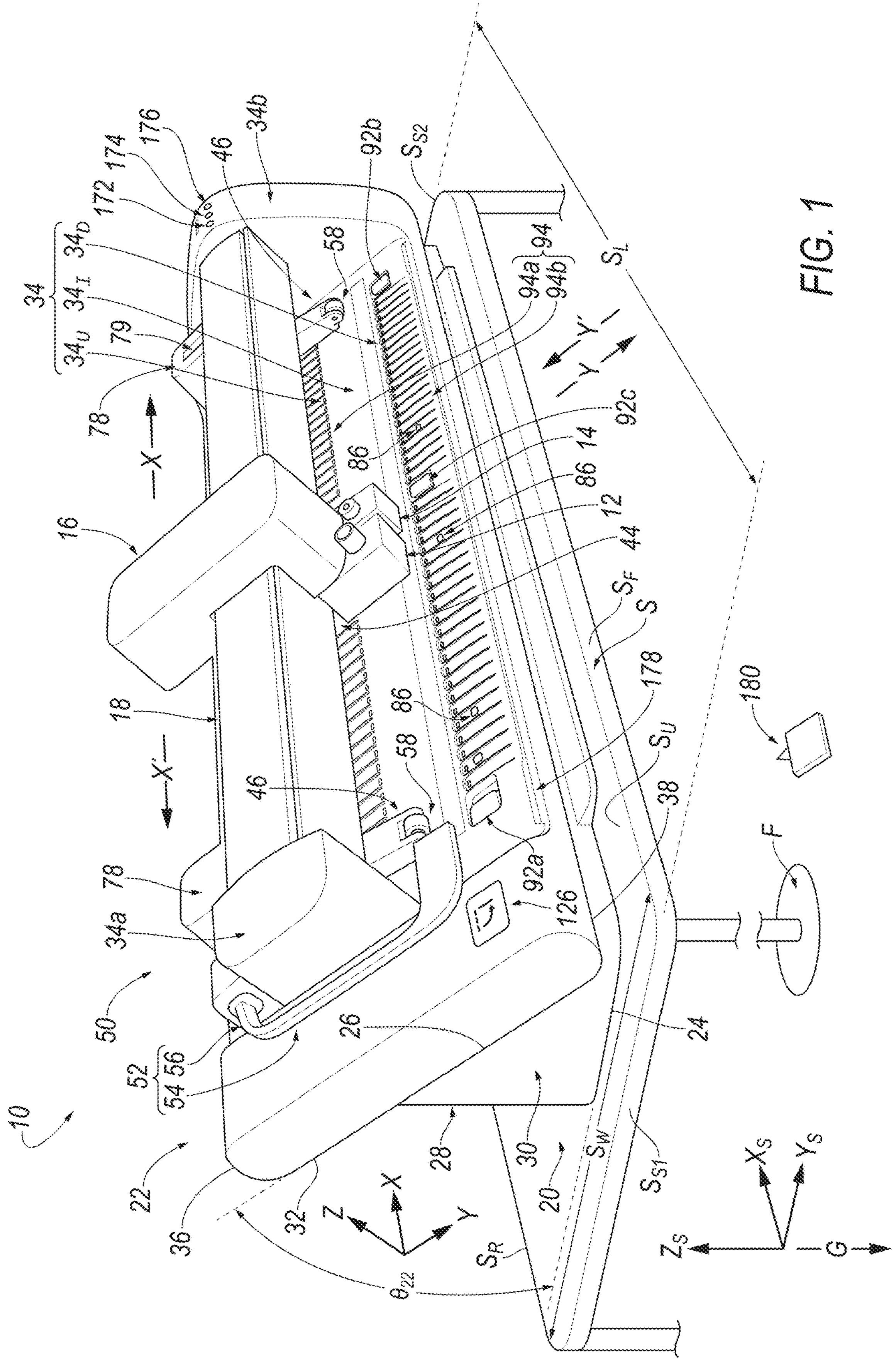
FIG. 1 is a left front perspective view of a crafting apparatus including a pinch roller actuator lever arranged in a down or engaged orientation.

With reference to FIG. 1, the crafting apparatus 10 includes a plurality of components such as, for example: a printing device 12; a cutting device 14; a carriage 16; and a rail 18. The plurality of components of the crafting apparatus 10 cooperate for conducting "work" upon a workpiece W.

The term "work" may include, but is not limited to, any number of tasks/functions performed by one or a combination of the printing device 12 and the cutting device 14 that are secured to the carriage 16. As seen at FIG. 1, the carriage 16 is movably-disposed according to the direction of arrows X, X' (in, e.g., a "working" three dimensional X-Y-Z Cartesian coordinate system) upon the rail 18. The movement X, X' of the carriage 16 along the rail 18 may be controlled by a motor (see, e.g., motor 158 at FIG. 26) that may receive, for example, actuation signals from a central processing unit (CPU) (see, e.g., 3000 in FIG. 30); the motor 158 may drive one or more cables and belts (see, e.g., carriage movement belt 156 at FIG. 26) for causing movement X, X' of the carriage 16 relative the rail 18.

In some configurations, the CPU 3000 is a component of the crafting apparatus 10. In other configurations, the CPU 3000 is associated with a laptop computer (see, e.g., laptop computer 3000*a* in FIG. 30) that is communicatively-coupled to the crafting apparatus 10. In yet other configurations, the CPU 3000 is associated with a smart phone, tablet computer, or the like (see, e.g., smart phone or tablet computer 3000*b* in FIG. 30) that is communicatively-coupled to the crafting apparatus 10.

With reference to FIG. 1, in an example, the "work" may include a "cutting operation" that functionally includes contact of a blade of the cutting device 14 with the workpiece W as the workpiece W is moved in the Y, Y' feed directions by one or more components (see, e.g., active drive rollers 60/84 at FIGS. 7-8 and 10) of the crafting apparatus 10. The "work" conducted by the cutting device 14 arises from one or a combination of: (1) movement of the cutting device 14 according to the direction of arrows Z, Z' (see, e.g., FIGS. 3 and 17) in, e.g., the "working" three dimensional X-Y-Z Cartesian coordinate system relative to, for example, one or more of the carriage 16 and the rail 18; and (2) movement of the workpiece W in forward or backward feed directions according to the direction or arrows Y, Y' in the "working" three dimensional X-Y-Z Cartesian coordinate system relative to, for example, one or more of the carriage 12 and the rail 18. The movement Z, Z' of the cutting device 14 and the workpiece W (by way of rotation of the active drive rollers 60/84) in the feed directions Y, Y' may be controlled by one or more motors (see, e.g., motors 64, 158 at FIGS. 7-8 and 26) that receive actuation signals from the central processing unit CPU 3000 thereby causing, for example, rotation of the one or more components (e.g., the active drive rollers 60/84) of the crafting apparatus 10.

In some implementations, the blade of the cutting device 14 partially or fully penetrates a thickness of the workpiece W according to the direction of the arrow Z'. Although the cutting device 14 may include a blade (such as, e.g., a straight blade, a castoring blade, a rotary blade, a serrated edge blade, an embossing tool, a marking tool or the like), other cutters may be selectively coupled to the cutting device 14. Other cutters may include, for example, a laser, an electrically-powered rotary cutter, or the like.

In other examples, the "work" includes a "printing operation". The "printing operation" may including depositing ink from a pen or nozzle of the printing device 12 onto the workpiece W.

The crafting apparatus 10 may conduct "work" in a manner that provides a combo operation such as a "print-and-cut operation". The "print-and-cut operation" may, in some instances, be executed as a "print-then-cut operation" such that the "printing operation" is conducted prior to the "cutting operation".

Figure 5:
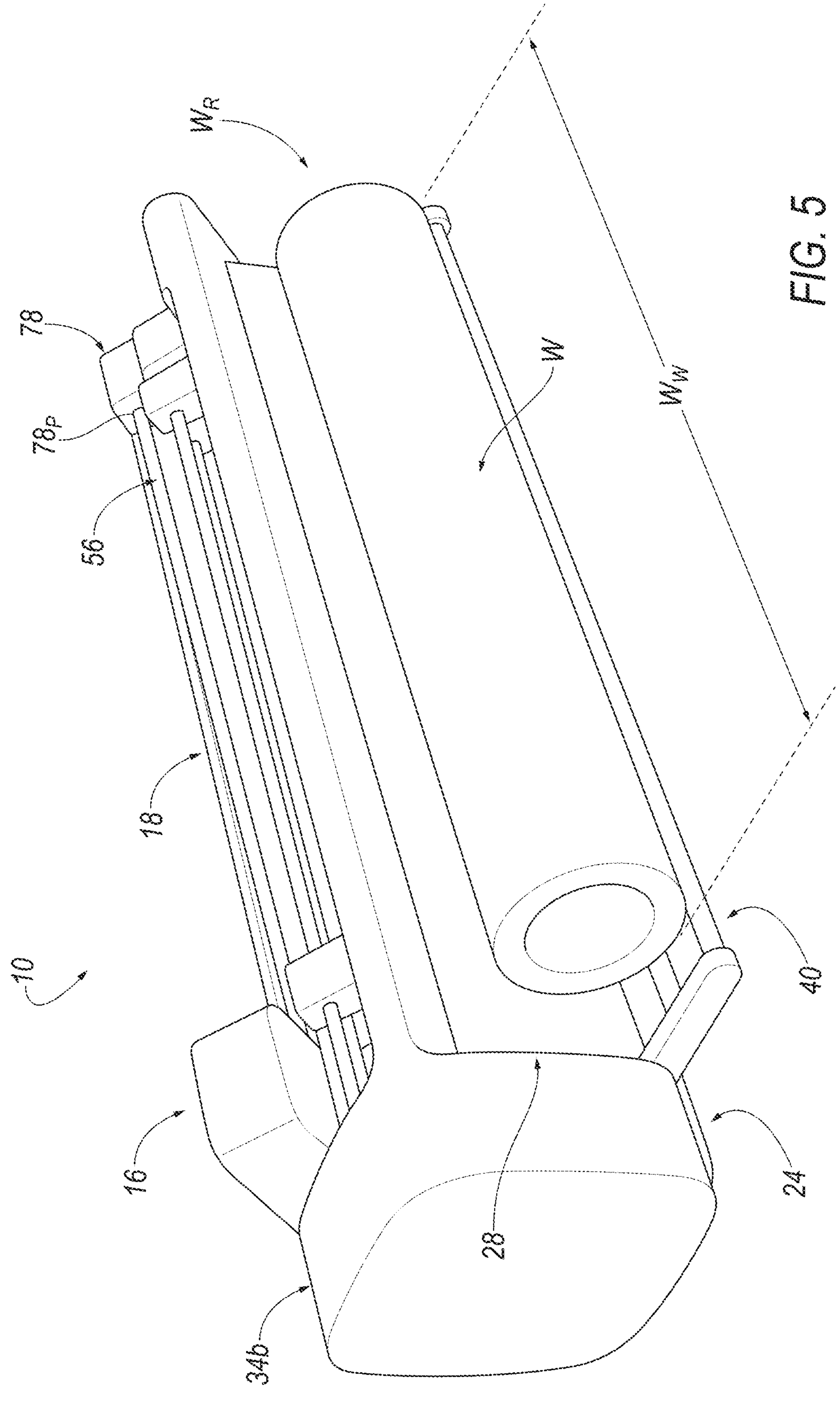
FIG. 5 is a rear perspective view of the crafting apparatus of FIG. 1 and a roll of workpiece material arranged upon a roll holder.

In some implementations, the workpiece W includes any desirable shape, size, geometry or material composition. With reference to FIGS. 5 and 24, the shape/geometry may include, for example, a width $W_W$ (see, e.g., FIGS. 5 and 24) and a length $W_L$ (see, e.g., FIG. 24). In some instances, the length $W_L$ of the workpiece W is not preconfigured as a result of, for example, reeling a desired amount of workpiece material from the roll of workpiece material $W_R$ (see, e.g., FIGS. 3 and 5). In other examples, however, the length $W_L$ of the workpiece W is preconfigured as a result of, for example, a user obtaining a preconfigured workpiece having a predetermined length $W_L$ and a predetermined width $W_W$ (see, e.g., FIG. 24). In some instances, the width $W_W$ of the workpiece W may be greater than or approximately equal to twelve inches (12"/30.5 centimeters). In other examples, the width $W_W$ of the workpiece W may be greater than or approximately equal to twenty-five inches (25"/63.5 centimeters).

Figure 13A:
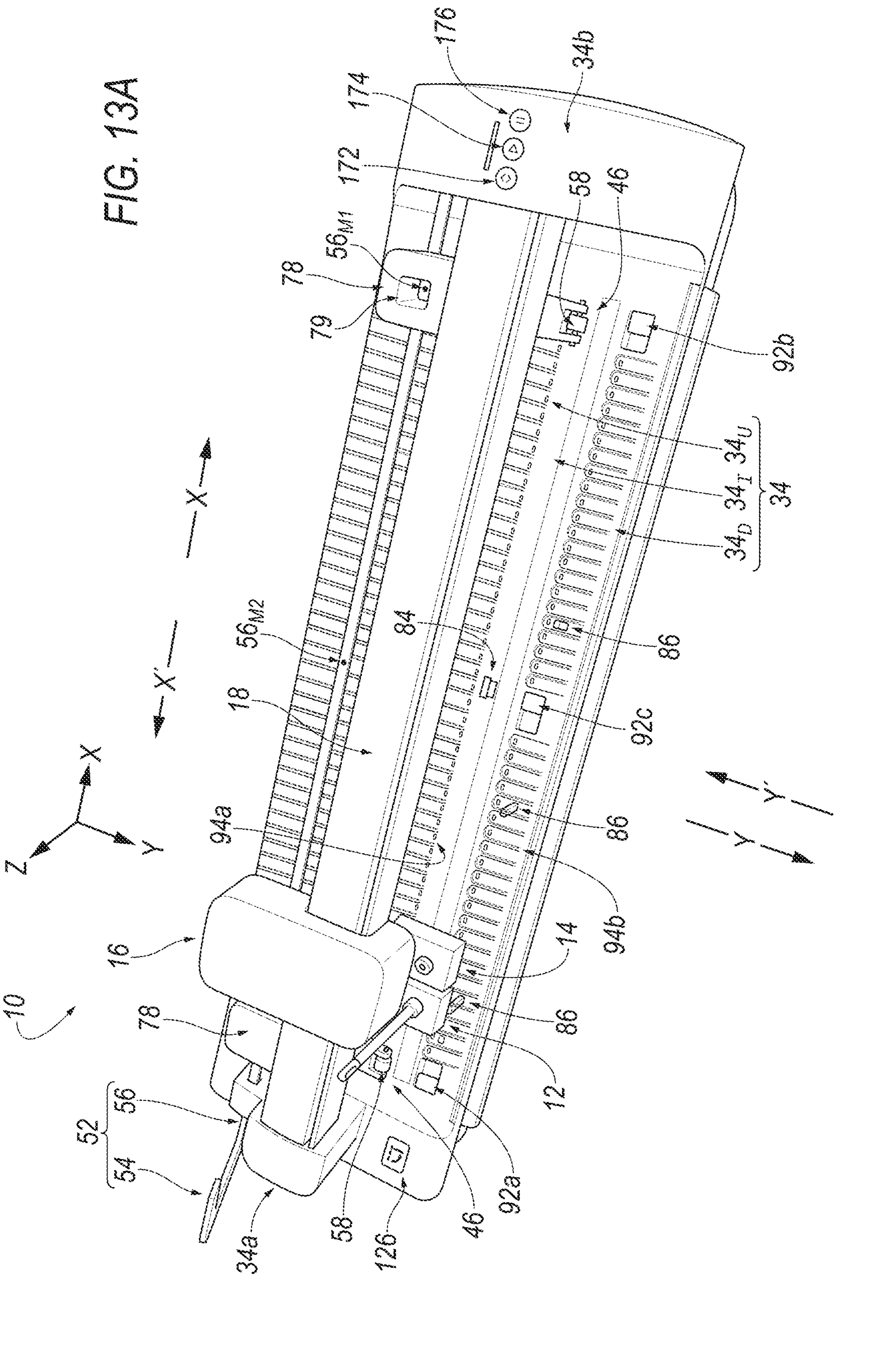
FIG. 13A is a top right perspective view of the crafting apparatus of FIG. 1 but with the pinch roller actuator lever arranged in the up or disengaged orientation.
Figure 13B:
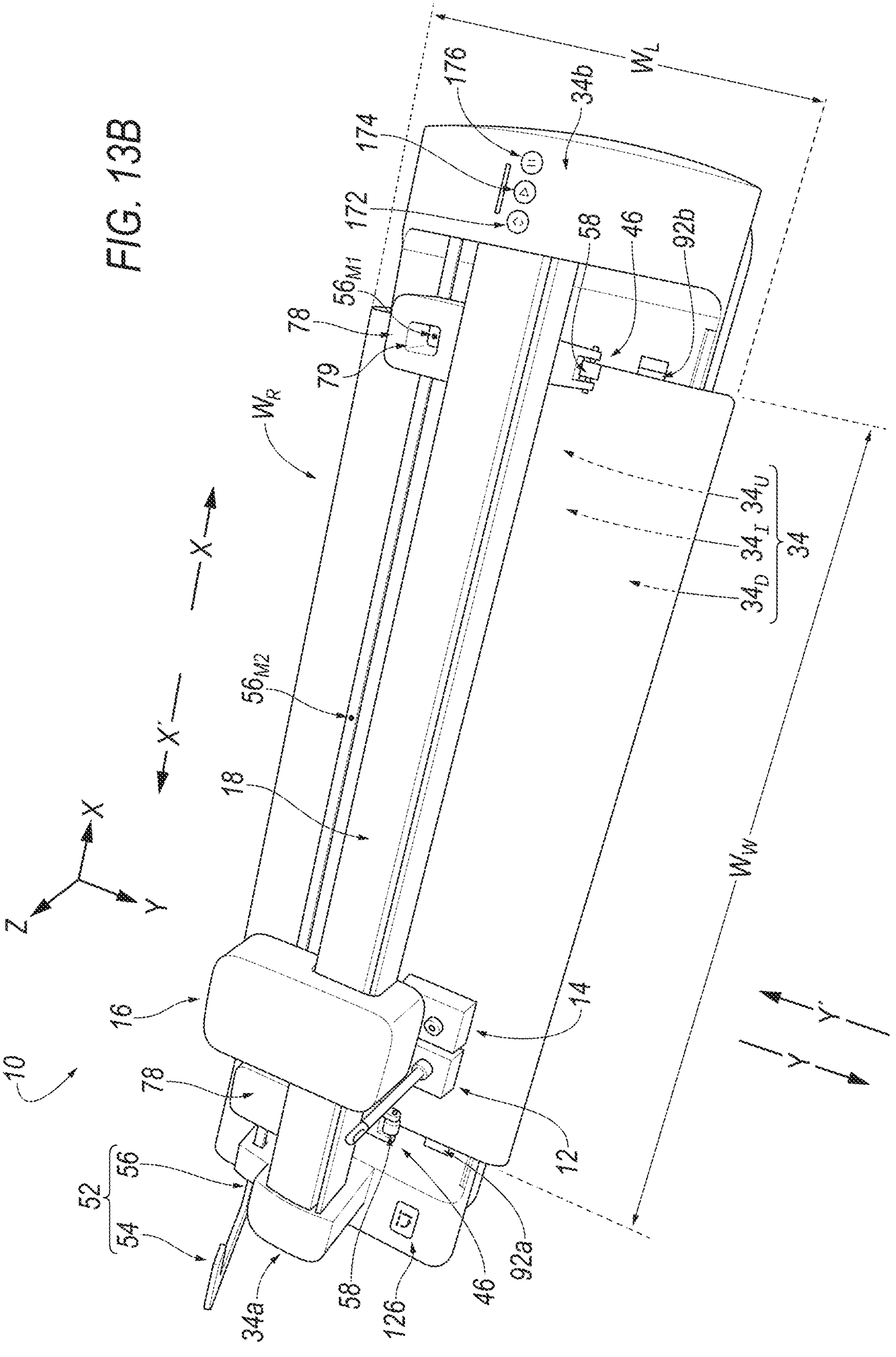
FIG. 13B is another top right perspective view of the crafting apparatus according to FIG. 13A but with workpiece material derived from the roll of workpiece material arranged upon the roll holder of FIG. 5 arranged over the working surface while the pinch roller actuator lever arranged in the up or disengaged orientation.
Figure 13C:
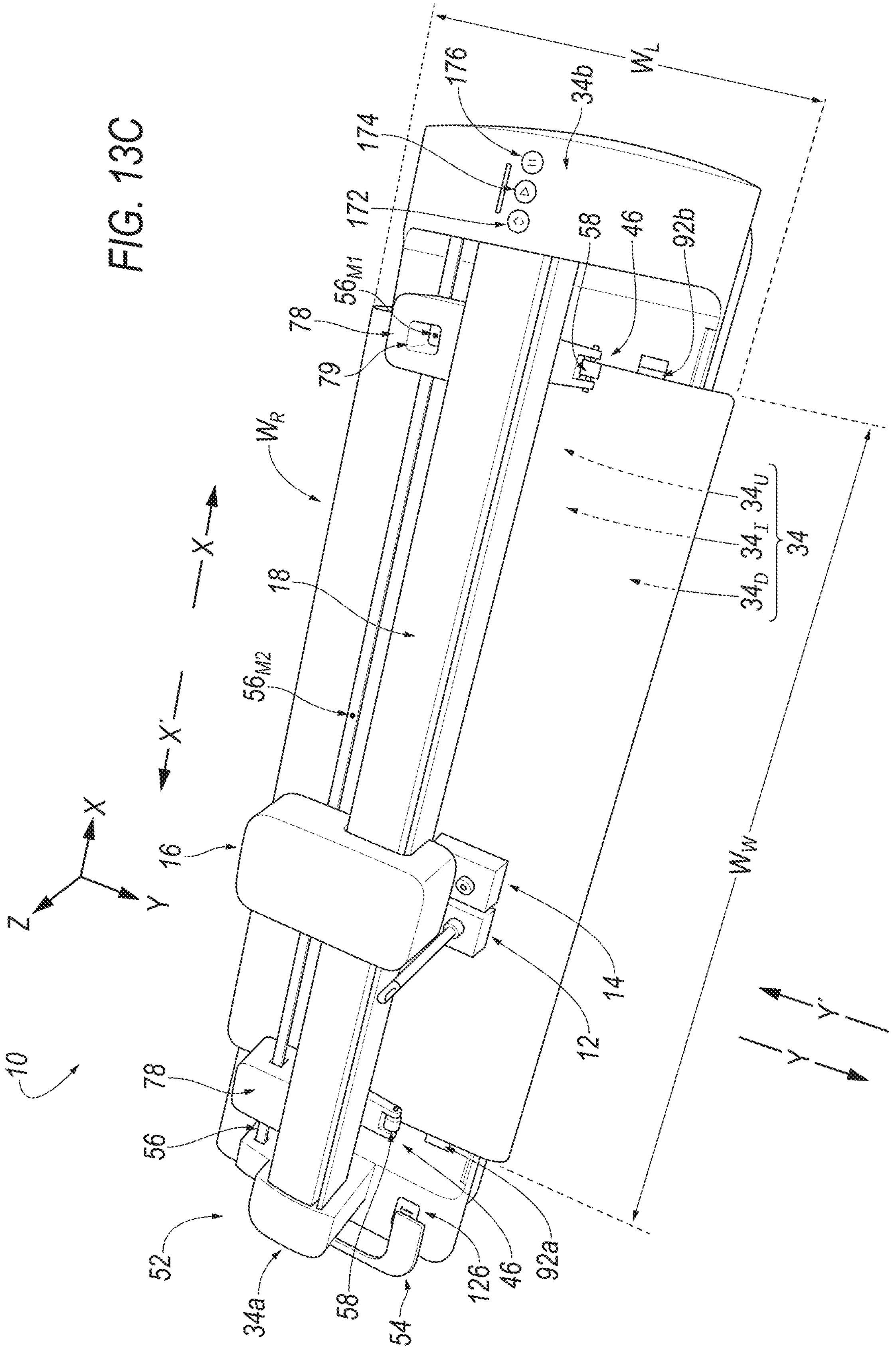
FIG. 13C is another top right perspective view of the crafting apparatus according to FIG. 13B but with the pinch roller actuator lever arranged in the down or engaged orientation for transitioning the pair of pinch rollers from a disengaged orientation to an engaged orientation for applying a pinching force to the workpiece material arranged over the working surface.

Because the crafting apparatus 10 may conduct "work" on different workpiece sources as described above, the crafting apparatus 10 may be structurally reconfigured. In an example, a user may elect to firstly conduct "work" on a relatively "large", preconfigured workpiece W, which may call for configuring the crafting apparatus 10 by deploying workpiece support arms (see, e.g., $\mathbf{100}_D$, $\mathbf{100}_U$ at FIGS. 17-24); then at a later time, the user may elect to secondly conduct "work" on a workpiece W that is derived from the roll of workpiece material $W_R$, which would then call for configuring the crafting apparatus 10 by stowing the workpiece support arms $\mathbf{100}_D$, $\mathbf{100}_U$ so the workpiece support arms $\mathbf{100}_D$, $\mathbf{100}_U$ do not interfere with reeling the workpiece from the roll of workpiece material $W_R$ as seen at FIGS. 13A-13C.

As seen at FIG. 24, the workpiece W (and, in some instances, a workpiece support mat $W_M$) may include a relatively "large" square or rectangular shape having a predetermined length $W_L$ and width $W_W$. In some examples, the dimensions $W_L$, $W_W$ of the relatively "large" square or rectangular workpiece W and/or the workpiece support mat $W_M$ may be approximately equal to twenty-four inches (24"/61.0 centimeters) by twenty-four inches (24"/61.0 centimeters). In other examples, the dimensions $W_L$, $W_W$ of the relatively "large" square or rectangular workpiece W and/or the workpiece support mat $W_M$ may be approximately equal to twenty-four inches (24"/61.0 centimeters) by forty-eight inches (48"/122.0 centimeters). In yet another example, the dimensions $W_L$, $W_W$ of the relatively "large" square or rectangular workpiece W and/or the workpiece support mat $W_M$ may be approximately equal to forty-eight inches (48"/122.0 centimeters) by forty-eight inches (48"/122.0 centimeters).

Alternatively, the shape of the relatively "large" square or rectangular workpiece W may include non-square or non-rectangular shapes, such as, for example, circular shapes, triangular shapes or the like. The material composition of the workpiece W may include paper-based (e.g., paperboard or cardboard) and/or non-paper-based products (e.g., vinyl, foam, rigid foam, cushioning foam, plywood, veneer, balsawood or the like). Nevertheless, although various implementations of workpiece material composition may be directed to paper, vinyl or foam-based products, the material composition of the workpiece W is not limited to a particular material and may include any cuttable material.

In some implementations, the crafting apparatus 10 may be utilized in a variety of environments when conducting "work" on the workpiece W. For example, the crafting apparatus 10 may be located within one's home and may be connected to an external computer system (e.g., a desktop computer, a laptop computer 3000*a*, a smart phone, tablet computer 3000*b*, a dedicated/non-integral/dockable [stand-alone] controller device which is not a general purpose computer, or the like) such that a user may utilize software that may be run by the external computer system 3000*a*, 3000*b* in order for the crafting apparatus 10 to conduct "work" on the workpiece W. In another example, the crafting apparatus 10 may be referred to as a "stand alone system," that, in some implementations, integrally includes one or more of an on-board monitor, an on-board keyboard, an on-board CPU 3000 including a processor, memory and the like. In such an implementation, the crafting apparatus 10 may operate independently of any external computer systems (e.g., the laptop 3000*a*, smart phone, or tablet 3000*b*) in order to permit the crafting apparatus 10 to conduct "work" on the workpiece W.

The crafting apparatus 10 may be implemented to have any desirable size, shape or configuration. For example, the crafting apparatus 10 may be sized to conduct "work" on a relatively "large" workpiece W (e.g., plotting paper that is reeled from the roll of workpiece material $W_R$); accordingly, when the workpiece W is said to be relatively "large", the crafting apparatus 10 may be said to be a "large-form" crafting apparatus 10 in order to accommodate relatively "large" workpieces W. Alternatively, the crafting apparatus 10 may be configured to conduct "work" on a relatively small workpiece W, which may be defined by a preconfigured shape with fixed dimensions $W_L$, $W_W$. Furthermore, even though the crafting apparatus 10 may conduct "work" on relatively "large" workpieces W (such as, e.g., plotting paper that is reeled from the roll of workpiece material $W_R$), the crafting apparatus 10, as will be described in the following disclosure, may be said to be a "portable". Accordingly, the crafting apparatus 10 may be sufficiently sized to conduct "work" on relatively "large" workpieces W while permitting a user to easily carry/move the "large-form" crafting apparatus 10 from one's home to, for example, a friend's home where the friend may be hosting, for example, a "scrap-booking party."

In the example shown in FIG. 1, the crafting apparatus 10 is arranged upon a support member S (e.g., a table). The support member S may support crafting apparatus 10 so that the workpiece W is free to flow onto and off of working surface 34 without coming into contact with the support member S, which would thereby otherwise hinder the free flow of the workpiece W. In some configurations, a front edge $S_F$ of the support member S may align or be closely aligned with a front surface 38 of a working portion 22 of the crafting apparatus 10. In some implementations, the support member S includes a holder (not shown) for supporting and/or feeding a roll workpiece material $W_R$ as it is fed onto working surface 34 of the crafting apparatus 10. In other implementations, the support member S may include a lock feature (not shown) that corresponds to a lock feature formed by, for example, a lower surface 24 of the base portion 20 of the crafting apparatus 10 to selectively lock crafting apparatus 10 on to the support member S; this lock feature may be configured to stabilize crafting apparatus 10 when it is placed on the support member S, thereby preventing the crafting apparatus 10 from falling off of the support member S.

The support member S may be arranged upon an underlying ground surface or floor F (see, e.g., FIGS. 1, 3 and 17) whereby an upper surface $S_U$ of the support member S may be parallel to the underlying ground surface or floor F. The crafting apparatus 10 is arranged upon and supported by the upper surface $S_U$ of the support member S. As explained above and as will be described in the following disclosure, the crafting apparatus 10 includes an angled $\theta_{22}$ working surface 34 that is not parallel to the underlying ground surface or floor F and/or the upper surface $S_U$ of the support member S.

In addition to the upper surface $S_U$, as seen at, for example, FIG. 1, the support member S also includes the front edge $S_F$, a rear edge $S_R$, a first side edge $S_{S1}$, and a second side edge $S_{S2}$. Furthermore, the support member S may be defined by: a length $S_L$ extending between the first side edge $S_{S1}$ and the second side edge $S_{S2}$; and a width $S_W$ extending between the front edge $S_F$, the rear edge $S_R$.

With continued reference to FIG. 1, the support member S also defines a "non-working" three dimensional $X_S$-$Y_S$-$Z_S$ Cartesian coordinate system. The "Z Direction" (i.e., $Z_S$) of the "non-working" three dimensional $X_S$-$Y_S$-$Z_S$ Cartesian coordinate system is orthogonal to the upper surface $S_U$ of the support member S. The "Y Direction" (i.e., $Y_S$) of the "non-working" three dimensional $X_S$-$Y_S$-$Z_S$ Cartesian coordinate system extends in the direction of the width $S_W$ of the support member S. The "X Direction" (i.e., $X_S$) of the "non-working" three dimensional $X_S$-$Y_S$-$Z_S$ Cartesian coordinate system extends in the direction of the length $S_L$ of the support member S.

As seen at FIG. 1, the "Z Direction (i.e., the $Z_S$-axis)" of the "non-working" three dimensional $X_S$-$Y_S$-$Z_S$ Cartesian coordinate system is aligned and parallel with a gravitational axis defined by arrow G (see, e.g., FIGS. 1, 3, 7-8, and 17) that generally illustrates a gravitational pull with respect to the underlying ground surface or floor F. Accordingly, because the "Z Direction (i.e., the Z-axis)" of the "working" three dimensional X-Y-Z Cartesian coordinate system is angularly offset from the "Z Direction" of the "non-working" three dimensional $X_S$-$Y_S$-$Z_S$ Cartesian coordinate system by the angle $\theta_{22}$, the "Z Direction (i.e., the Z-axis)" of the "working" three dimensional X-Y-Z Cartesian coordinate system is not aligned with, and traverses, the gravitational axis defined by the arrow G. Stated differently, the gravitational axis defined by the arrow G and the Z-axis of the "working" three dimensional X-Y-Z Cartesian coordinate system are not parallel and transverse one another.

Figure 17:
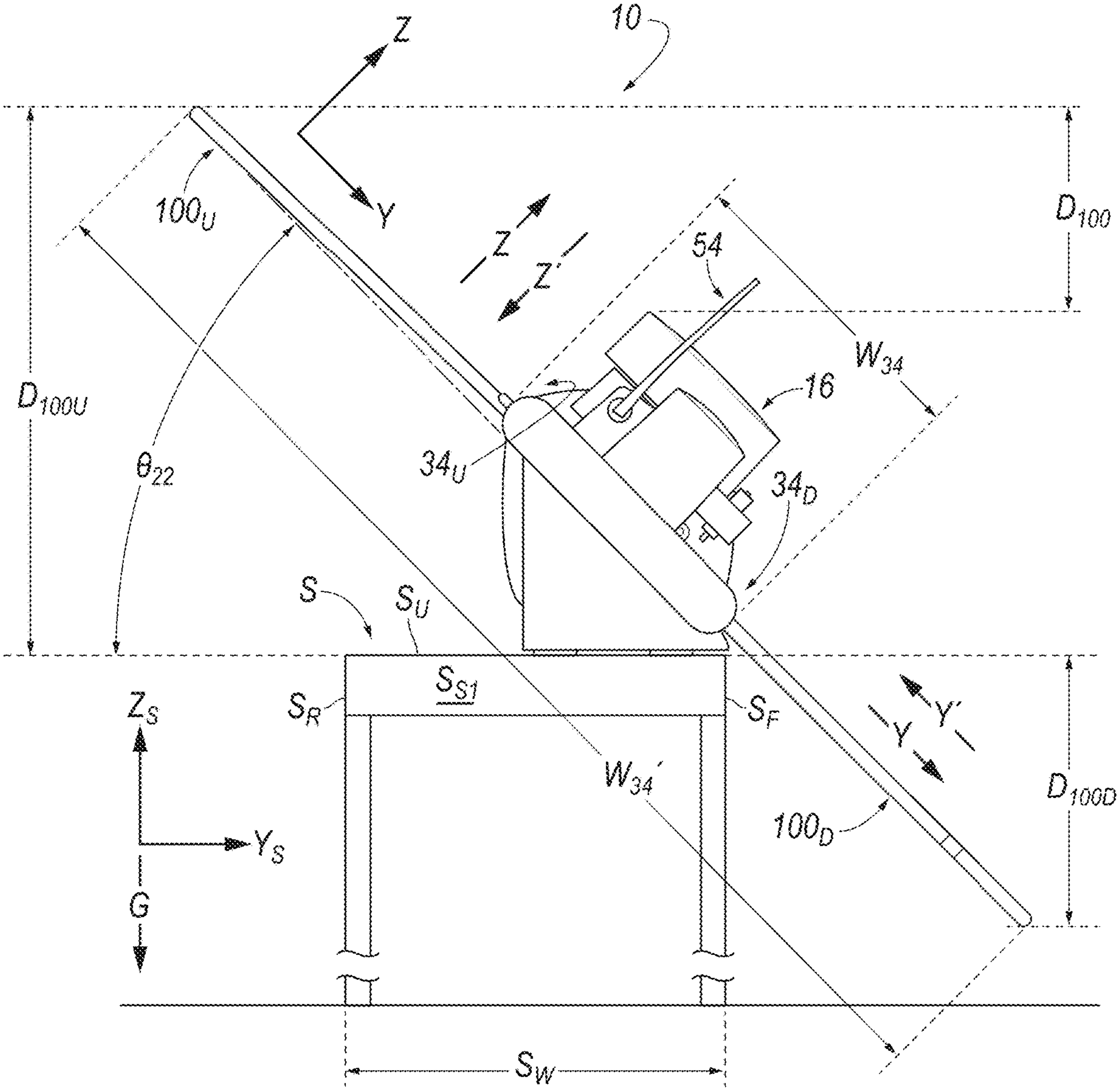
FIG. 17 is a side view of the crafting apparatus of FIG. 15 including: the pinch roller actuator lever arranged in the up or disengaged orientation; and one or more workpiece support arms arranged in a deployed orientation.

The crafting apparatus 10 may be positioned anywhere upon the upper surface $S_U$ of the support member S. However, in some instances, the crafting apparatus 10 may be positioned near one of the edges $S_F$, $S_R$, $S_{S1}$, $S_{S2}$ (e.g., the front edge $S_F$) of the support member S. As will be described in the following disclosure at FIG. 17, arrangement of the crafting apparatus 10 near the front edge $S_F$ of the support member S permits deployment of a downstream workpiece support member (see, e.g., downstream support arm $\mathbf{100}_D$ at FIGS. 17-24) of the crafting apparatus 10 at a distance (see, e.g., $D_{100D}$ at FIG. 17) below the upper surface $S_U$ of the support member S. Furthermore, as seen at FIG. 17, the crafting apparatus 10 also permits deployment of an upstream workpiece support member (see, e.g., upstream support arm $\mathbf{100}_U$ at FIGS. 17-24) of the crafting apparatus 10 at a distance (see, e.g., $D_{100U}$) above the upper surface $S_U$ of the support member S.

As seen at FIG. 1, the crafting apparatus 10 includes a base portion 20 and a working portion 22. The base portion 20 is configured for arrangement upon the upper surface $S_U$ of the support member S. The working portion 22 is disposed upon or connected to the base portion 20. As seen at FIG. 1, the working portion 22 includes the printing device 12 and/or the cutting device 14, the carriage 16, and the rail 18; accordingly, the working portion 22 conducts the "work" on the workpiece W according to the "working" three dimensional X-Y-Z Cartesian coordinate system as described above. As will be described in the following disclosure, the working portion 22 may include one or more workpiece management components that may include, for example, one or more pinch-roller arms 46 (see also, e.g., FIGS. 7-9), a cam actuator 48 (see also, e.g., FIGS. 7-8) connected to the one or more pinch roller arms 46, an actuator lever 52 connected to the cam actuator 48, one or more workpiece stoppers 86 connected to the actuator lever 52, and a plurality of workpiece suction channels 94 (see also, e.g., FIGS. 11-12) that may be actuated in response to rotation of the actuator lever 52.

Referring to FIG. 1, the base portion 20 is generally defined by a lower surface 24, an upper surface 26, and a rear surface 28. The rear surface 28 extends away from a first end of the lower surface 24 at approximately a right angle or 90° angle, according to various embodiments. Furthermore, the rear surface 28 extends away from a first end of the upper surface 26 at an acute angle, according to various embodiments. Yet even further, a second end of the upper surface 26 extends away from a second end of the lower surface 24 at the acute angle $\theta_{22}$, according to various embodiments. Collectively, the lower surface 24, the upper surface 26, and the rear surface 28 generally define a side surface 30 of the base portion 20 having a substantially triangular shape (e.g., the base portion 20 may have a "wedge-like" shape).

Figure 3:
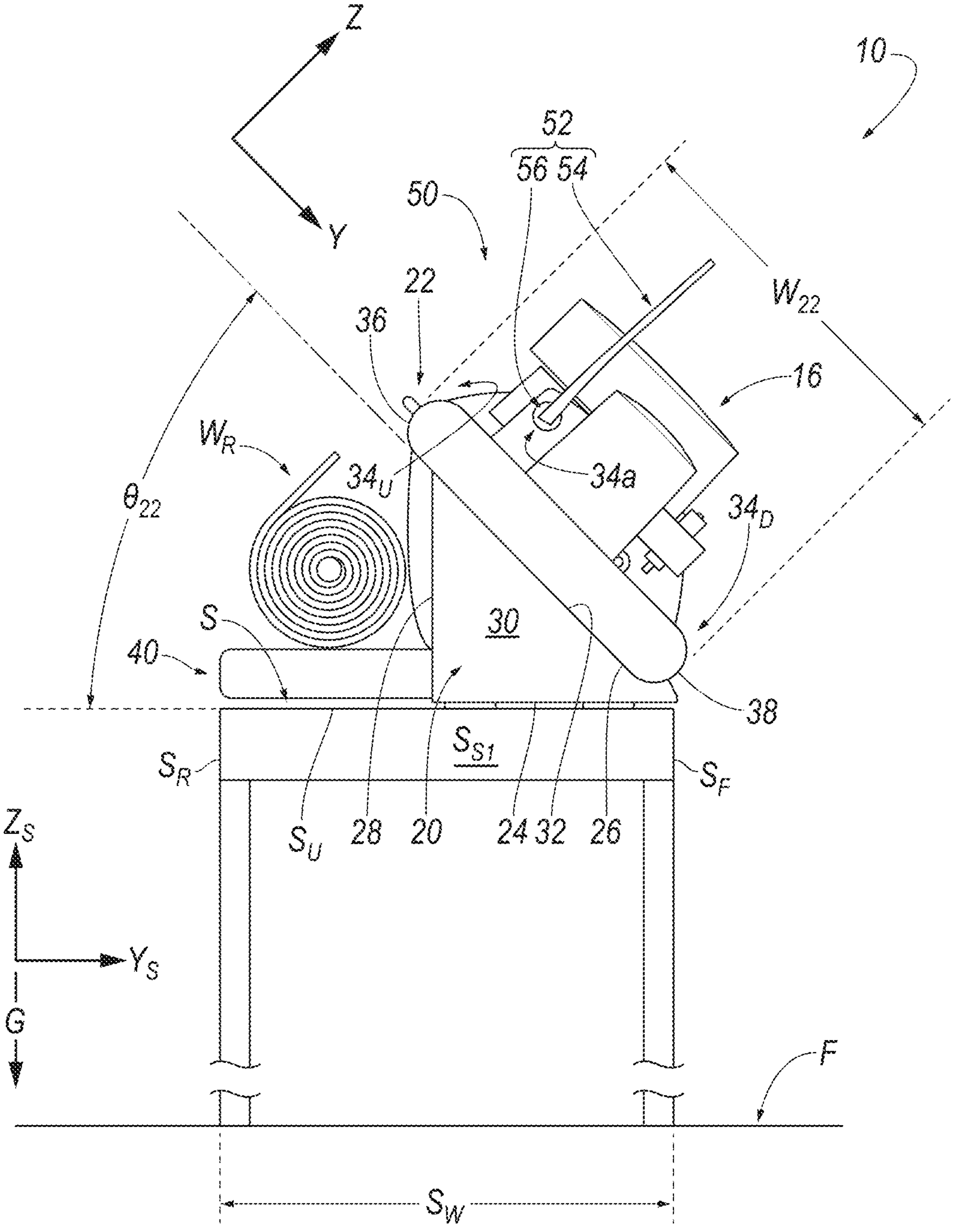
FIG. 3 is a side view of the crafting apparatus of FIG. 1 but with the pinch roller actuator lever arranged in an up or disengaged orientation.

With continued reference to FIG. 1, the working portion 22 is generally defined by a lower surface 32, an upper surface 34, a rear surface 36, and a front surface 38. As seen at FIGS. 1 and 3, the lower surface 32 of the working portion 22 is disposed adjacent or connected to the upper surface 26 of the base portion 20. Accordingly, when the crafting apparatus 10 is arranged upon the upper surface $S_U$ of the support member S, the angular arrangement (i.e., at the acute angle $\theta_{22}$) of the upper surface 34 of the working portion 22 relative to the lower surface 24 of the base portion results in the "working" three dimensional X-Y-Z Cartesian coordinate system of the working portion 22, the working portion 22 being angularly offset from the "non-working" three dimensional $X_S$-$Y_S$-$Z_S$ Cartesian coordinate system that is referenced from the upper surface $S_U$ of the support member S. In various embodiments, the angular arrangement of the upper surface 26 of the base portion 20 relative the lower surface 24 of the base portion 20 results in the "working" three dimensional X-Y-Z Cartesian coordinate system of the working portion 22 being angularly offset (i.e., at the acute angle $\theta_{22}$) from the "non-working" three dimensional $X_S$-$Y_S$-$Z_S$ Cartesian coordinate system that is referenced from the upper surface $S_U$ of the support member S.

Figure 4:
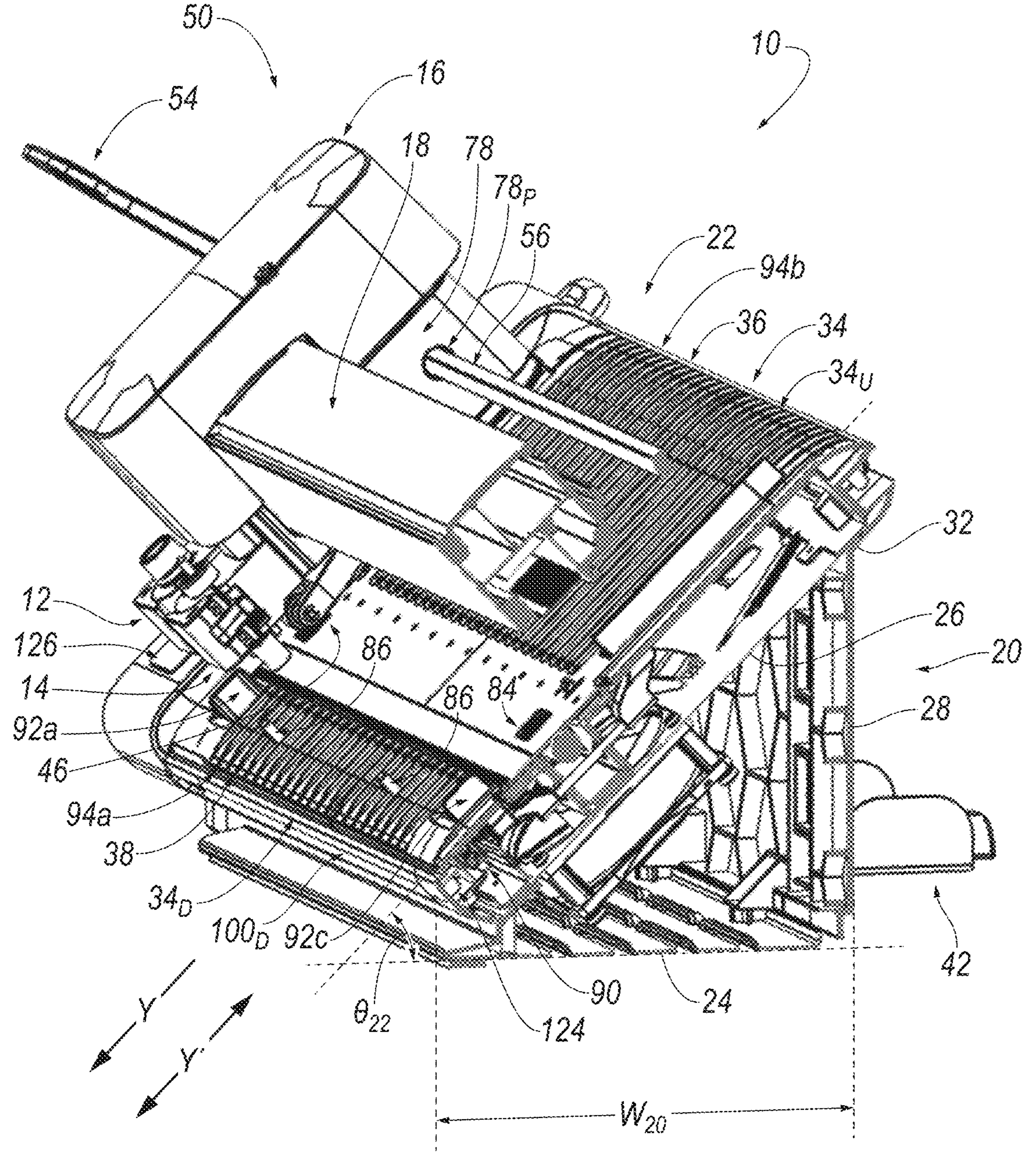
FIG. 4 is a cross-sectional view of the crafting apparatus referenced from line 4-4 of FIG. 2 but with the pinch roller actuator lever arranged in the up or disengaged orientation according to FIG. 3.

With reference to FIG. 4, a cross-sectional view of the base portion 20 and the working portion 22 is shown. As seen at FIG. 4, the upper surface 34 is arranged at the angle (i.e., at the acute angle $\theta_{22}$) relative to a horizontal plane established by the lower surface 24 of the base portion 20 being arranged upon the upper surface $S_U$ of the support member S. In some implementations, the angle $\theta_{22}$ may be approximately equal to 45°. In various embodiments, the angle $\theta_{22}$ is between approximately 30° and approximately 60°. In various embodiments, the angle $\theta_{22}$ is between approximately 20° and approximately 70°. In various embodiments, the angle $\theta_{22}$ may be any value between 0° and approximately 90°. As used in this context only, the term "approximately" means plus or minus 2°. Accordingly, in configurations where the angle $\theta_{22}$ increases from what is seen at FIG. 4, a width $W_{20}$ defined by the lower surface 24 of the base portion 20 decreases. Therefore, an increase in the angle $\theta_{22}$ may reduce the "footprint" of the base portion 20 while still providing a sufficiently "large" upper surface 34 in the Y, Y' feed directions for supporting relatively "large" workpieces W while minimizing the space that the base portion 20 takes up on the upper surface $S_U$ of the support member S.

The upper surface 34 of the working portion 22 may be alternatively referred to as "a working surface" on which the workpiece W rests as well as for manipulation in the Y, Y' feed directions by one or more workpiece management components of the crafting apparatus 10. Furthermore, as seen at FIGS. 1-3, 5-6, 13A-13C, 15, and 23-24 the rail 18 may be supported by and elevated away from the working surface 34 by a first rail support member 34*a* and a second rail support member 34*b* that extends away from the working surface 34 according to the Z direction of the three dimensional X-Y-Z Cartesian coordinate system.

The working surface 34 provides support for the workpiece W both before (i.e., upstream of) and after (i.e., downstream of) a point of contact with the printing device 12 and/or the cutting device 14. The working surface 34 also acts as a surface against which a tool, such as, for example, the cutting blade of the cutting device 14, presses against the workpiece W according to the Z' direction of the three dimensional X-Y-Z Cartesian coordinate system. Accordingly, as seen at FIG. 1, the working surface 34 may be further defined by an upstream portion $\mathbf{34}_U$ of the working surface 34, a downstream portion $\mathbf{34}_D$ of the working surface 34, and an intermediate portion $\mathbf{34}_I$ of the working surface 34, which is located between the upstream portion $\mathbf{34}_U$ of the working surface 34 and the downstream portion $\mathbf{34}_D$ of the working surface 34.

The upstream portion $\mathbf{34}_U$ of the working surface 34 is generally where, for example, a portion of a length of the workpiece W may be initially interfaced with the crafting apparatus 10. The intermediate portion $\mathbf{34}_I$ of the working surface 34 is generally where, for example, the printing device 12 and the cutting device 14 (that are moveably supported by the carriage 16) conducts "work" on the workpiece W. The downstream portion $\mathbf{34}_D$ of the working surface 34 is generally where, for example, the portion of the length of the workpiece W is moved after conducting "work" on the workpiece W and/or where the workpiece W is ejected or removed from the crafting apparatus 10 after the "work" is conducted on the workpiece W.

As seen at FIG. 5, the roll of workpiece material $W_R$ may be stowed upon a parallel bar cradle 40 that may or may not be attached to the rear surface 28 of the base portion 20 of the crafting apparatus 10. In other implementations as seen at, for example, FIGS. 4 and 6, the roll of workpiece material $W_R$ may be stowed upon a pair of support flanges 42 that may or may not be attached to the rear surface 28 of the base portion 20 of the crafting apparatus 10. The parallel bar cradle 40 and the pair of support flanges 42 are examples of roll holder structures that may be utilized in conjunction with the crafting apparatus 10. In various embodiments, the roll holder structure may be detachably coupled to the machine. In various other embodiments, the roll holder structure may be independent of the machine. In yet other embodiments, the roll holder structure may be mounted to or may extend from the support member S (e.g., a table).

Figure 6:
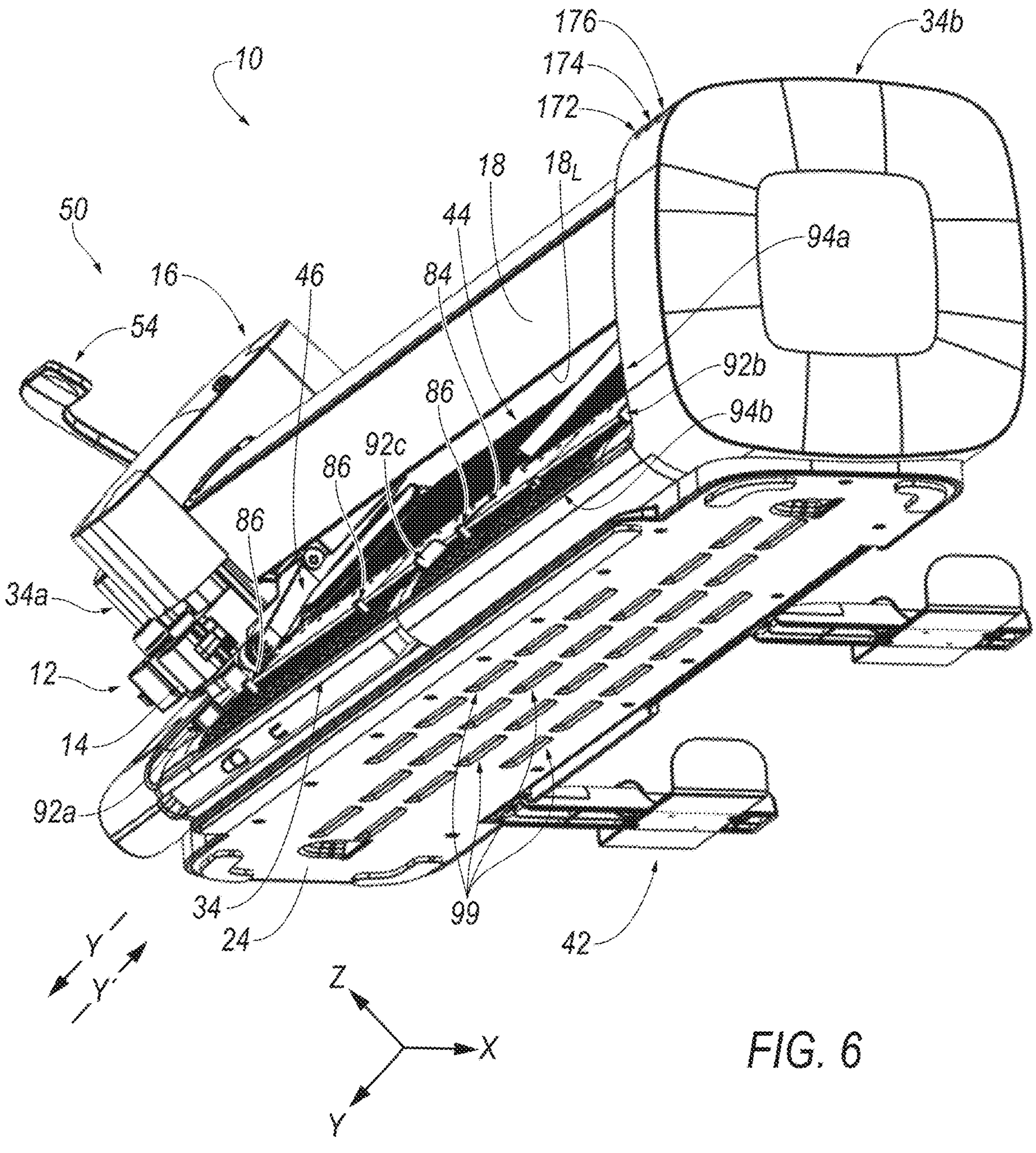
FIG. 6 is a front, bottom perspective view of the crafting apparatus of FIG. 1 but with the pinch roller actuator lever arranged in the up or disengaged orientation according to FIG. 3.

Referring to FIG. 6, a bottom perspective view of crafting apparatus 10 is shown. As seen in FIG. 6, a space or gap 44 is provided between a lower surface $18_L$ of the rail 18 and the working surface 34 in order to permit passage of the workpiece W in the Y, Y' feed directions. The lower surface 24 of the base portion 20 of the crafting apparatus 10 is configured for placement upon the upper surface $S_U$ of the support member S, which may be, for example, a tabletop or countertop, or the like.

Figure 7:
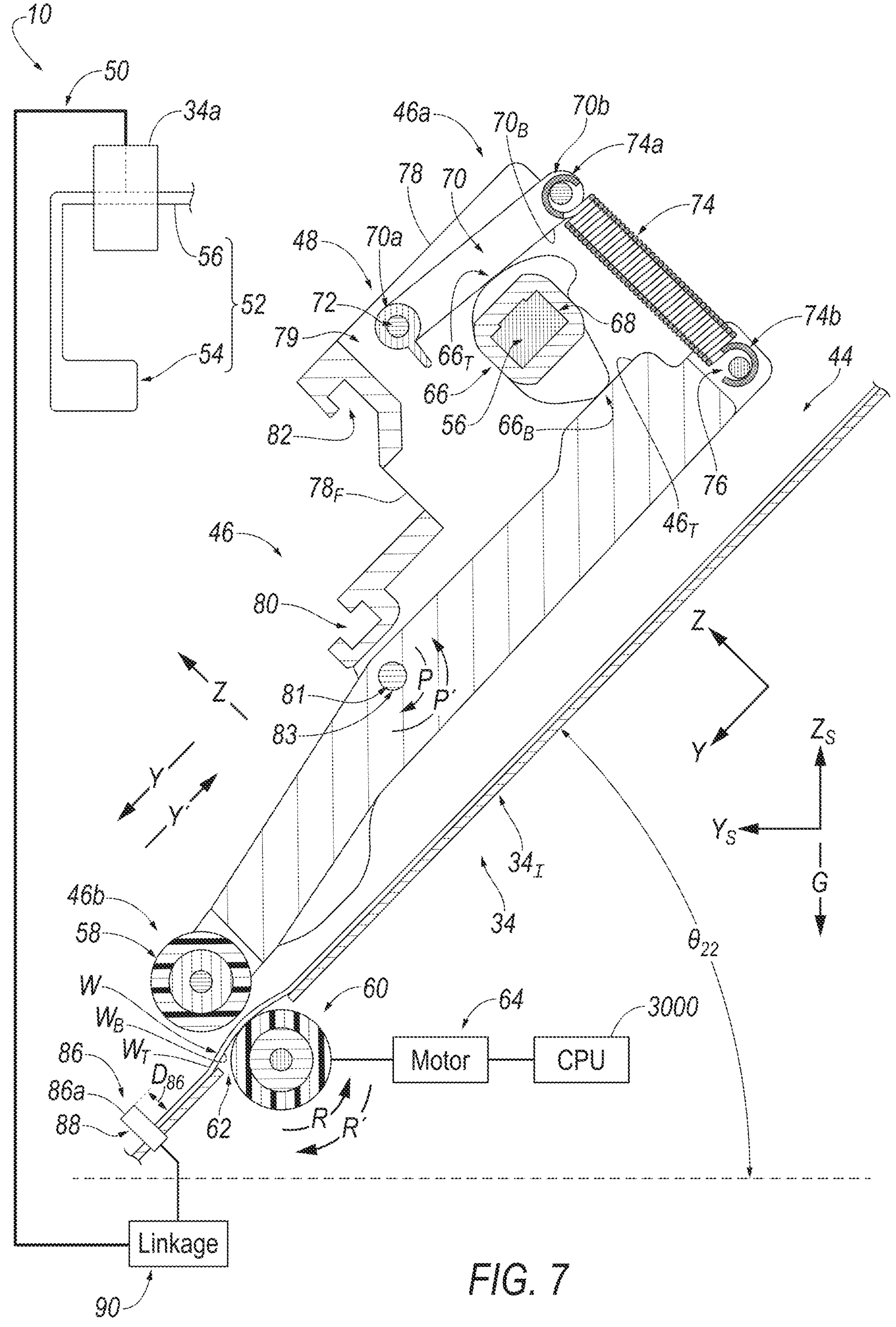
FIG. 7 is a side cross-sectional view of a pinch roller of a pair of pinch rollers of the crafting apparatus of FIG. 1 arranged in an up or disengaged orientation relative to a working surface of the crafting apparatus with the pinch roller actuator lever arranged in the up or disengaged orientation according to FIG. 3.
Figure 8:
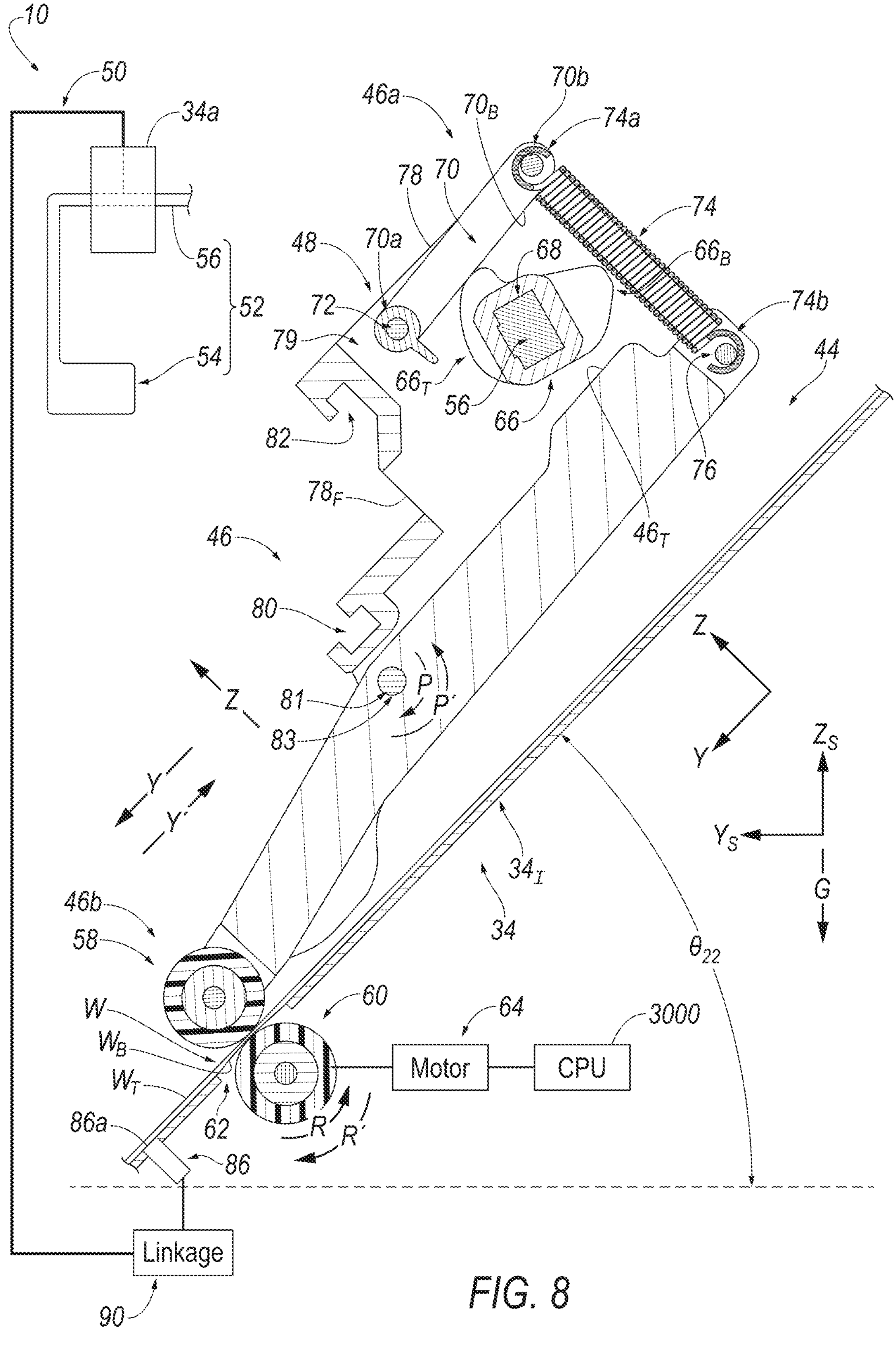
FIG. 8 is a side cross-sectional view of the pinch roller of the pair of pinch rollers of the crafting apparatus according to FIG. 7 arranged in a down or engaged orientation relative to the working surface of the crafting apparatus with the pinch roller actuator lever arranged in the down or engaged orientation according to FIG. 1.
Figure 9:
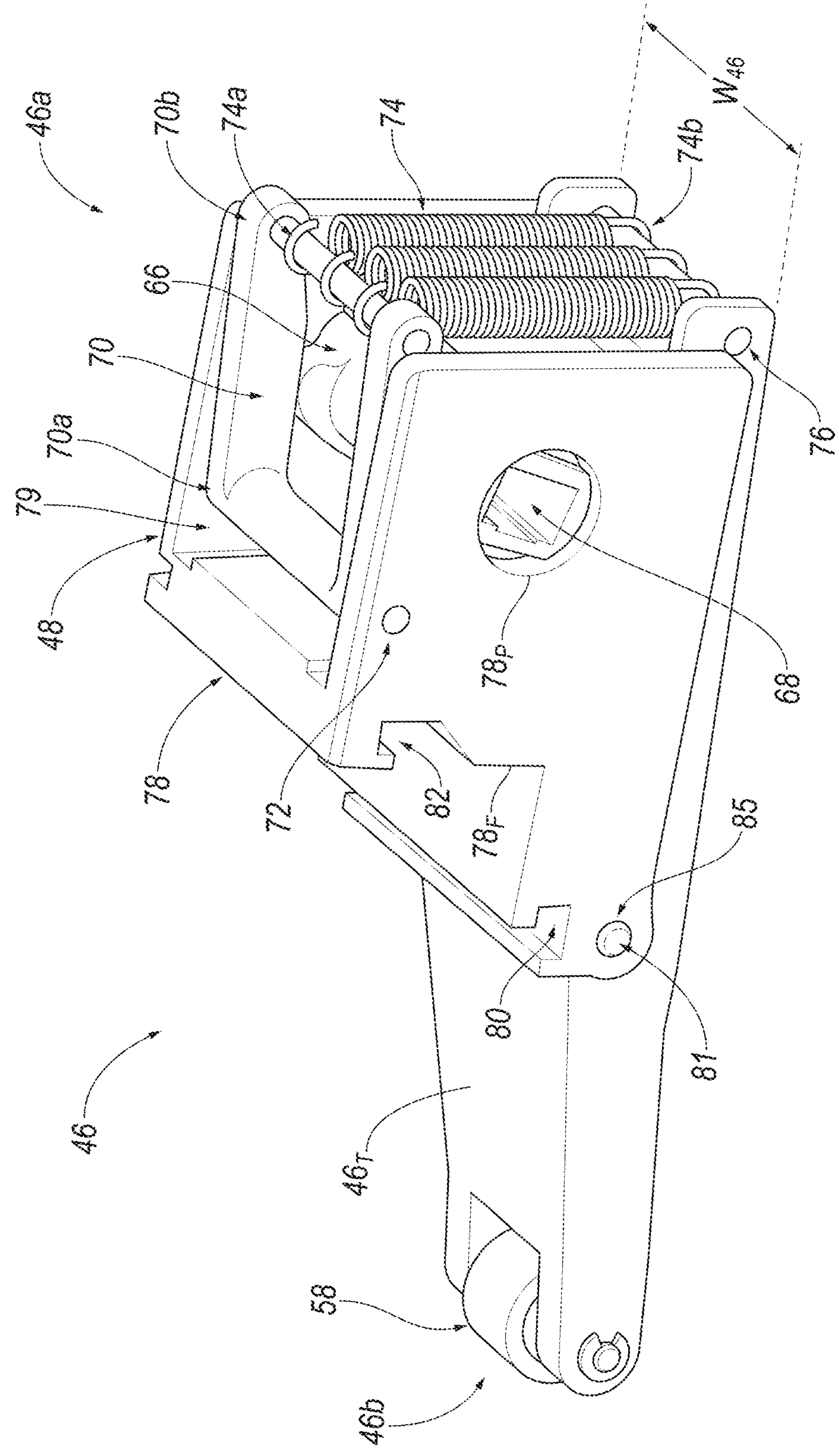
FIG. 9 is a perspective view of the pinch roller of the pair of pinch rollers according to FIG. 8.

With reference to FIGS. 7-9, a pinch-roller arm is shown generally at 46. The pinch-roller arm 46 may be one of several workpiece management components that prevent the workpiece W from sliding off of the angled $\theta_{22}$ working surface 34 as a result of a gravitational pull according to arrow G (see also, e.g., FIGS. 1, 3, and 17) on the workpiece W.

As seen at FIGS. 7-9, the pinch-roller arm 46 includes a first end **46*a* and a second end 46*b*. The first end 46*a* of the pinch-roller arm 46 includes a cam actuator 48 that, when rotated for arrangement in a first orientation (see, e.g., FIG. 7) or a second orientation (see, e.g., FIG. 8), causes the second end 46*b* of the pinch-roller arm 46 to respectively move: (1) as seen at FIG. 7 in a direction according to arrow Z away from the intermediate portion $34_I$ of the working surface 34; and (2) as seen at FIG. 8, in a direction according to arrow Z' toward from the intermediate portion $34_I$ of the working surface 34. Exemplary movement of the pinch roller arm 46 as described above may be further defined by a first pivoting movement of the pinch-roller arm 46 relative the housing 78 according to the direction of an arrow P as seen at FIG. 7 (that may be in a clockwise direction) about a pin 81 that extends through: (1) openings 83 of the pinch-roller arm 46; and (2) openings 85 as seen at FIG. 9 of the housing 78. Exemplary movement of the pinch roller arm 46 as described above may alternatively be further defined by a second pivoting movement of the pinch-roller arm 46 relative the housing 78 according to the direction of an arrow P' as seen at FIG. 8 (that may be in a counter-clockwise direction) about the pin 81 that extends through: (1) the openings 83 of the pinch-roller arm 46; and (2) the openings 85 of the housing 78**.

Figure 2:
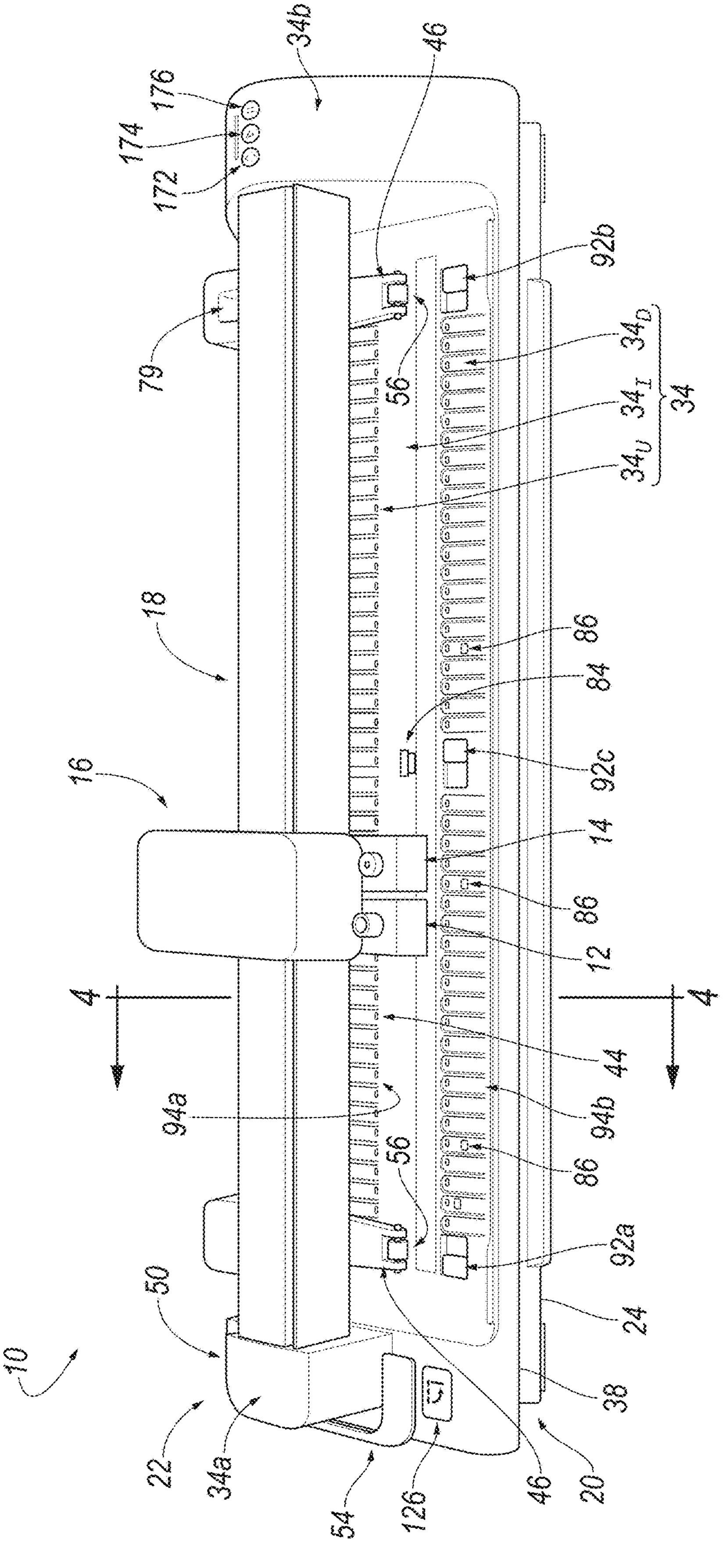
FIG. 2 is a front perspective view of the crafting apparatus of FIG. 1

As seen at FIGS. 1-2, the crafting apparatus 10 may include two pinch roller arms 46. However, the crafting apparatus 10 is not limited to including two pinch roller arms 46 and may include any number of pinch roller arms 46 such as, for example, one, two, three, four or more pinch roller arms 46.

With continued reference to FIGS. 1-10, 13A-13C, 15-17, and 23-24, the one or more pinch roller arms 46 is a component of a pinch-roller mechanism 50. As will be explained in the following disclosure, the pinch roller mechanism 50 may include a plurality of interconnected components.

For example, in addition to the pinch roller arm 46, the pinch-roller mechanism 50 generally includes an actuator lever 52. The actuator lever 52 includes a handle portion 54 connected to a rod portion 56.

As seen at, for example, FIG. 1, when arranged in a "down orientation", the handle portion 54 generally extends from the rod portion 56 in the Y direction of the three dimensional X-Y-Z Cartesian coordinate system. Conversely, as seen at, for example, FIG. 3, when arranged in an "up orientation", the handle portion 54 generally extends in the Z direction from the rod portion 56 of the three dimensional X-Y-Z Cartesian coordinate system. Irrespective of the up or down orientation of the handle portion 54, the rod portion 56 generally always extends in the X direction of the three dimensional X-Y-Z Cartesian coordinate system. Furthermore, the rod portion 56 is arranged in parallel with and extends along a length of the rail 18 at a distance (in the Z direction of the three dimensional X-Y-Z Cartesian coordinate system) away from the working surface 34. In various embodiments, the rod portion 56 extends generally parallel to the rail 18 and is generally disposed a distance away, in the Y direction, from the rail 18.

A first end of the rod portion 56 may be rotatably-supported by and extend through the first rail support member **34*a* (that also supports a first end of the rail 18). A second end of the rod portion 56 may be rotatably-supported by and extend into (but not entirely through) the second rail support member 34*b* (that also supports a second end of the rail 18). As seen at FIGS. 7-8, while the rod portion 56 is rotatably supported by both of the first rail support member 34*a* and the second rail support member 34*b*, the rod portion 56 also extends entirely through the cam actuator 48 of the one or more pinch roller arms 46 of the crafting apparatus 10. As described in greater detail below, the rod portion 56 of the actuator lever 52 has a non-circular cross-sectional shape. That is, the rod portion 56 of the actuator lever 52 has a cross-sectional shape that is configured to impart rotation to the cam actuator 48 of the one or more pinch roller arms 46, thus causing the cam actuator 48 to co-rotate with the rod portion 56. In some examples, the rod portion 56** may have a rectangular or polygonal shape.

With reference to FIGS. 7-8, the pinch-roller mechanism 50 also includes a passive roller 58 rotatably-connected to the second end **46*b* of the pinch-roller arm 46. In some implementations, the passive roller 58 is not actively rotated by an actuator or motor; rather, when a workpiece W is arranged upon the working surface 34 and is moved by the one or more components of the crafting apparatus 10 in the Y, Y' feed directions, movement of the workpiece W will cause rotation of the passive roller 58 as a result of the passive roller 58 being in contact with the workpiece as seen at, for example, FIG. 8**.

Figure 10:
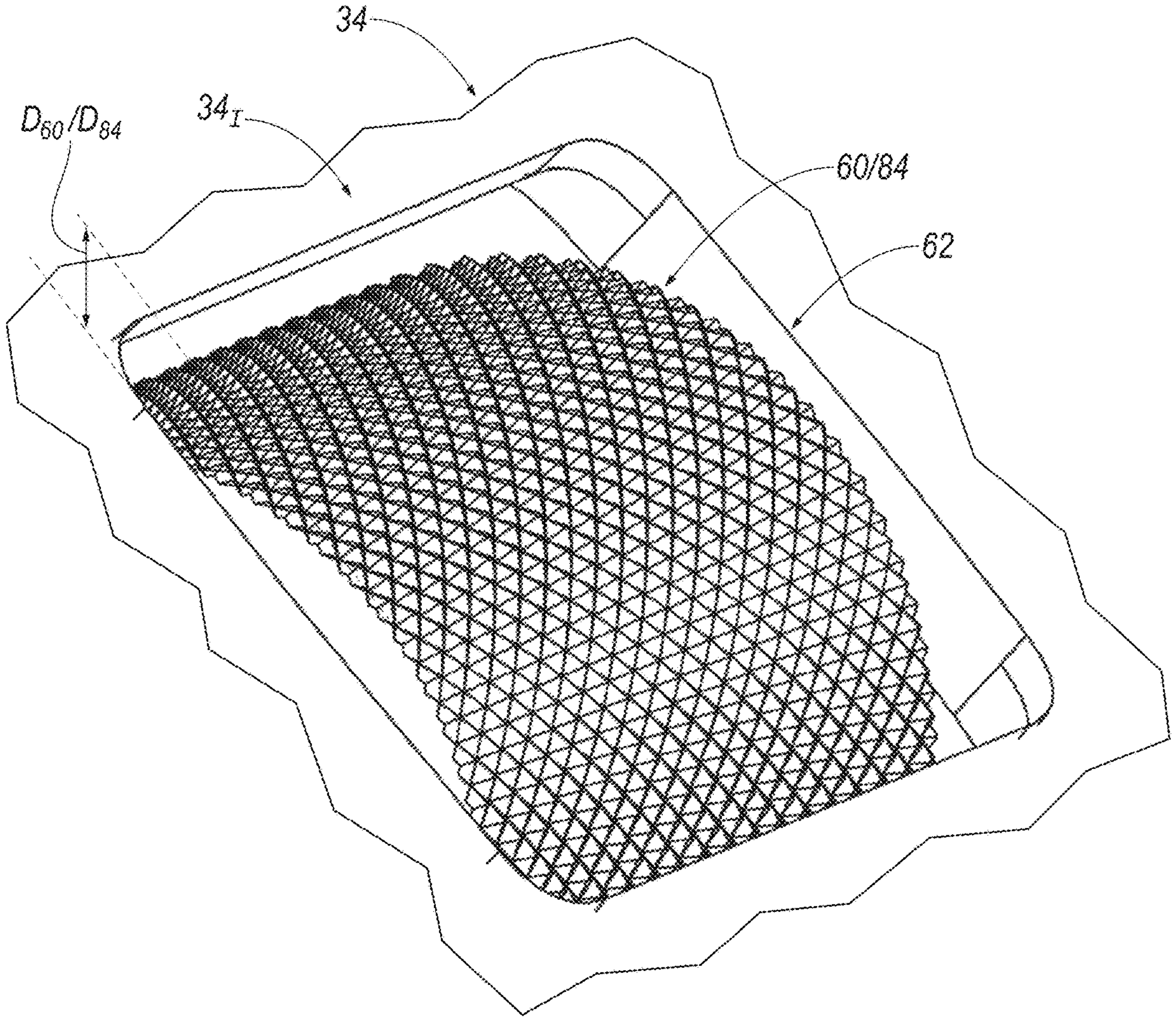
FIG. 10 is an enlarged view of a portion of the working surface of the crafting apparatus illustrating a drive-roller that is arranged within an opening defined by the working surface.

As seen at FIGS. 7-8 and 10, the pinch-roller mechanism 50 also includes an active drive roller 60. The active drive roller 60 axially opposes or may be said to be arranged directly opposite the passive roller 58.

With reference to FIGS. 7-8 and 10, the active drive roller 60 may be arranged within an opening 62 formed in the intermediate portion $34_I$ of the working surface 34. As seen at FIG. 10, a portion of the active drive roller 60 may be arranged within the opening 62 and slightly above the intermediate portion $34_I$ of the working surface 34 at a distance $D_{60}$ such that the active drive roller 60 is permitted to engage a bottom surface $W_B$ (see, e.g., FIGS. 7-8) of the workpiece W in order to drive movement of the workpiece W in the Y, Y' feed directions.

Furthermore, as seen at FIGS. 7-8, the pinch-roller mechanism 50 may also include a motor 64 connected to the active drive roller 60. With reference to FIG. 8, when, for example, the motor 64 receives a signal from the CPU 3000, the active drive roller 60 is actively rotated in one of a first direction R or an opposite second direction R' in order to cause movement of the workpiece W in the Y, Y' feed directions.

As seen at FIGS. 7-9, a plurality of components of the cam actuator 48 may be arranged within a housing 78 that is connected to the pinch roller arm 46 and arranged over a top surface $\mathbf{46}_T$ of the pinch roller arm 46. In some examples, the housing 78 may or may not be considered to be a component of the cam actuator 48. In other examples, the housing may or may not be considered to be a component of the pinch roller arm 46.

The plurality of components of the cam actuator 48 includes a cam member 66. The cam member 66 includes a keyed passageway 68 having a cross-sectional geometry that is configured to permit passage of and support a segment of the length of the rod portion 56 of the actuator lever 52. With reference to FIGS. 4 and 9, the rod portion 56 is permitted to extend through aligned passages $\mathbf{78}_P$ formed by the housing 78. Because the rod portion 56 extends through the keyed passageway 68 of the cam member 66 and the aligned passages $\mathbf{78}_P$ formed by the housing 78, the rod portion 56 may be said to be indirectly connected to and support the pinch roller arm 46 as a result of the housing 78 being connected to the pinch roller arm 46 while permitting passage of the rod portion 56 there-through.

With continued reference to FIGS. 7-9, the plurality of components of the cam actuator 48 also includes a pivot bracket 70. Referring to FIGS. 7-8, a top end $\mathbf{66}_T$ of the cam member 66 is configured to engage a bottom surface $\mathbf{70}_B$ of the pivot bracket 70.

As seen at FIGS. 7-9, the plurality of components of the cam actuator 48 also includes a pin 72 extending across a width of the housing 78. The pin 72 is fixed to the housing 78. A first end 70*a* of the pivot bracket 70 is supported by and rotates about the pin 72.

The plurality of components of the cam actuator 48 also includes one or more coil spring members 74. With reference to FIG. 9, in some configurations, the one or more coil spring members 74 is defined by three coil spring members. The cam actuator 48, however, is not limited to including three coil spring members 74 and may include any number of coil spring members 74 such as, for example, one, two, three, four or more coil spring members 74.

A second end 70*b* of the pivot bracket 70 is configured to support a first end 74*a* of the one or more coil spring members 74. A second end 74*b* of the one or more coil spring members 74 is fixed or anchored to a pin 76 of the pinch roller arm 46. As seen at FIG. 9, the pin 76 extends across a width $W_{46}$ of the first end 46*a* pinch roller arm 46.

Furthermore, as seen at FIG. 7, a bottom end $\mathbf{66}_B$ of the cam member 66 is shaped or configured to engage the top surface $\mathbf{46}_T$ of the first end 46*a* of the pinch roller arm 46. Conversely, as seen at FIG. 8, the bottom end $\mathbf{66}_B$ of the cam member 66 is shaped or configured to disengage (i.e., as a result of being rotated away from) the top surface $\mathbf{46}_T$ of the first end 46*a* of the pinch roller arm 46.

Because the rod portion 56 extends from the handle portion 54, rotation of the handle portion 54 also results in corresponding rotation of the rod portion 56. When the handle portion 54 is rotated to the "up orientation" as seen at FIGS. 3-4, 6, 13A-13B, 15, 17, and 23, the rod portion 56 correspondingly rotates in order to cause corresponding rotation of the cam member 66 as seen at FIG. 7 whereby: (1) the bottom end $\mathbf{66}_B$ of the cam member 66 engages the top surface $\mathbf{46}_T$ of the first end 46*a* of the pinch roller arm 46; and (2) the top end $\mathbf{66}_T$ of the cam member 66 is configured to engage the pivot bracket 70 for causing the pivot bracket 70 to pivot about the pin 72 to a "down orientation", thereby removing tension from the one or more coil spring members 74 connected to the second end 70*b* of the pivot bracket 70 and the pin 76 extending across the width $W_{46}$ of the first end 46*a* pinch roller arm 46. When rotation of the rod portion 56 arranges the components of the cam actuator 48 as described above and as seen as FIG. 7, the second end 46*b* of the pinch roller arm 46 is moved in a direction according to arrow Z away from the active drive roller 60 and the intermediate portion $\mathbf{34}_I$ of the working surface 34.

Conversely, when the handle portion 54 is rotated to the "down orientation" as seen at FIGS. 1-2, 5, 13C, and 23-24, the rod portion 56 correspondingly rotates to cause corresponding rotation of the cam member 66 as seen at FIG. 8 whereby: (1) the bottom end $\mathbf{66}_B$ of the cam member 66 does not engage the top surface $\mathbf{46}_T$ of the first end 46*a* of the pinch roller arm 46 (e.g., a gap may be defined between the cam member 66 and the top surface $\mathbf{46}_T$ of the first end 46*a* of the pinch roller arm 46); and (2) the top end $\mathbf{66}_T$ of the cam member 66 is configured to engage the pivot bracket 70 for causing the pivot bracket 70 to pivot about the pin 72 to an "up orientation", thereby tensioning the one or more coil spring members 74 connected to the second end 70*b* of the pivot bracket 70 and the pin 76 extending across the width $W_{46}$ of the first end 46*a* pinch roller arm 46. When rotation of the rod portion 56 arranges the components of the cam actuator 48 as described above and as seen as FIG. 8, the second end 46*b* of the pinch roller arm 46 is moved in a direction according to arrow Z' toward the active drive roller 60 and the intermediate portion $\mathbf{34}_I$ of the working surface 34.

In addition to the housing 78 at least partially enclosing the plurality of components of the cam actuator 48 as described above, a front surface $\mathbf{78}_F$ of the housing 78 may include one or more channels 80, one or more hook portions 82, or the like. The one or more channels 80, the one or more hook portions 82, or the like may mate or engage with, for example, corresponding mateable structure of the rail 18 (see, e.g., mateable structure $\mathbf{142}_M$ of FIG. 26) such that the housing 78, cam actuator 48, and pinch roller arm 46 may also be slidably-connected to and supported by the rail 18. As a result of the one or more channels 80 and/or the one or more hook portions 82 of housing 78 being configured to slidably-engage the mateable structure $\mathbf{142}_M$ of the rail 18, the one or more pinch roller arms 46 may be configured to be slidably-adjustable according to the direction of the arrows X, X' of the three dimensional X-Y-Z Cartesian coordinate system. In this way, one or more of the pinch-roller arms 46 may be adjusted (according to the direction of the arrows X, X' of the three dimensional X-Y-Z Cartesian coordinate system) relative the rail 18 and the rod portion 56 in order in order to accommodate a variety of workpiece geometries that may be defined by different width $W_W$ dimensions.

In some implementations, with reference to FIG. 1, the crafting apparatus 10 may include: (1) a first pinch roller arm 46 and a corresponding housing 78 arranged near or adjacent the first rail support member 34*a*; and (2) a second pinch roller arm 46 and housing 78 arranged near or adjacent the second rail support member 34*b*. The housing 78 of the second pinch roller arm 46 may also include a window 79 (as seen at, e.g., FIGS. 1, 2, 13A-13C, 15, 23, and 24) that permits a user to see some of the rod portion 56 that may otherwise be obscured by the housing 78. In some implementations, both of the pinch roller arms 46 (and corresponding housings 78) are not slidably-adjustable according to the direction of the arrows X, X' of the three dimensional X-Y-Z Cartesian coordinate system. In other implementations: (1) one of the pinch roller arm 46 of the pair of pinch roller arms 46 (e.g., the first pinch roller arm 46 and corresponding housing 78 arranged near or adjacent the first rail support member 34*a*) is not slidably-adjustable according to the direction of the arrows X, X' of the three dimensional X-Y-Z Cartesian coordinate system; while (2) the other pinch roller arm 46 (e.g., the second pinch roller arm 46 and corresponding housing 78 arranged near or adjacent the second rail support member 34*b*) of the pair of pinch roller arms 46 is slidably-adjustable according to the direction of the arrows X, X'. In yet other implementations, both of the pinch roller arms 46 and corresponding housings 78 are slidably-adjustable according to the direction of the arrows X, X' of the three dimensional X-Y-Z Cartesian coordinate system. In some instances, when, for example, the second pinch roller arm 46 that may be arranged near or adjacent the second rail support member 34*b* is slidable, a user may slidably-adjust the second pinch roller arm 46 relative the rod portion 56 until, for example, the user sees a pinch roller arm adjustment indicator (see, e.g., one of, for example, a first marker $\mathbf{56}_{M1}$ or a second marker $\mathbf{56}_{M2}$ arranged upon the rod portion 56 at, for example, FIGS. 13A-13C and 24) within the window 79 of the housing 78. As seen at, for example, FIGS. 13A-13C and 24, when the user can see the pinch roller arm adjustment indicator $\mathbf{56}_{M1}$, $\mathbf{56}_{M2}$ within the window 79 of the housing 78, the user may intuitively know that, for example, the second pinch roller arm 46 is sufficiently slidably-moved relative the rod portion 56 to an acceptable position.

Because the passive roller 58 of the pinch roller arm 46 cooperates with the active drive roller 60 to cause movement of the workpiece W in the Y, Y' feed directions, any slidable-adjustment of the pinch roller arms 46 according to the direction of the arrows X, X' of the three dimensional X-Y-Z Cartesian coordinate system as described above may also result in a corresponding alignment with an active drive roller. With reference to FIGS. 2, 4, 6, 10, 13A, 15, 16, and 23, an intermediate active drive roller is shown generally at 84. With reference to FIG. 10, like the active drive roller 60, the intermediate active drive roller 84 may be arranged within an opening 62 formed in the intermediate portion $\mathbf{34}_I$ of the working surface 34. Furthermore, the intermediate active drive roller 84 may be arranged within the opening 62 and slightly above the intermediate portion $\mathbf{34}_I$ of the working surface 34 at a distance $D_{84}$ such that the intermediate drive roller 84 is permitted to engage a bottom surface $W_B$ (see, e.g., FIGS. 7-8) of the workpiece W in order to drive movement of the workpiece W in the Y, Y' feed directions. Furthermore, like the active drive roller 60, the intermediate active drive roller 84 may be connected to a motor (e.g., similar to the motor 64 as seen at FIGS. 7-8) in order to be actively rotated in one of a first direction (e.g., similar to the direction R as seen at FIGS. 7-8) or an opposite second direction (e.g., similar to the direction R' as seen at FIGS. 7-8) in order to cause movement of the workpiece W in the Y, Y' feed directions.

While each pinch roller arm 46 of the pair of pinch roller arms 46 may be respectively arranged proximate the first rail support member 34*a* and the second rail support member 34*b* such that the respective passive rollers 58 of the pinch roller arms 46 cooperate with respective active drive rollers 60, the intermediate active drive roller 84 may, in some circumstances, not be similarly engaged with a passive roller that would otherwise result in the workpiece W being pinched (as seen at, e.g., FIG. 8). Accordingly, even though the intermediate drive roller 84 may not be aligned with a passive roller 58 of the one or more pinch roller arms 46, the intermediate drive roller 84 may be actuated in order to assist the active drive roller 60 in causing movement of the workpiece W in the Y, Y' feed directions.

With reference to FIG. 10, in some configurations, any of the passive or active rollers 58, 60, 84 may include a frictional surface geometry that improves frictional contact when engaged with a workpiece W. The frictional surface geometry of the rollers 58, 60, 84 may assist in managing larger, heavier workpieces W (including, for example, workpieces W with plastic backing layers and/or workpieces W having a width $W_W$ that is wider than about twelve inches (12"/30.5 centimeters), which may therefore need higher pinch forces applied by the rollers 58, 60, 84 in order to maintain drive movement of the workpiece W in the Y, Y' feed directions and tracking of workpieces W without slipping. As seen at FIG. 10, in some implementations, any of the rollers 58, 60, 84 may include a knurled surface, which may be defined by a plurality of pyramidal protrusions. The machined, pyramidal shape of each protrusion provides a sturdy, robust topography that withstands the cyclical loading and high pressures required for managing large form workpieces W during operation of the crafting apparatus 10.

With reference to FIG. 1, the crafting apparatus 10 may include one or more additional workpiece management components 86 that prevent the workpiece W from sliding off of the angled $\theta_{22}$ working surface 34 as a result of a gravitational pull according to arrow G (see also, e.g., FIGS. 3, 7-8, and 17) on the workpiece W. As seen at FIG. 1, the one or more additional workpiece management components 86 may be arranged at or proximate the downstream portion $\mathbf{34}_D$ of the working surface 34. Functionally, the one or more additional workpiece management components 86 may improve positioning of the workpiece W as it is moved in the Y, Y' feed directions.

Figure 11:
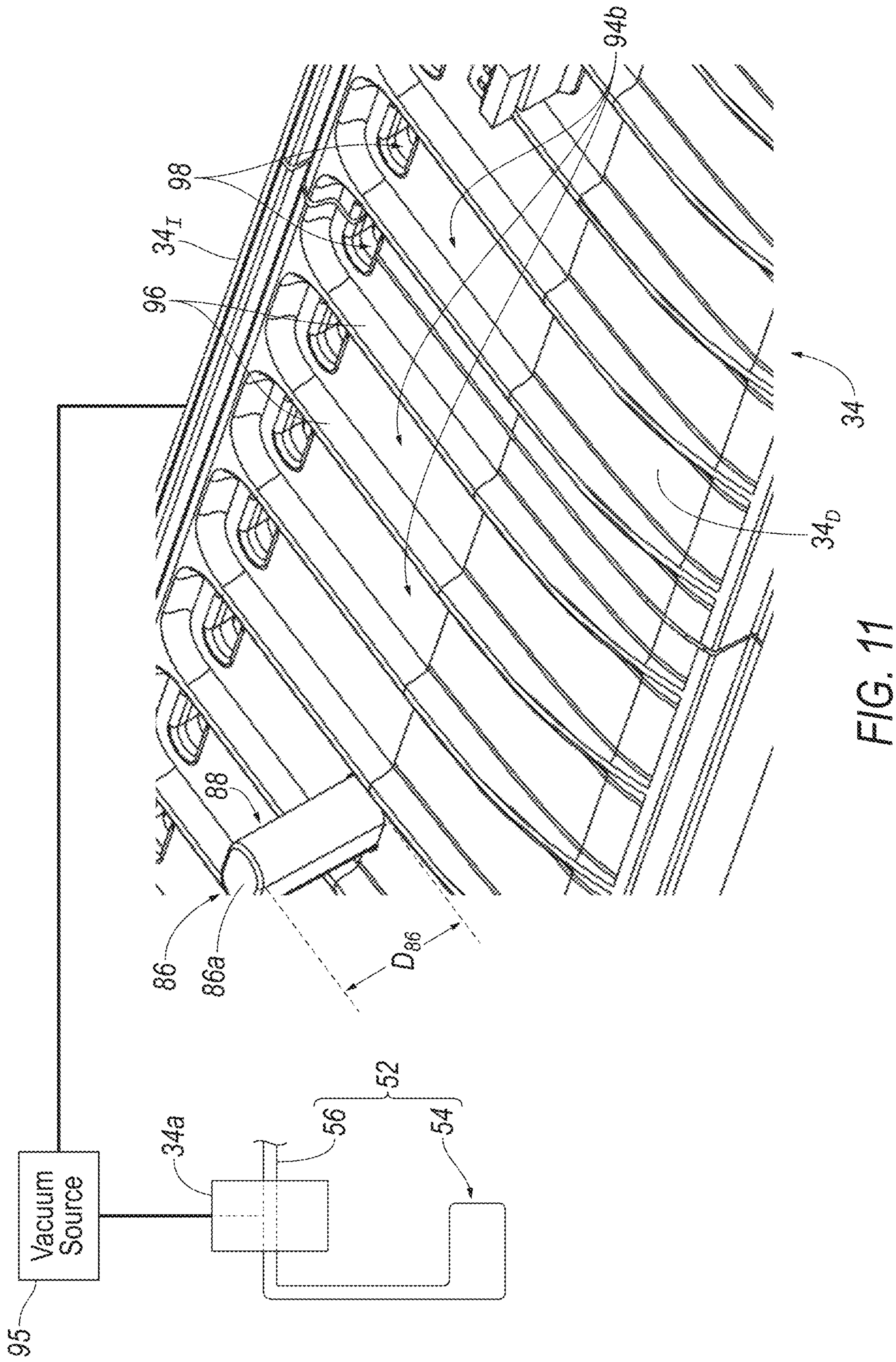
FIG. 11 is an enlarged view of a portion of a downstream region of the working surface of the crafting apparatus illustrating a portion of a plurality of downstream suction channels and a workpiece stopper of a plurality of workpiece stoppers.

In some configurations, the workpiece management components 86 may include one or more workpiece stoppers. The one or more workpiece stoppers 86 may be arranged at or proximate the downstream portion $\mathbf{34}_D$ of the working surface 34 for arrangement in one of two orientations: (1) as seen at, for example FIG. 7, an up or deployed orientation; and (2) as seen at, for example, FIG. 8, a down or stowed orientation. As seen at FIGS. 1, 2, 8, and 13A, when the one or more workpiece stoppers 86 are arranged in the down or stowed orientation, a top surface (see, e.g., top surface 86*a* of a workpiece stopper 86 at FIGS. 7-8 and 11) is substantially flush with the working surface 34. Conversely, as seen at FIGS. 4, 6, 11, 15, 16, 23, when the one or more workpiece stoppers 86 are arranged in the up or deployed orientation according to the Z direction of the three dimensional X-Y-Z Cartesian coordinate system, the top surface 86*a* of a workpiece stopper 86 is arranged at a distance $D_{86}$ (see, e.g., FIG. 11) away from the working surface 34, thereby exposing a body portion 88 of the workpiece stopper 86. Furthermore, as seen at FIG. 11, the one or more workpiece stoppers 86 may be arranged raised walls 96 that define one of the suction channels of the plurality of workpiece suction channels 94*b* formed by the downstream portion $34_D$ of the working surface 34, which will be described in the following disclosure.

With reference to FIGS. 7-8, in some configurations, each workpiece stopper 86 may be selectively raised and lowered as described above in response to movement of another component of the crafting apparatus 10. The selective raising and lowering of the one or more workpiece stoppers 86 may occur in response to, for example, depression of a support arm deployment button (see, e.g., button 126 at FIGS. 1-2, 4, 13A-13C, 15, and 23-24). As described in greater detail below, the support arm deployment button 126 may, according to various embodiments, be coupled to a stopper linkage structure 90 (see, e.g., FIGS. 18 and 19). As seen at FIGS. 7-8, the stopper linkage structure 90 may be located, for example, under the working surface 34. In various embodiments, depression of the support arm deployment button 126 may be permitted in response to, for example, the actuator lever 52 being in the "up" orientation. Said differently, with the actuator lever 52 in the "down" orientation, the support arm deployment button 126 is not depressible, but movement of the actuator lever 52 from the "down" orientation to the "up" orientation may "unlock" the support arm deployment button 126, thus enabling the support arm deployment button 126 to be depressed by a user, according to various embodiments. Accordingly, selective raising of the one or more workpiece stoppers 86 may be triggered in response to manual user depression of the support arm deployment button 126. In alternative embodiments, however, the stopper linkage structure 90 may be connected to the rod portion 56 of the actuator lever 52 such that upon rotation of the handle portion 54, a corresponding rotation imparted to the rod portion 56 will, in turn, actuate the stopper linkage structure 90.

Accordingly, as seen at FIG. 7, when the handle portion 54 is arranged in the up or deployed orientation, depression of the support arm deployment button 126 causes the stopper linkage structure 90 to urge the one or more workpiece stoppers 86 in the Z direction of the three dimensional X-Y-Z Cartesian coordinate system such that the top surfaces 86*a* of the one or more workpiece stoppers 86 are arranged at the distance $D_{86}$ away from the working surface 34, thereby exposing the body portions 88 of the one or more workpiece stoppers 86. To reverse the deployment of the workpiece stoppers 86, as seen at FIG. 8, rotation of the handle portion 54 from the "up" position to the "down" position may cause the stopper linkage structure 90 to retract the one or more workpiece stoppers 86 in the Z' direction of the three dimensional X-Y-Z Cartesian coordinate system such that: (1) the top surfaces 86*a* of the one or more workpiece stoppers 86 are aligned with the working surface 34; and (2) the body portions 88 of the one or more workpiece stoppers 86 are arranged below the working surface 34. In various embodiments, actuation of the stopper linkage structure 90 in this manner (by pivoting the actuator lever 52 from the "up" position to the "down" position) also results in the support arm deployment button 126 relocking (i.e., being no longer being depressible). Thus, to summarize, transitioning the actuator lever 52 from the "down" position to the "up" position may not automatically deploy/raise the workpiece stoppers 86, but may instead unlock the support arm deployment button 126 so it is depressible, thereby enabling subsequent depression of the support arm deployment button 126 to trigger deployment/raising of the workpiece stoppers 86. However, transitioning the actuator lever 52 from the "up" position to the "down" position may automatically stow/lower the workpiece stoppers 86 (while also relocking the support arm deployment button 126). Additional details pertaining to the support arm deployment button 126 are included below.

When arranged in the up or deployed orientation as seen at FIG. 7 and at FIGS. 4, 6, 11, 15, 16, 23, when the workpiece W that is initially fed onto the working surface 34 in a direction from the upstream portion $34_U$ of the working surface 34 toward the downstream portion $34_D$ of the working surface 34, the workpiece may be fed in the Y feed direction. When rolled workpiece material is utilized (i.e., when the workpiece W is reeled from the roll of workpiece material $W_R$), the workpiece stoppers 86 may not be needed or warranted, as the mass of the roll of workpiece material $W_R$ prevents the workpiece W from sliding down and off the working surface 34. However, the workpiece stoppers 86 may still be selectively deployed to provide a target feed position of the workpiece. That is, a leading edge of the workpiece W may be fed across the working surface 34 until it contacts the body portions 88 of the one or more workpiece stoppers 86. Contact of the leading edge of the workpiece W with the body portions 88 of the one or more workpiece stoppers 86 may ensure precise and repeatable loading of workpieces W.

Furthermore, as seen at FIG. 7, because the working surface 34 is arranged at an angle (i.e., at the acute angle $\theta_{22}$) relative to, for example, the upper surface $S_U$ of the support member S, when the one or more workpiece stoppers 86 are arranged in the up or deployed orientation, and when the workpiece W has a substantially flat, preconfigured shape $W_L$, $W_W$ that may be supported by a support mat $W_M$ (i.e., when the workpiece is not a rolled material as seen at, e.g., FIG. 24), the body portions 88 of the one or more workpiece stoppers 86 prevent the workpiece W from sliding off the working surface 34 as a result of a gravitational pull according to arrow G (see also, e.g., FIGS. 1, 3, 8, and 17) on the workpiece W whereby the working surface 34 would otherwise undesirably function as a workpiece slide. That is, the leading edge of the workpiece W may be arranged adjacent (e.g., abutting or resting against) the body portions 88 of the one or more workpiece stoppers 86, with reference to FIG. 8.

With the workpiece W properly fed/loaded, the user may rotate the handle portion 54 to the down orientation, which may simultaneously cause: (1) the stopper linkage structure 90 to retract the one or more workpiece stoppers 86 in the Z' direction of the three dimensional X-Y-Z Cartesian coordinate system (if the workpiece stoppers 86 were selectively deployed via depression of the support arm deployment button 126); and (2) the cam actuator 48 to cause the one or more pinch roller arms 46 to be moved in the direction according to arrow Z' of the three dimensional X-Y-Z Cartesian coordinate system toward the active drive roller 60 for causing the passive rollers 58 of the pinch roller arms 46 and the active drive roller 60 to apply a pinching force to workpiece W according to the direction of the arrow Z' of the three dimensional X-Y-Z Cartesian coordinate system. Because the opposing sides of the workpiece W are pinched by the rollers 58, 60 during and after retraction of the one or more workpiece stoppers 86, the rollers 58, 60 then take on the function of the one or more workpiece stoppers 86 by preventing the workpiece W from sliding off of the angled $\theta_{22}$ working surface 34 as a result of the pinching force applied to workpiece W according to the direction of the arrow Z' of the three dimensional X-Y-Z Cartesian coordinate system. Yet even further, with the one or more workpiece stoppers 86 being retracted below the working surface 34, the rollers 58, 60 may freely move the workpiece in the Y, Y' feed directions for conducting "work" on the workpiece W. The number, shape, spacing, and dimensions of the one or more workpiece stoppers 86 may vary in one or more embodiments of the crafting apparatus 10 while still performing the advantageous functions noted above.

Figure 15:
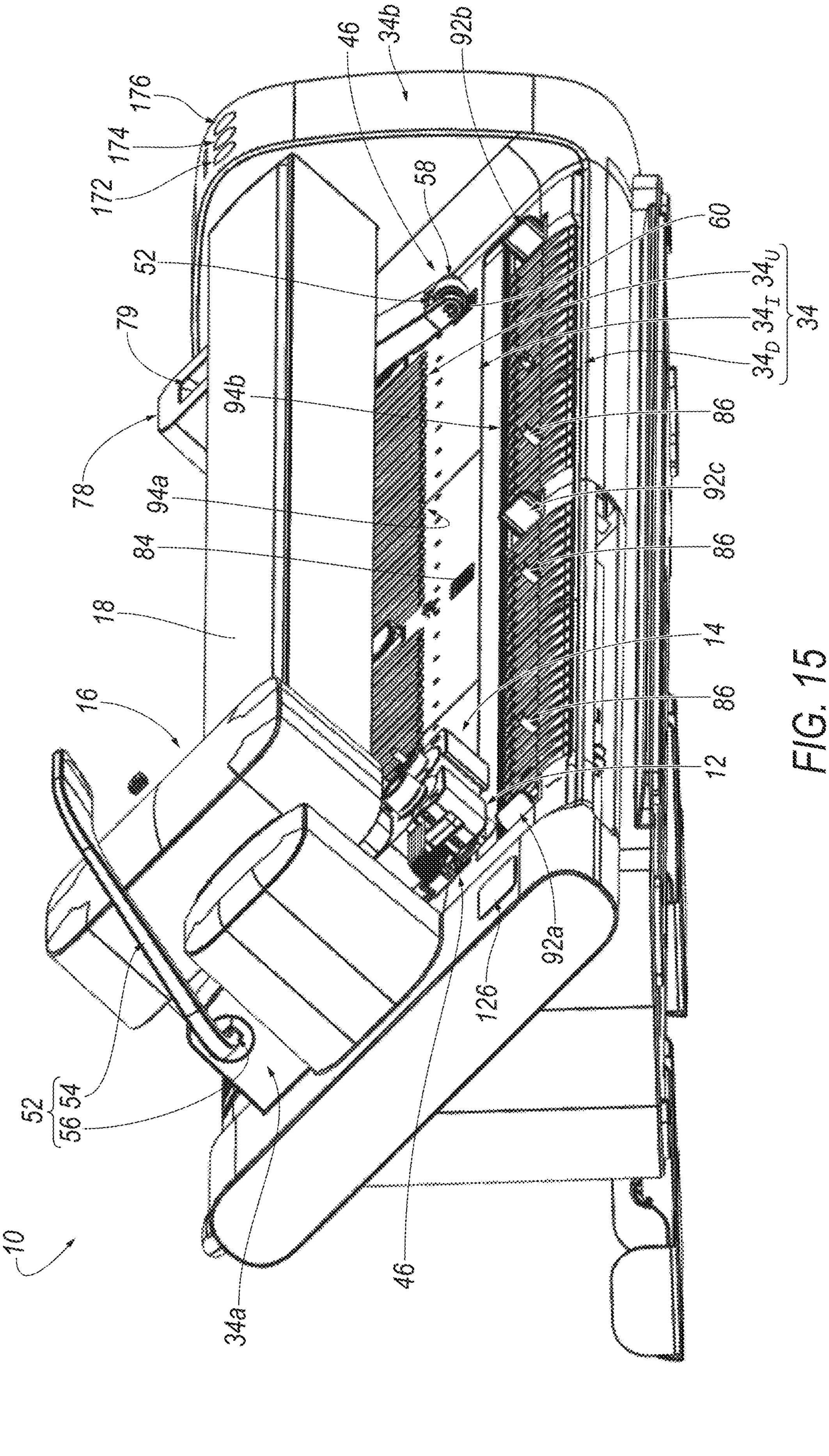
FIG. 15 is a front, left side, top perspective view of the crafting apparatus of FIG. 1 including: the pinch roller actuator lever arranged in the up or disengaged orientation; the plurality of workpiece stoppers of FIG. 11 arranged in an up or deployed orientation; and a plurality of workpiece material guides arranged in an up or deployed orientation.
Figure 16:
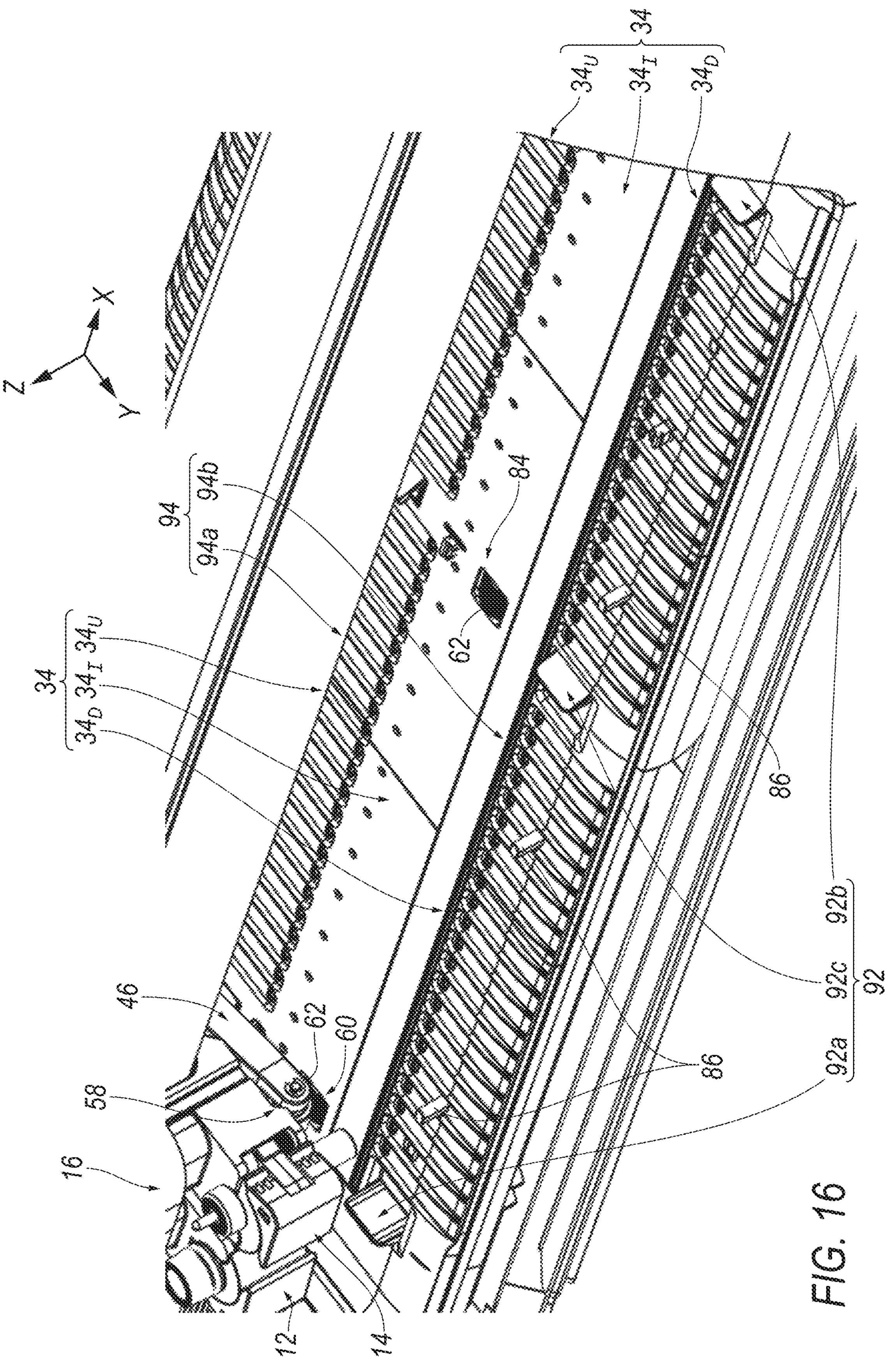
FIG. 16 is an enlarged view of the working surface of the crafting apparatus of FIG. 15.

With reference to FIG. 16, in other configurations, the workpiece management components may include a plurality of material guides 92 that may be selectively raised and lowered in order to accommodate various widths $W_W$ of workpieces W. As seen at FIGS. 1-2, 4, 6, 13A-13C, 15-16, and 23-24, the plurality of material guides 92 may include a first material guide 92*a*, a second material guide 92*b*, and a third material guide 92*c*.

As seen at FIGS. 13A, 15, and 16, the plurality of material guides 92 may include three material guides, which can each be raised or lowered from the working surface 34. Referring to FIG. 16, the three material guides 92 may include a first material guide 92*a* (that may be arranged proximate the first rail support member 34*a*), a second material guide 92*b* (that may be arranged proximate the second rail support member 34*b*), and a third, middle, or intermediate material guide 92*c* arranged between or in the middle of the first material guide 92*a* and the second material guide 92*b*. Furthermore, as seen at FIG. 16, the intermediate material guide 92*c* may be aligned with the intermediate active drive roller 84 in the Y, Y' feed directions of the three dimensional X-Y-Z Cartesian coordinate system.

In some instances, a user may manually configure which of the three material guides 92*a*, 92*b*, 92*c* may be raised or lowered relative the working surface 34. When manually arranged in the raised orientation by a user, the one or more material guides 92*a*-92*c* that are arranged in an up or raised orientation may remain in the up or raised orientation when the crafting apparatus 10 conducts “work” on the workpiece W so that, as seen at, for example, FIGS. 13B-13C and 24, opposing edges of the workpiece W are physically bounded by at least two material guides (see, e.g., the first material guide 92*a* and the second material guide 92*b*) of the one or more material guides 92; as a result, alignment of workpiece W is maintained during movement of the workpiece in the Y, Y' feed directions.

With reference to FIG. 13B, in an example, the first material guide 92*a* and the second material guide 92*b* may arranged in the up or raised orientation while the intermediate material guide 92*c* is arranged in a down or lowered orientation so that a “wider” workpiece W can be guided by the two outermost material guides defined by the first material guide 92*a* arranged proximate the first rail support member 34*a* and the second material guide 92*b* arranged proximate the second rail support member 34*b*. Alternatively, in other configurations, the first material guide 92*a* arranged proximate the first rail support member 34*a* and the intermediate material guide 92*c* may be may be arranged in the up or raised orientation (while the second material guide 92*b* arranged proximate the second rail support member 34*b* is arranged in the down or lowered orientation) so that a “narrower” width workpiece W can be guided by one of the outermost material guides (i.e., the first material guide 92*a*) and the intermediate material guide 92*c*; in such an exemplary configuration, the pinch roller arms 46 arranged proximate the second rail support member 34*b* may be slidably-adjusted according to the direction of the arrow X' of the three dimensional X-Y-Z Cartesian coordinate system in order to substantially align the passive roller 58 of the slidably-adjusted pinch roller arm 46 with the intermediate active drive roller 84. Accordingly, the passive roller 58 of the slidably-adjusted pinch roller arm 46 with the intermediate active drive roller 84 may pinch an outer edge of the workpiece W and contribute to causing movement of the workpiece W in the Y, Y' feed directions of the three dimensional X-Y-Z Cartesian coordinate system while the intermediate material guide 92*c* guides the outer edge of the workpiece W that is arranged proximate the passive roller 58 of the slidably-adjusted pinch roller arm 46 with the intermediate active drive roller 84.

Referring to FIG. 16, in other configurations, the workpiece management components may include a plurality of workpiece suction channels 94 formed by the working surface 34. As seen at FIG. 16, the plurality of workpiece suction channels 94 may include a first plurality of workpiece suction channels 94*a* and a second plurality of workpiece suction channels 94*b*. The first plurality of workpiece suction channels 94*a* and the second plurality of workpiece suction channels 94*b* are also seen at FIGS. 1-2, 4, 6, 13A, 15, and 23.

Figure 12:
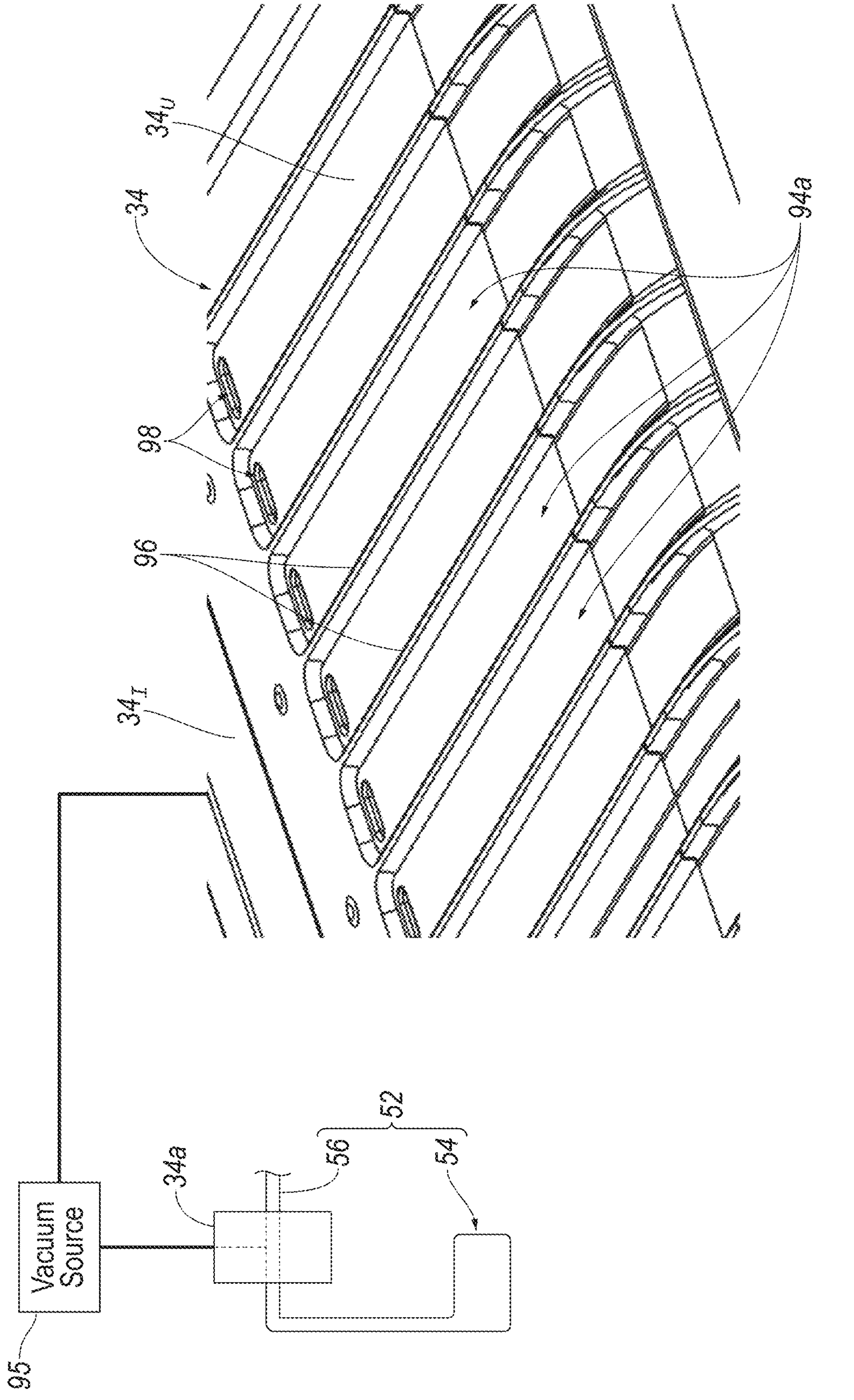
FIG. 12 is an enlarged view of a portion of an upstream region of the working surface of the crafting apparatus illustrating a portion of a plurality of upstream suction channels.

With reference to FIGS. 11-12 and 16, the first plurality of workpiece suction channels 94*a* (see, e.g., FIG. 12) may be formed by the upstream portion $\mathbf{34}_U$ of the working surface 34. The second plurality of workpiece suction channels 94*b* (see, e.g., FIG. 11) may be formed by the downstream portion $\mathbf{34}_D$ of the working surface 34. In some configurations, as seen at FIGS. 1 and 11-12, the intermediate portion $\mathbf{34}_I$ of the working surface 34 does not include workpiece suction channels 94.

As seen at FIGS. 11-12 and 16, each workpiece suction channel 94*a*, 94*b* of the plurality of workpiece suction channels 94 includes raised walls 96 on either side thereof with an opening 98 near or at an end thereof. As seen at FIGS. 11-12, the crafting apparatus 10 may include a vacuum source 95 that may be arranged below the working surface 34 and contained within, for example, the base portion 20. The vacuum source 95 may be activated in response to the handle portion 54 being arranged in the down orientation, and/or the vacuum source 95 may be actuated in response to a control signal from the CPU 3000. For example, and as described in greater detail below, suction via the suction channels 94A, 94*b* may be controlled via the CPU 3000 in response to a user initiating performance of “work” on the workpiece W. As described above and as generally seen at FIGS. 11-12, the handle portion 54 is connected to the rod portion 56 of the actuator lever 52 such that upon rotation of the handle portion 54, a corresponding rotation is imparted to the rod portion 56; the rod portion may be connected to an actuator of the vacuum source 95. Upon the vacuum source 95 being actuated or turned on, the vacuum source 95 draws air into the opening 98 of each workpiece suction channel 96, which is subsequently evacuated out of one or more openings 99 (see, e.g., FIG. 6) formed by the lower surface 24 of the base portion 20 of the crafting apparatus 10.

During operation, when the bottom surface $W_B$ (see, e.g., FIGS. 7-8) of the workpiece W rests upon the raised walls 96, air is drawn out of each workpiece suction channel 94*a*, 94*b* of the plurality of workpiece suction channels 94 and into each opening 98 by the vacuum source 95. Accordingly, when the workpiece W is arranged over the plurality of workpiece suction channels 94, air is evacuated therefrom and into the openings 98. The velocity of the air relative to the flow of the air, or lack thereof, at a top surface $W_T$ (see, e.g., FIGS. 7-8) above the workpiece W creates a pressure difference that urges the bottom surface $W_B$ of the workpiece W down and onto at least the downstream portion $\mathbf{34}_D$ of the working surface 34 and the upstream portion $\mathbf{34}_U$ of the working surface 34 that includes the plurality of workpiece suction channels 94.

In some configurations, the openings 98 may be arranged at either end of the plurality of workpiece suction channels 94, whether they be workpiece suction channels 94 formed proximate the upstream portion $34_U$ of the working surface 34 or the downstream portion $34_D$ of the working surface 34. The end of the workpiece suction channels 94 at which the openings 98 are disposed determines the direction of airflow through the plurality of workpiece suction channels 94. In at least one embodiment, the direction of airflow through the plurality of workpiece suction channels 94 formed proximate the downstream portion $34_D$ of the working surface 34 shown in FIG. 11 may be the same or different than the direction of airflow through the plurality of workpiece suction channels 94 formed proximate the upstream portion $34_U$ of the working surface 34 as shown in FIG. 12. Additionally, the direction of each set of workpiece suction channels 94 formed by each of the downstream portion $34_D$ of the working surface 34 and the upstream portion $34_U$ of the working surface 34 may be either toward or away from the intermediate portion $34_I$ of the working surface 34 where the carriage 16 that includes the printing device 12 and the cutting device 14 is movably-disposed upon the rail 18.

Advantageously, the plurality of workpiece suction channels 94 formed proximate the downstream portion $34_D$ of the working surface 34 and/or the upstream portion $34_U$ of the working surface 34 are configured to accommodate a variety of workpieces W having different widths $W_W$. For example, as a workpiece W narrows in width $W_W$, more of the workpiece suction channels 94 are uncovered but the remaining covered workpiece suction channels 94 sufficiently urge the workpiece W down onto each of the downstream portion $34_D$ of the working surface 34 and the upstream portion $34_U$ of the working surface 34. In this way, the narrower workpiece W exposes some of the workpiece suction channels 94 but does not proportionally weaken the suction force applied to the bottom surface $W_B$ of the workpiece W.

In some embodiments, an upstream portion $34_U$ of the working surface 34 and/or the downstream portion $34_D$ of working surface 34 is curved such that when the workpiece W is reeled from the roll of workpiece material $W_R$, the reeled workpiece W may lay consistently against the entire area of working surface 34 when the crafting apparatus 10 conducts "work" on the workpiece W. Such curvature may also minimize lateral (according to the direction of the arrows X, X' of the three dimensional X-Y-Z Cartesian coordinate system) bumping or lifting (according to the direction of the arrow Z of the three dimensional X-Y-Z Cartesian coordinate system) of the workpiece W away from working surface 34 when the crafting apparatus 10 conducts "work" on the workpiece W. Referring to FIGS. 3 and 5, the roll of workpiece material $W_R$ may be stowed opposite the rear surface 28 of the base portion 20 of the crafting apparatus 10 such that a length workpiece material may be reeled from the roll of workpiece material $W_R$ (as seen at, e.g., FIGS. 13B-13C) for subsequent interfacing with the upstream edge $34_U$ of working surface 34; thereafter, one or more components (e.g., one or all off the active drive rollers 60 and the intermediate active drive roller 84) of the crafting apparatus 10 may advance the reeled length of the workpiece material from the roll of workpiece material $W_R$ in a direction (i.e., in the Y, Y' feed directions of the three dimensional X-Y-Z Cartesian coordinate system) toward the downstream portion $34_D$ of working surface 34.

As described above, the crafting apparatus 10 may conduct "work" on a workpiece W that is not derived from a roll of workpiece material $W_R$ (e.g., the workpiece W may be defined by a preconfigured shape with fixed dimensions $W_L$, $W_W$ having a predetermined length $W_L$ and a predetermined width $W_W$ as seen at, for example, FIG. 24); furthermore, workpieces W having a preconfigured shape with a predetermined length $W_L$ and a predetermined width $W_W$ may be defined to be a "relatively large" workpiece W by having a width $W_W$ that extends beyond a width (see, e.g., width $W_{34}$ at FIGS. 17 and 24) of the working surface 34 of the working portion 22.

Figure 22:
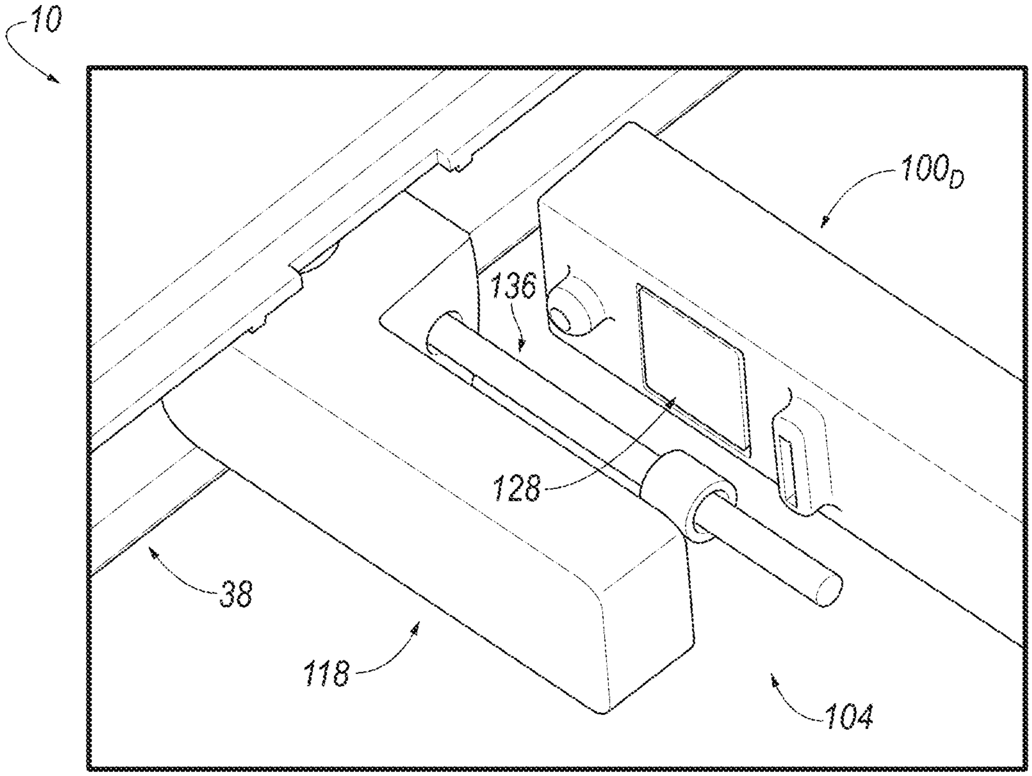
FIG. 22 is a right exploded view of the safety breakaway coupling of FIG. 20.
Figure 23:
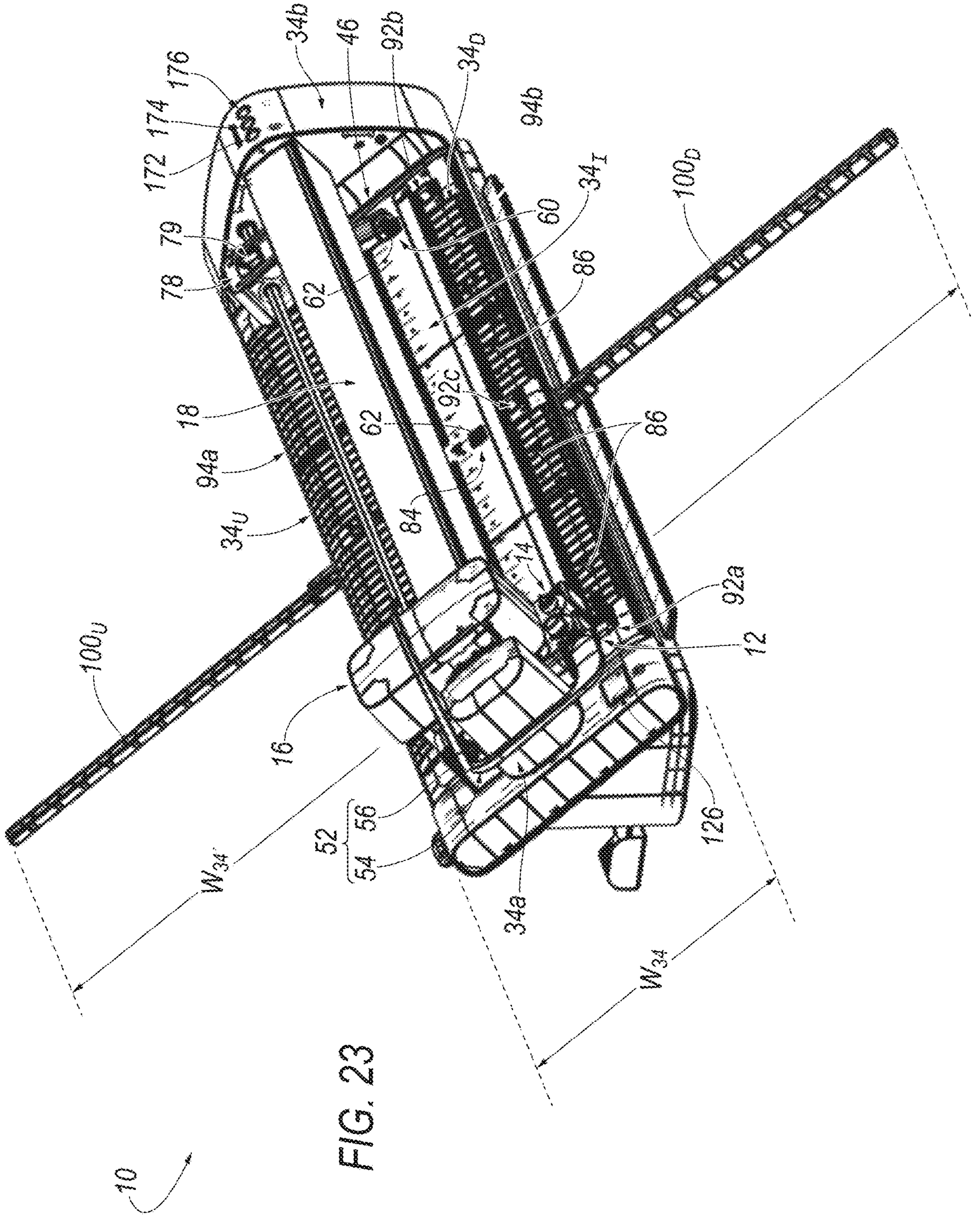
FIG. 23 is another front, left side, top perspective view of the crafting apparatus illustrating: the workpiece support arms arranged in the deployed orientation of FIG. 17; and the pinch roller actuator lever arranged in the down or engaged orientation.

With reference to FIGS. 17 and 23-24, the width $W_{34}$ of the working surface 34 may generally extend between an edge of the downstream portion $34_D$ of the working surface 34 and an edge of the upstream portion $34_U$ of the working surface 34. Accordingly, in such situations when the user elects to interface a "relatively large" workpiece W with the crafting apparatus 10, with reference to FIGS. 17-24, the user may structurally reconfigure the crafting apparatus 10 by deploying one or more support arms (i.e., a downstream support arm $100_D$ and an upstream support arm $100_U$). When the one or more support arms $100_D$, $100_U$ are arranged in a deployed configuration as seen at, for example, FIGS. 17 and 23-24, the width $W_{34}$ of the working surface 34 of the working portion 22 is effectively expanded to an extended width $W_{34}'$ (that may be greater than, for example, the width $S_W$ of the support member S as seen at FIG. 17) in order to provide supplementary support for the "relatively large" workpiece W as the "relatively large" workpiece W is moved in the Y, Y' feed directions of the three dimensional X-Y-Z Cartesian coordinate system as seen at FIG. 24 and extends beyond the edge of the downstream portion $34_D$ of the working surface 34 and the edge of the upstream portion $34_U$ of the working surface 34.

Referring to FIG. 17, the one or more support arms $100_D$, $100_U$ are aligned with the working surface 34, and, like the working surface 34, the one or more support arms $100_D$, $100_U$ are substantially arranged at the at the acute angle $\theta_{22}$. When arranged in the deployed orientation, the one or more support arms $100_D$, $100_U$: (1) provides support for the "relatively large" workpiece W beyond the edge of the downstream portion $34_D$ of the working surface 34 and the edge of the upstream portion $34_U$ of the working surface 34 as seen at, for example, FIG. 24; and (2) minimizes the bowing up of the "relatively large" workpiece W because of upstream and downstream portions of the "relatively large" workpiece W extend beyond the edge of the downstream portion $34_D$ of the working surface 34 and the edge of the upstream portion $34_U$ of the working surface 34. As a result, because bowing of the "relatively large" workpiece W is minimized, an increased quality of "work" (e.g., cuts and other alterations) conducted on the "relatively large" workpiece W is realized by the crafting apparatus 10.

Figure 18:
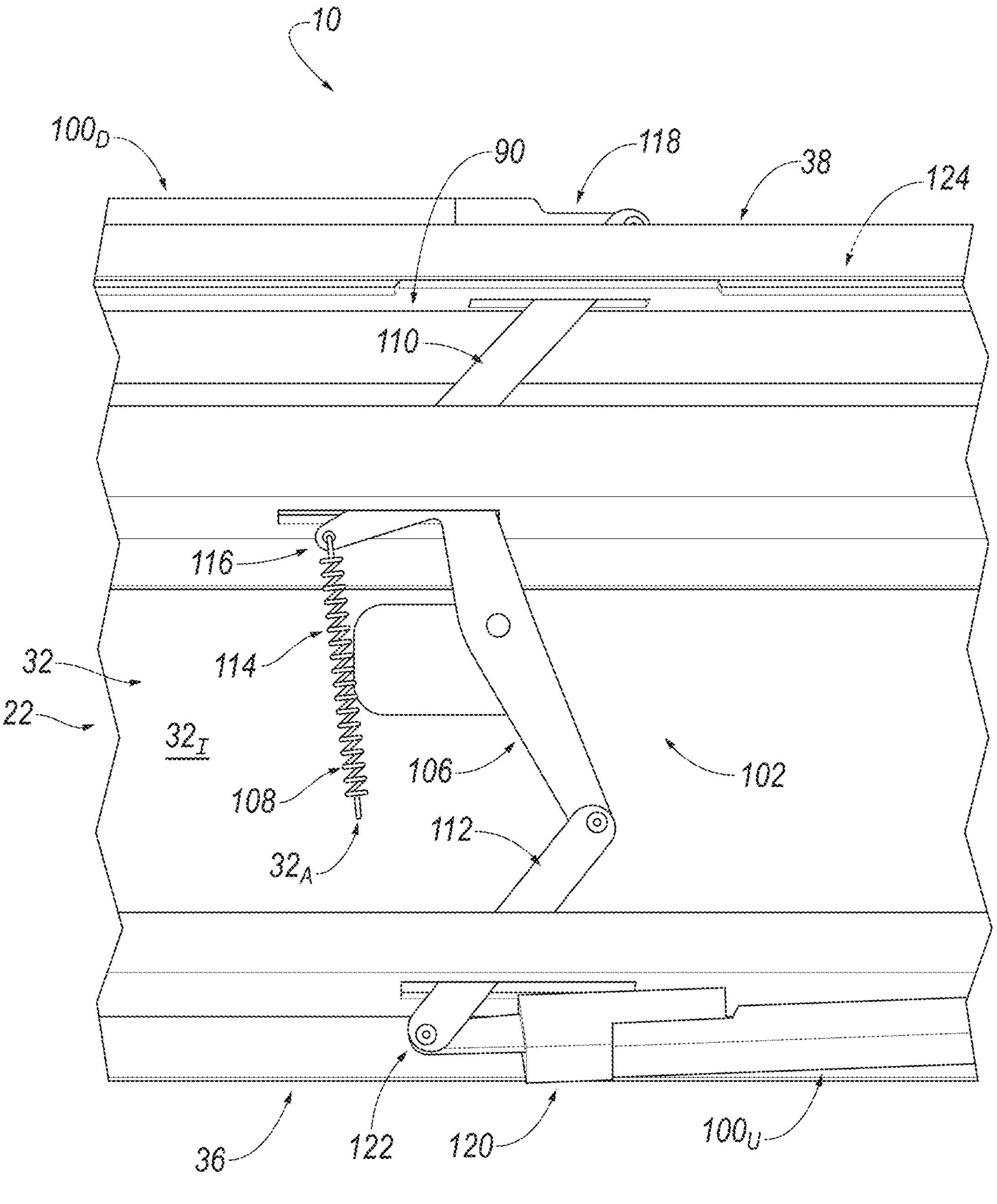
FIG. 18 is a plan view of a rotation mechanism arranged in a first orientation that arranges the one or more workpiece support arms in a stowed orientation.
Figure 19:
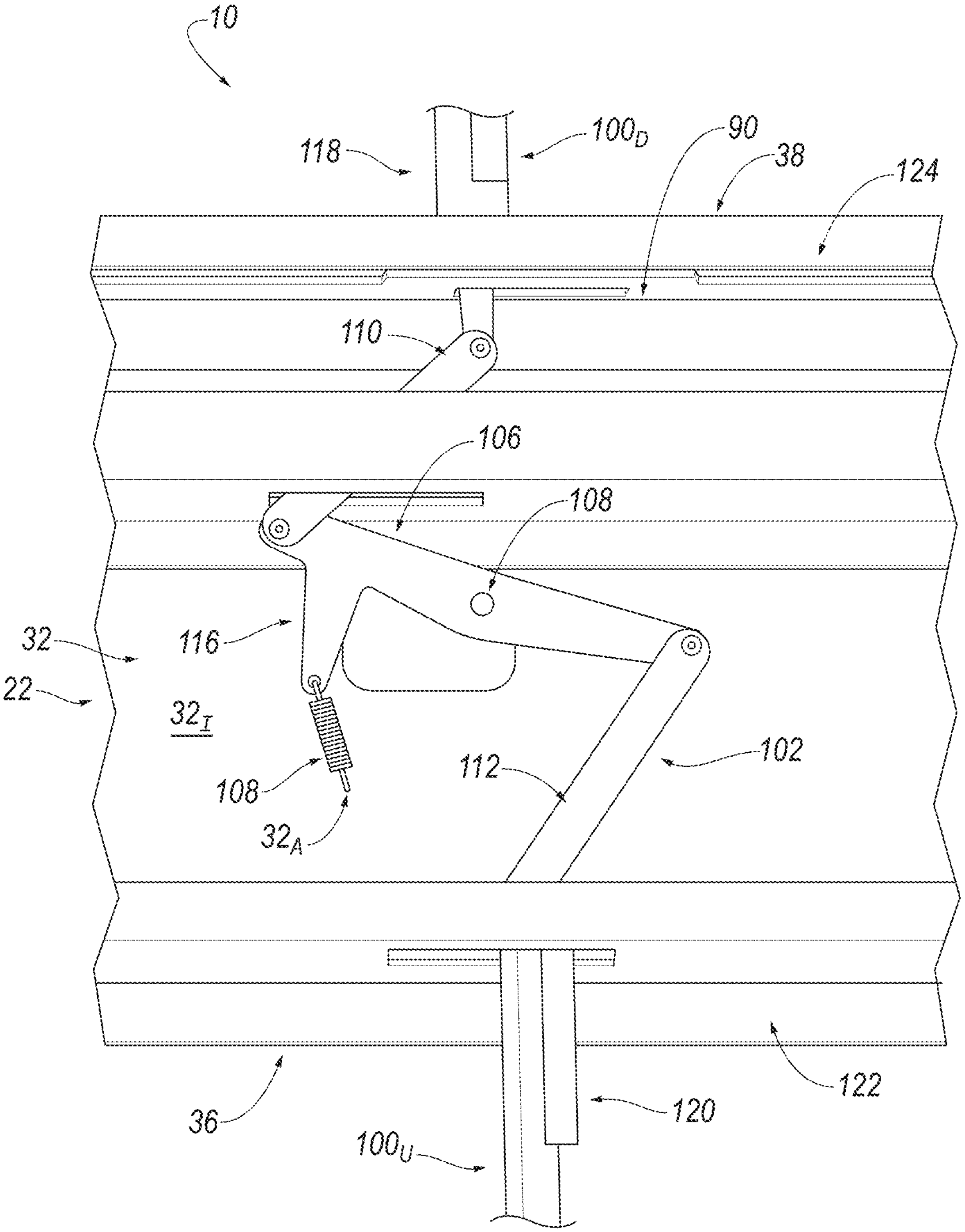
FIG. 19 is a plan view of the rotation mechanism of FIG. 18 arranged in a second orientation that arranges the one or more workpiece support arms in the deployed orientation of FIG. 17.

Referring to FIGS. 18-19, a rotation mechanism 102 for causing movement of the one or more support arms $100_D$, $100_U$ is shown. Furthermore, with reference to FIGS. 20-22, a safety breakaway coupling 104 is shown that permits separation of the one or more support arms $100_D$, $100_U$ from the rotation mechanism 102 in response to objects or users intentionally or unintentionally contacting the one or more support arms $100_D$, $100_U$.

Firstly, with reference to FIGS. 18 and 19, the rotation mechanism 102 includes a substantially "L shaped" pivot bracket 106. The pivot bracket 106 is rotatably-coupled to an interior surface portion $32_I$ of the lower surface 32 of the working portion 22 about a center screw 108 (i.e., the pivot point of the "L shaped" pivot bracket 106). A first end of a downstream linkage member 110 of the rotation mechanism 102 is rotatably-connected to a first end of the pivot bracket 106. A first end of an upstream linkage member 112 of the rotation mechanism 102 is rotatably-connected to a second end of the pivot bracket 106.

The rotation mechanism 102 may also include a coil spring member 114 to bias the pivot bracket 106. A first end of the coil spring member 114 is connected to a distal end of a flange portion 116 of the pivot bracket 106. A second end of the coil spring member 114 is connected to an anchor point $32_A$ the interior surface portion $32_I$ of the lower surface 32 of the working portion 22. A second end of the downstream linkage member 110 is rotatably-connected to a first end of a downstream pivot lever 118. A second end of the upstream linkage member 112 is rotatably-connected to a first end of an upstream pivot lever 120.

With reference to FIG. 18, the rotation mechanism 102 is arranged in a first orientation for selectively-arranging the one or more support arms $100_D$, $100_U$ in a stowed orientation. When arranged in the stowed orientation, the upstream support arm $100_U$ may be arranged substantially adjacent or within a slot or recess 122 formed by the rear surface 36 of the working portion 22. Similarly, when arranged in the stowed orientation, the downstream support arm $100_D$ may be arranged substantially adjacent or within a slot or recess 124 (see also, e.g., the slot or recess 124 at FIG. 4) formed by the front surface 38 of the working portion 22 that is near the edge of the downstream portion $34_D$ of the working surface 34.

In some configurations as seen at FIG. 18, the upstream pivot lever 120 may be intentionally "over-clocked"/over-rotated in order to correspondingly over-clock/over-rotate the upstream support arm $100_U$. As seen at FIGS. 3 and 13A-13C, the one or more support arms $100_D$, $100_U$ may be arranged in the stowed orientation when, for example, the crafting apparatus 10 conducts "work" on a workpiece W that is derived from a roll of workpiece material $W_R$ such that the upstream support arm $100_U$ does not interfere with the workpiece material W as it is guided over the edge of the upstream portion $34_U$ of the working surface 34.

Referring to FIG. 19, the pivot bracket 106 of the rotation mechanism 102 is shown rotated in a counter-clockwise direction (in reference to the orientation of the pivot bracket 106 in FIG. 18), which causes a corresponding rotation to: the downstream linkage member 110; the upstream linkage member 112; the downstream pivot lever 118; and the upstream pivot lever 120. The rotation mechanism 102 may be actuated in response to, for example, depression of a support arm deployment button (see, e.g., button 126 at FIGS. 1-2, 4, 13A-13C, 15, and 23-24). When arranged in the deployed orientation as seen at FIG. 19, the upstream support arm $100_U$ may be arranged away from a slot or recess 122 formed by the rear surface 36 of the working portion 22 such that the upstream support arm $100_U$ is substantially perpendicularly orientated with respect to the rear surface 36 of the working portion 22. Similarly, when arranged in the deployed orientation as seen at FIG. 19, the downstream support arm $100_D$ may be arranged away from a slot or recess 124 formed by the front surface 38 of the working portion 22 such that the downstream support arm $100_D$ is substantially perpendicularly orientated with respect to the front surface 38 of the working portion 22. In various embodiments, the pivoting motion of the one or more support arms $100_D$, $100_U$ occurs within an X-Y plane of the "working" three dimensional X-Y-Z Cartesian coordinate system. Said differently, a plane defined by the pivoting motion of the one or more support arms $100_D$, $100_U$ may be perpendicular to the Z-direction of the "working" three dimensional X-Y-Z Cartesian coordinate system.

As described above, the crafting apparatus 10 is designed to be "door-less" such that a plurality of components (e.g., the printing device 12, the cutting device 14, the carriage 16, and the rail 18) of the crafting apparatus 10 that conduct "work" upon the workpiece W are always exposed to the surrounding environment. Accordingly, in some configurations of the crafting apparatus 10, when the upstream support arm $100_U$ and the downstream support arm $100_D$ are arranged in a stowed orientation (as seen at, e.g., FIGS. 1-6, 13A-13C, and 18) within, respectively, the slot or recess 122 formed by the rear surface 36 of the working portion 22 and the slot or recess 124 formed by the front surface 38 of the working portion 22 (as seen at, e.g., FIG. 18), the plurality of components 12, 14, 16, 18 of the crafting apparatus 10 is permitted to conduct "work" upon the workpiece W; conversely, a crafting apparatus that includes doors would not be able to conduct "work" upon the workpiece W due to the fact that the doors, when arranged in a closed or stowed orientation, would not permit the workpiece W to be moved in the Y, Y' feed directions of the three dimensional X-Y-Z Cartesian coordinate system, which the crafting apparatus 10 permits, as seen at, for example, FIGS. 13A-13C.

Furthermore, as seen at FIGS. 17 and 19-24, when the upstream support arm $100_U$ and the downstream support arm $100_D$ of the "door-less" crafting apparatus 10 are arranged in a deployed orientation away from respectively, the slot or recess 122 formed by the rear surface 36 of the working portion 22 and the slot or recess 124 formed by the front surface 38 of the working portion 22 (as seen at, e.g., FIG. 19), the upstream support arm $100_U$ and the downstream support arm $100_D$ are not arranged parallel to the upper surface $S_U$ of the support member S. Accordingly, when the upstream support arm $100_U$ and the downstream support arm $100_D$ are arranged in a deployed orientation, the width $W_{34}$ of the working surface 34 of the working portion 22 is effectively expanded to the extended width $W_{34}'$ at the acute angle $\theta_{22}$. Because the upstream support arm $100_U$ and the downstream support arm $100_D$ are arranged at the acute angle $\theta_{22}$ with the working surface 34, the downstream support arm $100_D$ is permitted to be arranged at a distance (see, e.g., $D_{100D}$ at FIG. 17) below the upper surface $S_U$ of the support member S (when the front surface 38 of a working portion 22 is arranged near the front edge $S_F$ of the support member S), and the upstream support arm $100_U$ is permitted to be arranged at a distance (see, e.g., $D_{100U}$ at FIG. 17) above the upper surface $S_U$ of the support member S that may define an upper-most portion of the crafting apparatus 10 that is above, at a distance (see, e.g., distance $D_{100}$ at FIG. 17), an upper-most portion of the plurality of components 12, 14, 16, 18 of the crafting apparatus 10 that conduct "work" upon the workpiece W.

Figure 20:
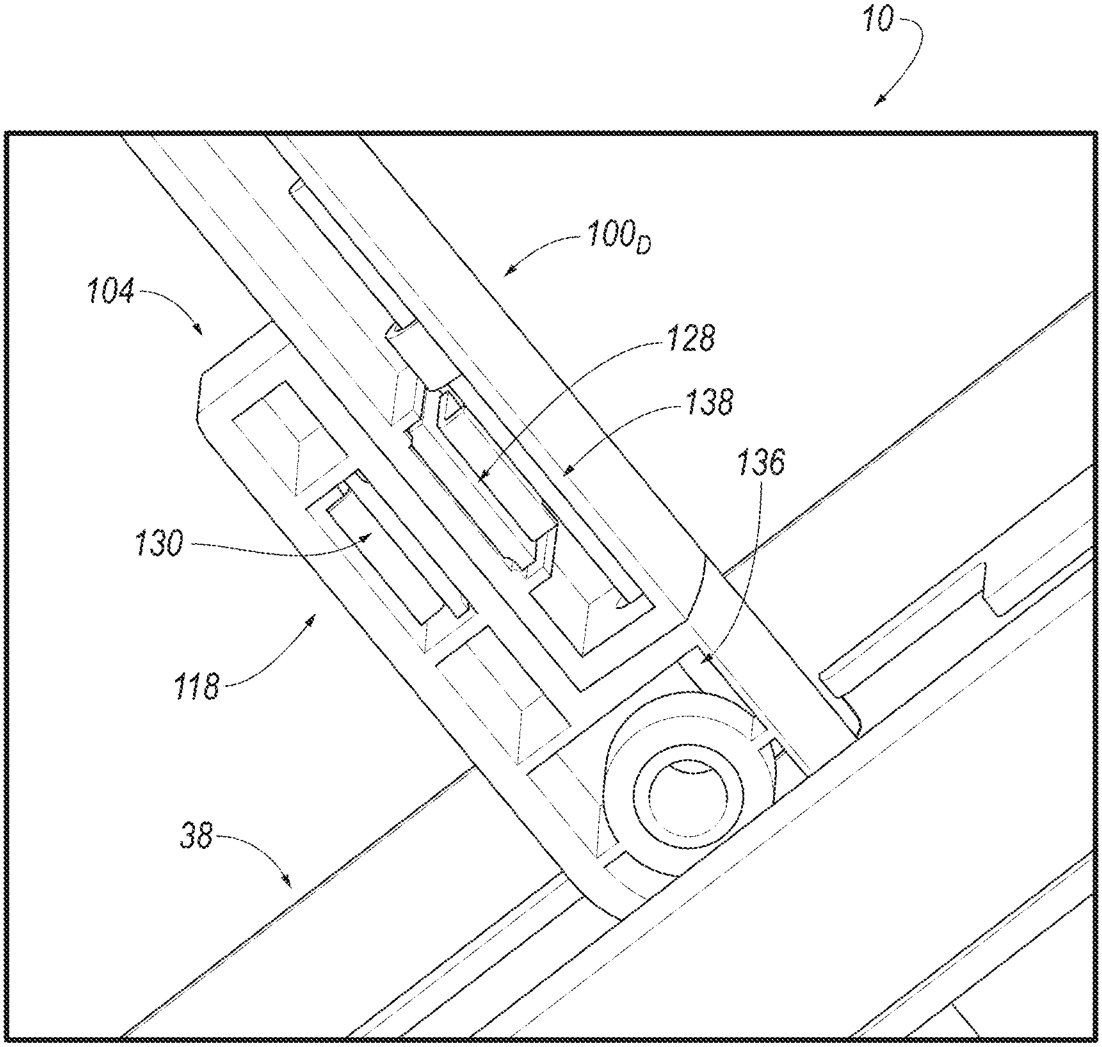
FIG. 20 is a perspective view of a safety breakaway coupling that permits intentional separation of the one or more workpiece support arms from the rotation mechanism of FIGS. 18-19.
Figure 21:
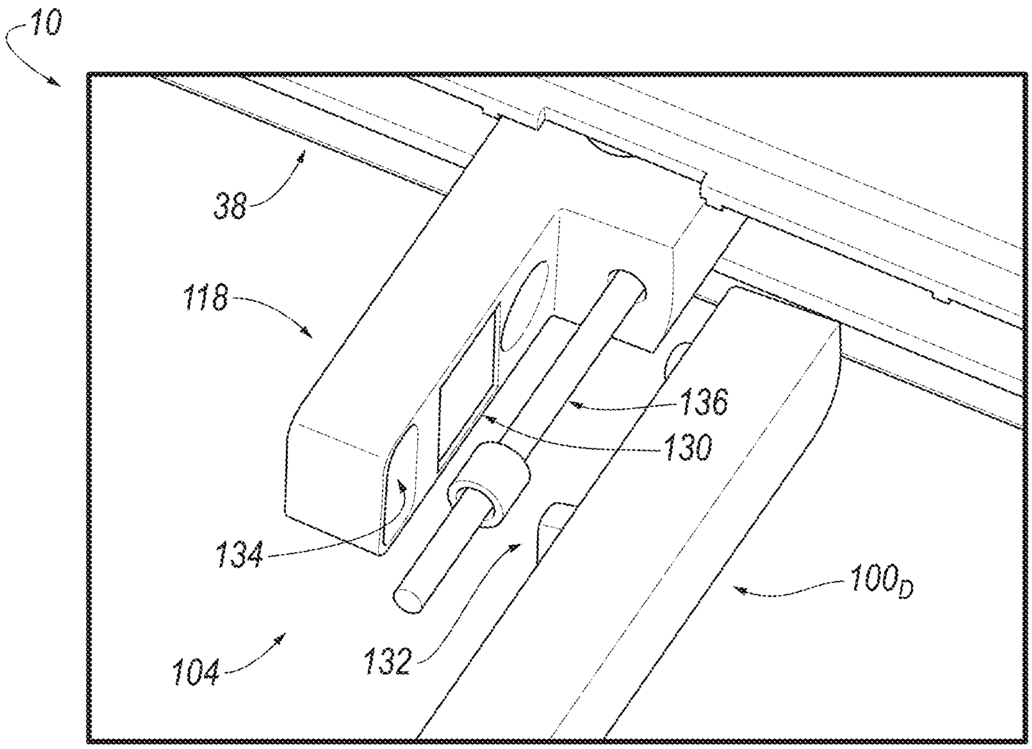
FIG. 21 is a left exploded view of the safety breakaway coupling of FIG. 20.

The safety breakaway coupling 104 is now described at FIGS. 20-22. Although the following disclosure is directed to the safety breakaway coupling 104 of the downstream support arm $100_D$ and the downstream pivot lever 118, the following description similarly applies to the upstream support arm $100_U$ and the upstream pivot lever 120 (i.e., the upstream support arm $100_U$ and the upstream pivot lever 120 may also include similar components for defining another or second safety breakaway coupling 104 of the crafting apparatus 10).

Firstly, with reference to FIG. 20, the downstream support arm $100_D$ and the downstream pivot lever 118 are shown coupled to one another in a break-away configuration. The safety breakaway coupling 104 may include a magnetic coupling whereby: (1) the downstream support arm $100_D$ includes a first magnet 128; and (2) the downstream pivot lever 118 includes a second magnet 130. The first magnet 128 and the second magnet 130 provides a magnetic coupling of the downstream support arm $\mathbf{100}_D$ to the downstream pivot lever 118.

Furthermore, as seen at FIGS. 21 and 22, the safety breakaway coupling 104 may include a friction-fit configuration whereby, for example, the downstream support arm $\mathbf{100}_D$ includes one or more male portions 132 that are received within and frictionally-coupled to one or more female portions 134 formed by the downstream pivot lever 118. Yet even further, as seen at FIGS. 21 and 22, the safety breakaway coupling 104 may include a bungee member 136 that extends from the downstream pivot lever 118 and into a channel 138 (see, e.g., FIG. 20) formed by the downstream support arm $\mathbf{100}_D$ for flexibly-connecting the downstream pivot lever 118 to the downstream support arm $\mathbf{100}_D$ by the bungee member 136.

The safety breakaway coupling 104 functionally mitigates damage to the crafting apparatus 10. With reference to FIGS. 17 and 23-24, if, for example, a user does not notice the deployed configuration of the one or more support arms $\mathbf{100}_D$, $\mathbf{100}_U$ that may extend beyond one or both of the front edge $S_F$ and the rear edge $S_F$ of the support member S and unintentionally walks into or makes forceful contact with the one or more support arms $\mathbf{100}_D$, $\mathbf{100}_U$, the safety breakaway coupling 104 may permit intentionally breaking or separation of the one or more support arms $\mathbf{100}_D$, $\mathbf{100}_U$ from the corresponding pivot lever 118, 120. Accordingly, if, for example, the user inadvertently separates one or both of the downstream support arm $\mathbf{100}_D$ and the upstream support arm $\mathbf{100}_U$ from, respectively, the downstream pivot lever 118 and the upstream pivot lever 120, the user may reconnect one or both of the downstream support arm $\mathbf{100}_D$ and the upstream support arm $\mathbf{100}_U$ from, respectively, the downstream pivot lever 118 and the upstream pivot lever 120 by coupling one or more of: (1) the magnets 128, 130; and (2) the one or more male portions 132 to the one or more female portions 134. The flexible coupling provided by the bungee member 136 may retain the one or more support arms $\mathbf{100}_D$, $\mathbf{100}_U$ loosely coupled to the pivot lever 118, 120 even after the other two coupling features (as seen at, e.g., reference numerals 128, 130 and 132, 134) have been disconnected. That is, the bungee member 136 keeps the one or more support arms $\mathbf{100}_D$, $\mathbf{100}_U$ connected to the crafting apparatus 10 in a non-rigid fashion after a break-away event, thereby preventing the one or more support arms $\mathbf{100}_D$, $\mathbf{100}_U$ from becoming completely disconnected (and potentially lost) from the crafting apparatus 10.

Figure 26:
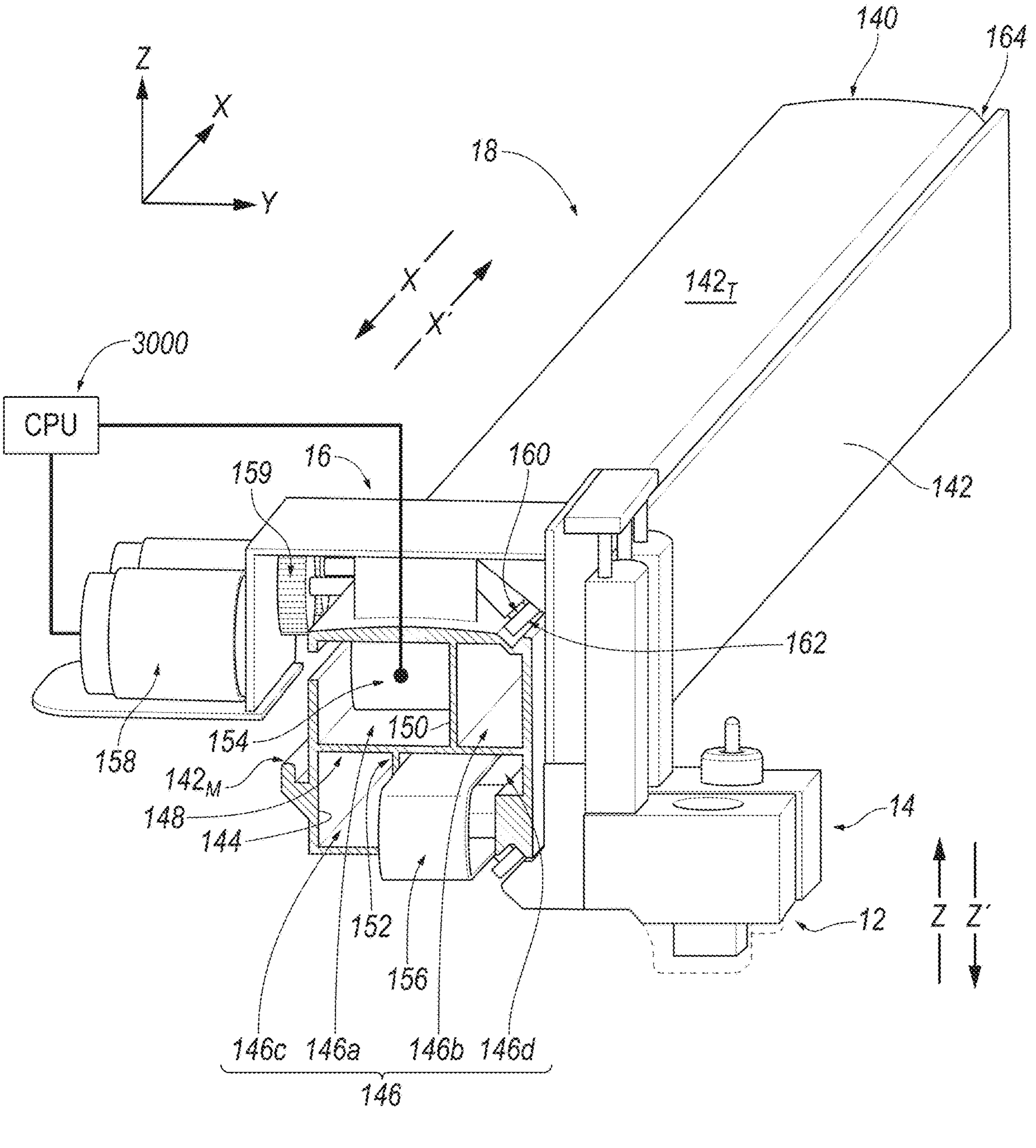
FIG. 26 is a perspective cross-sectional view of a rail and a carriage arranged upon the rail of the crafting apparatus of FIG. 1.

Referring to FIG. 26, a cross-sectional end view of the rail 18 is shown. An exemplary side view of the carriage 16, which includes the printing device 12 and the cutting device 14, is also shown.

As seen at FIG. 26, the rail 18 includes an elongated body member 140 having an outer surface 142 and an inner surface 144. The inner surface 144 defines a cavity 146 extending through the elongated body member 140. One or more portions of the outer surface 142 of the body member 140 of the rail 18 may include mateable structure, which is shown generally at $\mathbf{142}_M$ that is configured to engage, for example, the front surface $\mathbf{78}_F$ (see, e.g., FIGS. 7-8) of the housing 78 that may include the one or more channels 80, the one or more hook portions 82, or the like. As described above, the connection of the front surface $\mathbf{78}_F$ of the housing 78 to the mateable structure $\mathbf{142}_M$ formed by the outer surface 142 of the elongated body member 140 of the rail 18 permits slidable-adjustment of the one or more pinch roller arms 46 relative the rail 18.

In some configurations, a plurality of wall members 148-152 may be arranged within and extend across the cavity 146. The plurality of wall members 148-152 may include horizontal wall member 148, an upper vertical wall member 150, and a lower vertical wall member 152. The horizontal wall member 148 may extend across the cavity 146 and connect a portion of the inner surface 144 defined by a front portion of the elongated body member 140 to another portion of the inner surface 144 defined by a rear portion of the elongated body member 140. The upper vertical wall member 150 may extend from and connect an upper surface of the horizontal wall member 148 to a portion of the inner surface 144 defined by a top portion of the elongated body member 140. The lower vertical wall member 152 may extend from and connect a lower surface of the horizontal wall member 148 to a portion of the inner surface 144 defined by a lower portion of the elongated body member 140.

As a result of the exemplary configuration of the plurality of wall members 148-152 described above and as seen at FIG. 26, the cavity 146 extending through the elongated body member 140 may be defined by a plurality of sub-cavities *146a-146d*. The plurality of sub-cavities *146a-146d* extending through the elongated body member 140 may include a first sub-cavity *146a*, a second sub-cavity *146b*, a third sub-cavity *146c*, and a fourth sub-cavity *146d*.

The first sub-cavity *146a* and the second sub-cavity *146b* may be alternatively referred to as a first upper sub-cavity *146a* and a second upper sub-cavity *146b* as a result of the upper vertical wall member 150 extending from the upper surface of the horizontal wall member 148. The third sub-cavity *146c* and the fourth sub-cavity *146d* may be alternatively referred to as a first lower sub-cavity *146c* and a second lower sub-cavity *146d* as a result of the lower vertical wall member 152 extending away from the lower surface of the horizontal wall member 148.

As seen at FIG. 26, the first upper sub-cavity *146a* is sized for housing a flexible control cable 154 that is connected to the printing device 12, the cutting device 14, and the carriage 16. In some configurations, the second upper sub-cavity *146b* does not house a component, and, therefore, may be alternatively referred to as an upper void cavity. The flexible control cable 154 provides signals from the CPU 3000 to the printing device 12, the cutting device 14, and the carriage 16 in order to cause movement of and/or actuate any of the printing device 12, the cutting device 14, and the carriage 16 for conducting "work" on the workpiece W.

As also seen at FIG. 26, the second lower cavity *146d* is sized for housing a carriage movement belt 156 that is connected to the carriage 16. The crafting apparatus 10 may further include a carriage movement motor configured to drive movement of the carriage via the carriage movement belt 156. The carriage movement motor may be disposed/housed within the working portion (e.g., within one of the rail support members *34a*, *34b*), and may receive signals from the CPU 3000 for driving movement of the carriage movement belt 156 in order to impart movement of the carriage 16 according to the direction of the arrows X, X' of the three dimensional X-Y-Z Cartesian coordinate system.

In various embodiments, the carriage 16 is also configured to support a tool movement motor 158, which may be located on an opposite side of the rail 18 with respect to the printing device 12 and/or the cutting device 14. The tool movement motor 158 may be coupled in electronic control communication with the CPU 3000 via the flexible control cable 154, and thus may be selectively actuated to effectuate movement of the tools (i.e., the printing device 12 and/or the cutting device 14) in the direction of arrows Z, Z' of the three dimensional X-Y-Z Cartesian coordinate system (i.e., toward and/or away from the workpiece W). In some configurations, the first lower sub-cavity 146*c* does not house a component, and, therefore, may be alternatively referred to as a lower void cavity. The tool movement motor 158 is connected to the printing device 12 and/or the cutting device 14 via, for example, gears 159 and the like.

The plurality of sub-cavities 146*a*-146*d* provide several benefits. Firstly, because the rail 18 includes the plurality of sub-cavities 146*a*-146*d*, the rail 18 is not solid, and, as a result, reduces the weight of the crafting apparatus 10. Secondly, because the first upper sub-cavity 146*a* and the second lower cavity 146*d* respectively house the flexible control cable 154 and the carriage movement belt 156, the rail 18 provides an aesthetically-pleasing design that generally obfuscates or hides the flexible control cable 154 and the carriage movement belt 156 from sight of the user. Furthermore, by arranging the flexible control cable 154 and the carriage movement belt 156 within the respective first upper sub-cavity 146*a* and the second lower cavity 146*d*, the flexible control cable 154 and the carriage movement belt 156 are protected from the surrounding environment, and, as such, may prevent damage to the flexible control cable 154 and the carriage movement belt 156 during use of the crafting apparatus 10.

Referring to FIGS. 26-29, a wheel system 160 of the carriage 16 is shown. The wheel system 160 at least partially secures the carriage 16 to the rail 18 and allows carriage 16 to roll laterally back-and-forth according to the direction of the arrows X, X' of the three dimensional X-Y-Z Cartesian coordinate system along the rail 18. Some of the housing and connection components between one or more wheels 162 and the carriage 16 have been removed from FIGS. 26-29 for illustrative purposes.

Figure 27:
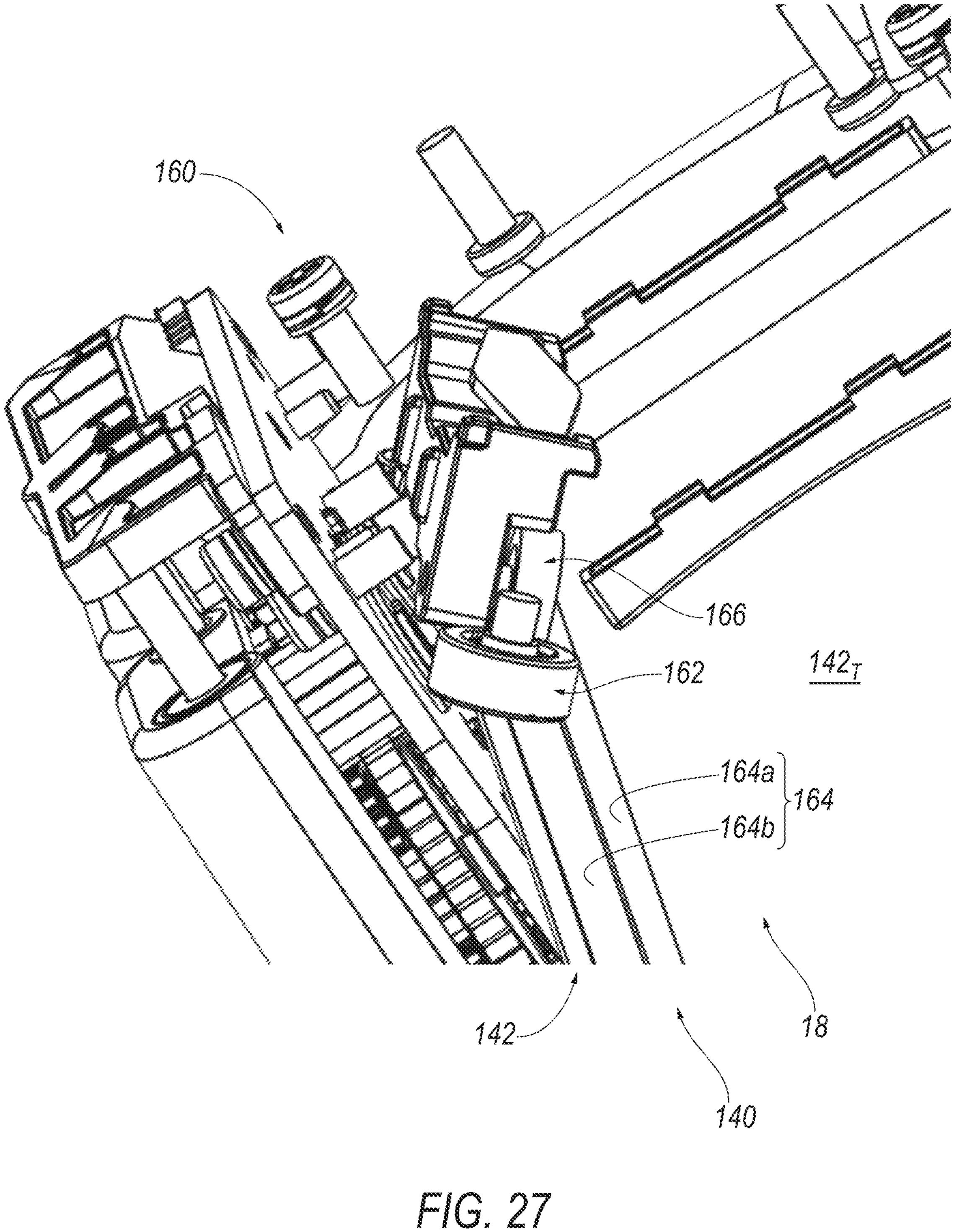
FIG. 27 is an enlarged view of a wheel assembly of the carriage engaged to the rail of the crafting apparatus of FIG. 26.
Figure 28:
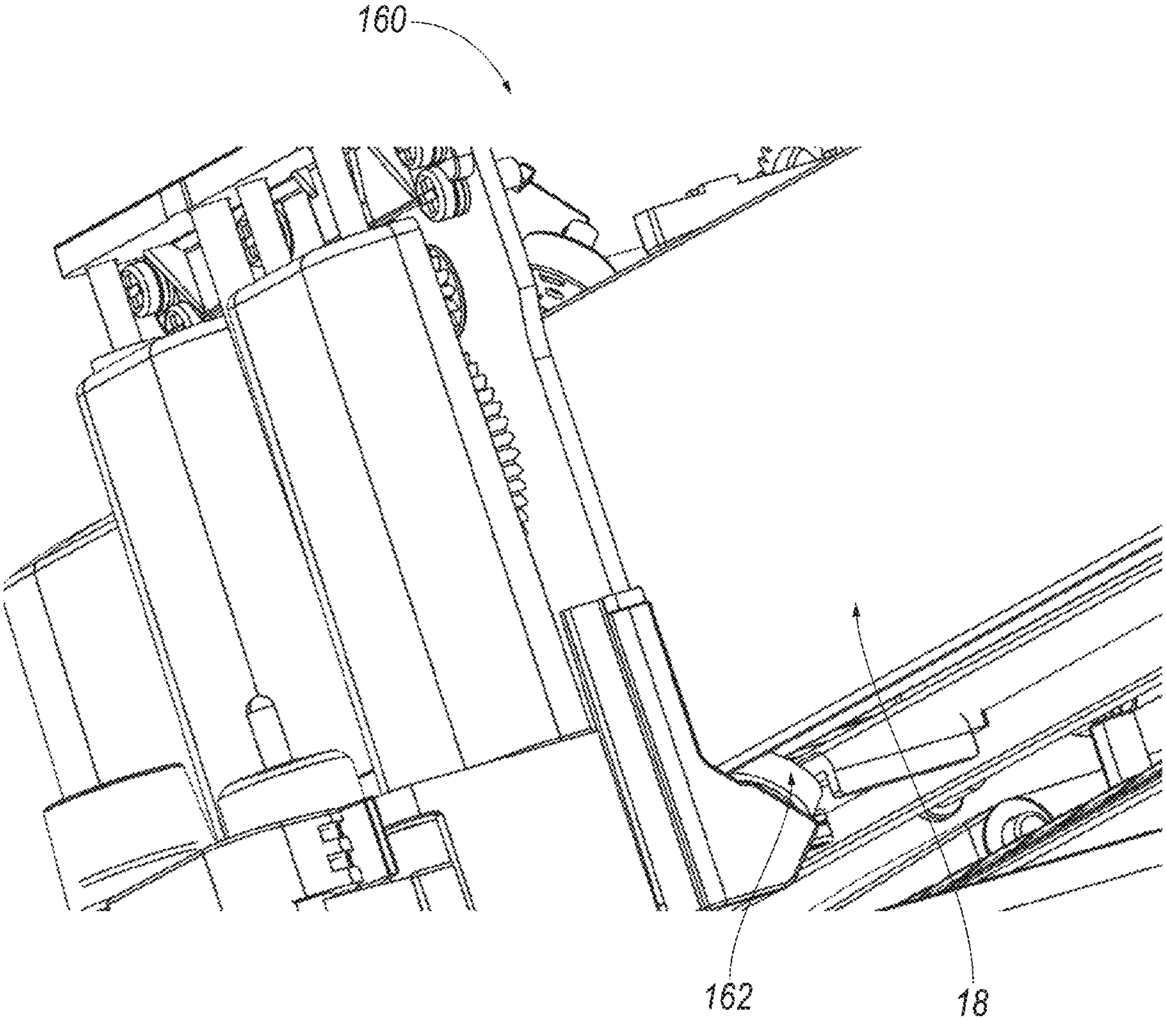
FIG. 28 is a lower view of the wheel assembly of the carriage engaged to the rail of the crafting apparatus of FIG. 26.
Figure 29:
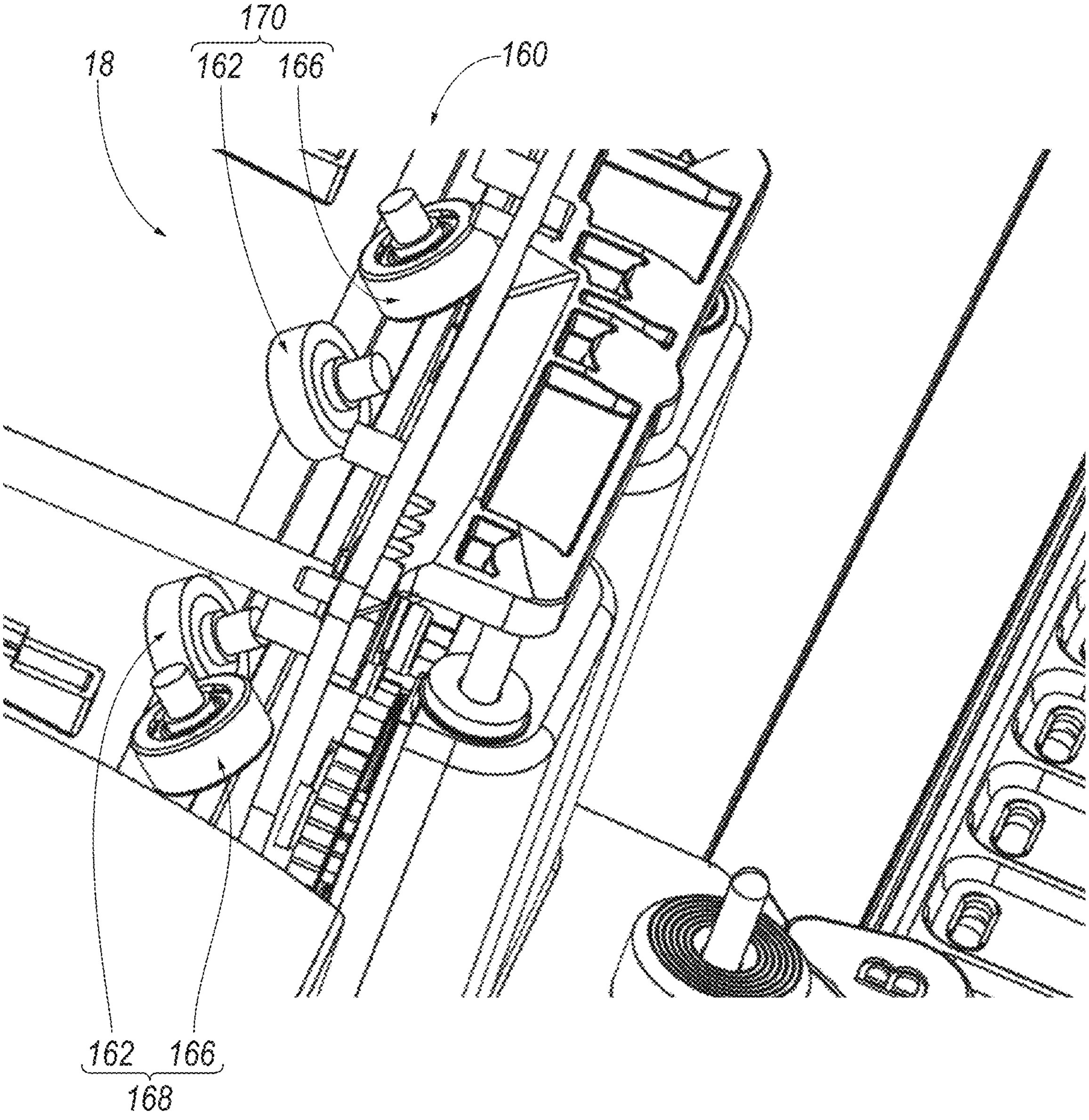
FIG. 29 is another view of the wheel assembly of the carriage engaged to the rail of the crafting apparatus of FIG. 26.

In some configurations as seen at, for example, FIG. 29, the wheel system 160 includes multiple wheels 162. With reference to FIGS. 26 and 27, at least one wheel 162 of the one or more wheels 162 of the wheel system 160 may be configured for arrangement within and ride against a groove 164 that is formed by and extends along the outer surface 142 of the elongated body member 140 of the rail 18.

As seen at FIG. 27, the groove 164 may include a first surface portion 164*a* and a second surface portion 164*b*. In some examples, the outer surface 142 of the elongated body member 140 of the rail 18 that forms the groove 164 may be a top edge or a top surface $\mathbf{142}_T$ of the outer surface 142 of the elongated body member 140 of the rail 18.

With continued reference to FIG. 27, the one or more wheels 162 may ride against the first surface portion 164*a* of the groove 164. As also seen at FIG. 27, another wheel 166 of the wheel system 160, which may be orthogonally-arranged with respect to the wheel 162, may ride against the second surface 164*b* of the groove 164.

With reference to FIG. 29, the wheel system 160 of the carriage 16 may include a first pair of wheels is shown generally at 168, and a second pair of wheels is shown generally at 170. Each of the first pair of wheels 168 and the second pair of wheels 170 may include first and second wheels 162, 166, which are orthogonally-arranged with respect to one another, arranged against the groove 164 as described above against, respectively, the first surface portion 164*a* and the second surface portion 164*b* of the groove 164.

Although not shown at FIGS. 26-29, in some configurations, the one or more wheels 162, 166, which are orthogonally-arranged with respect to one another, may also be configured to ride in a correspondingly-formed groove on a lower edge of the rail 18 in a similar fashion as shown at FIG. 27. FIG. 29 shows a total of four wheels defined by the first pair of wheels 168 and the second pair of wheels 170 in an upper groove 164 of the rail 18 (with connection components removed from the assembly of the carriage 16 in order to illustrate the location of the wheels 162, 166 relative the rail 18). The variety of surfaces and angles between wheels 162, 166 and the rail 18 provide a sturdy, consistent contact between the carriage 16 and the rail 18.

Referring to FIGS. 1-2, 6, 13A-13C, 15, and 23-24, the crafting apparatus 10 may include a plurality of control buttons 172-176 communicatively coupled to the CPU 3000. In some implementations, the plurality of control buttons 172-176 may be supported by the second rail support member 34*b*.

The plurality of control buttons 172-176 may include a first control button 172, a second control button 174, and a third control button 176. The first control button 172 may include an "up and down arrow" indicia. The second control button 174 may include a "triangular play arrow" indicia. The third control button 176 may include a "pause symbol" indicia.

In some instances, if a user wishes to manually advance a loaded workpiece W in either feed direction according to arrows Y, Y' of the three dimensional X-Y-Z Cartesian coordinate system, the user may depress the first control button 172. In some examples, if, after a user loads a workpiece W onto the crafting apparatus 10, and a user wishes to initiate the process of conducting "work" on the workpiece W, the user may depress the second control button 174. In other examples, if, during the course of the crafting apparatus 10 conducting "work" on the workpiece W, if the user wishes to pause the "work", the user may depress the third control button 176.

Furthermore, with reference to FIG. 1, the crafting apparatus 10 may include a blade guide channel 178. In some configurations, the blade guide channel 178 may be formed by at least a portion of the front surface 38 of the working portion 22 that is near the edge of the downstream portion $\mathbf{34}_D$ of the working surface 34. In some examples, the crafting apparatus 10 may include a blade 180 that is configured to be interfaced with the blade guide channel 178. The user can use the blade 180 for swiping (according to the direction of the arrows X, X' of the three dimensional X-Y-Z Cartesian coordinate system) across the blade guide channel 178 (with the workpiece W arranged over the blade guide channel 178) in order to sever excess or remaining workpiece material W after "work" conducted on the workpiece W by the crafting apparatus 10 is completed. In some embodiments, the cutting device 14 may include a severing blade that may function by providing an automatic cutoff of the workpiece W upon, for example, the push of, for example, the button 174 or another user-initiated step provided by a user input to the CPU 3000. In other embodiments, the blade 180 may be removable and/or reconfigurable. In other implementations, the cutting device 14 may form a cut groove into the workpiece W that will provide a user with a visual guide for locating the blade 180 adjacent the workpiece W for severing the workpiece W.

In some implementations, when "work" on the workpiece W (that is sourced from the roll of workpiece material $W_R$) is finished, a user may depress the first control button 172 in order to advance the workpiece W in a direction according to the feed direction arrow Y of the three dimensional X-Y-Z Cartesian coordinate system. Once the user has sufficiently advanced the "worked upon" workpiece W in the direction according to the feed direction arrow Y of the three dimensional X-Y-Z Cartesian coordinate system, the user may release the first control button 172 in order to cease movement of the "worked upon" workpiece W. Thereafter, the user may interface the blade 180 with the blade guide channel 178 and move the blade 180 according to the according to the direction of the arrows X, X' of the three dimensional X-Y-Z Cartesian coordinate system. As the user moves the blade 180 within the blade guide channel 178, the blade 180 also comes into contact with the workpiece W for severing the "worked upon" workpiece W from a "non-worked-upon" portion of the workpiece W extending from the roll of workpiece material $W_R$. Although the blade 180 is shown at FIG. 1 as a separate member with respect to the crafting apparatus 10, in other configurations, the blade 180 may be slidably-joined to the crafting apparatus 10 near or proximate the blade guide channel 178. In various embodiments, the crafting apparatus 10 includes an automated cutting tool that may be inserted into one of the tool clamps (e.g., the tool clamp configured for holding the printing device 12). In such embodiments, the CPU 3000 may be configured to perform an automated severing of the workpiece W to separate worked upon workpiece W from the non-worked upon portion of the workpiece.

FIGS. 14A-14D provide a flowchart of an exemplary arrangement of operations for a method 200 of utilizing the crafting apparatus 10 when the crafting apparatus 10 is selectively configured for conducting "work" upon a first type of workpiece source (e.g., a roll of workpiece material $W_R$). FIGS. 25A-25E, a method for utilizing the crafting apparatus 10 when the crafting apparatus 10 is selectively configured for conducting "work" upon a second type of workpiece source (e.g., a workpiece W having a substantially flat, preconfigured shape $W_L$, $W_W$ that may or may not be supported by a support mat $W_M$ whereby, in some instances, the workpiece W may be defined as a relatively "large" workpiece W) is shown generally at 300. The methods 200, 300 depicted in the relevant figures are schematic flow chart diagrams, and list multiple steps. The steps may not necessarily be executed in the order in which they are presented, unless specified otherwise herein. Further, the labeled steps are included to disclose all potential and possible steps of the methods, and thus in various embodiments, certain steps may be omitted, reordered, performed substantially simultaneously, or may otherwise be different than what is depicted. Said differently, not all of the depicted steps may be implemented, and thus the methods 200, 300 may include less than all of the steps depicted.

Figure 14A:
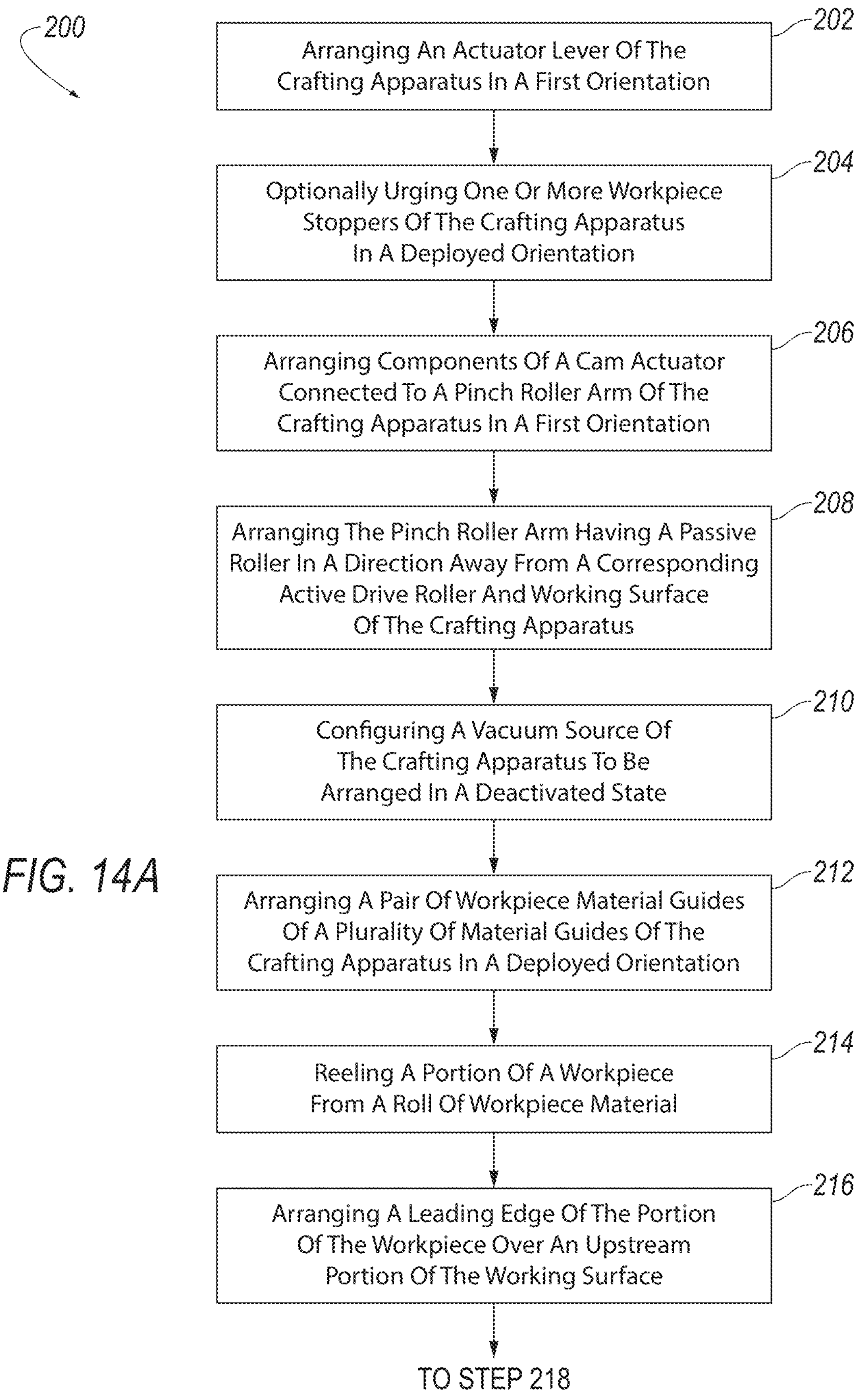
FIGS. 14A-14D is a flowchart illustrating an exemplary arrangement of operations for a method of operating the crafting apparatus of FIGS. 1-13C, 15-24, and 26-30 when conducting work on a workpiece derived from the roll of workpiece material arranged upon the roll holder of FIG. 5.

Referring to FIG. 14A, the method 200 includes arranging 202 the actuator lever 52 in an "up orientation" (as seen at FIGS. 3-4, 6, 13A-13B) whereby the handle portion 54 of the actuator lever 52 generally extends in the Z direction of the three dimensional X-Y-Z Cartesian coordinate system. As a result of the arrangement of the actuator lever 52 in an "up orientation", the rod portion 56 causes the stopper linkage structure 90 to optionally urge 204 the one or more workpiece stoppers 86 in a deployed orientation in the Z direction of the three dimensional X-Y-Z Cartesian coordinate system such that the top surfaces 86*a* of the one or more workpiece stoppers 86 are arranged at the distance $D_{86}$ away from the working surface 34, thereby exposing the body portions 88 of the one or more workpiece stoppers 86. As described above, in various alternative embodiments the deployment of the workpiece stoppers 86 are not automatically actuated in response to movement of the actuator lever 52, but instead said movement of the actuator lever 52 merely "unlocks" a support arm deployment button 126, thereby making it depressible, and it is the depression of the button that triggers deployment of the one or more workpiece stoppers 86.

Furthermore, as a result of the arrangement of the actuator lever 52 in the "up orientation", the rod portion 56 causes arrangement 206 of the components of the cam actuator 48 in a first orientation whereby, as seen at FIG. 7: (1) the bottom end $66_B$ of the cam member 66 engages the top surface $46_T$ of the first end 46*a* of the pinch roller arm 46; and (2) the top end $66_T$ of the cam member 66 is configured to engage the pivot bracket 70 for causing the pivot bracket 70 to pivot about the pin 72 to a "down orientation", thereby removing tension from the one or more coil spring members 74 connected to the second end 70*b* of the pivot bracket 70 and the pin 76 extending across the width $W_{46}$ of the first end 46*a* pinch roller arm 46. When rotation of the rod portion 56 arranges 206 the components of the cam actuator 48 as described above and as seen as FIG. 7, the second end 46*b* of the pinch roller arm 46 is arranged 208 in a direction according to arrow Z away from the active drive roller 60 and the intermediate portion $34_I$ of the working surface 34.

Further, the method 200 may optionally include, as a result of the arrangement of the actuator lever 52 in the "up orientation", the vacuum source 95 being configured 210 in a deactivated state whereby the vacuum source 95 does not draw air into the opening 98 of each workpiece suction channel 96. Yet even further, the user may arrange 212 a pair of workpiece material guides 92*a*, 92*b*, 92*c* of the plurality of workpiece material guides 92 in a deployed orientation.

Figure 14B:
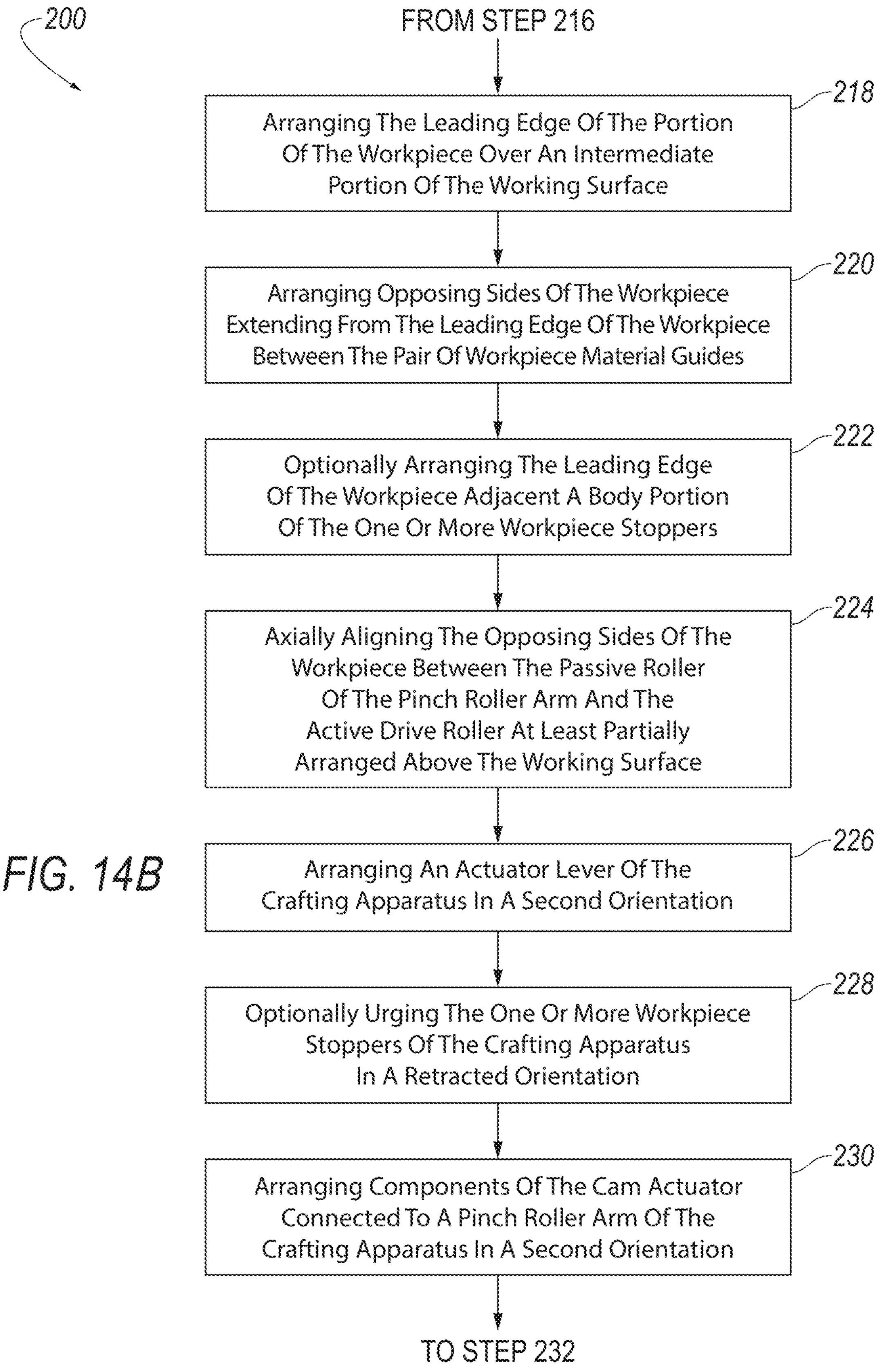
Figure 14C:
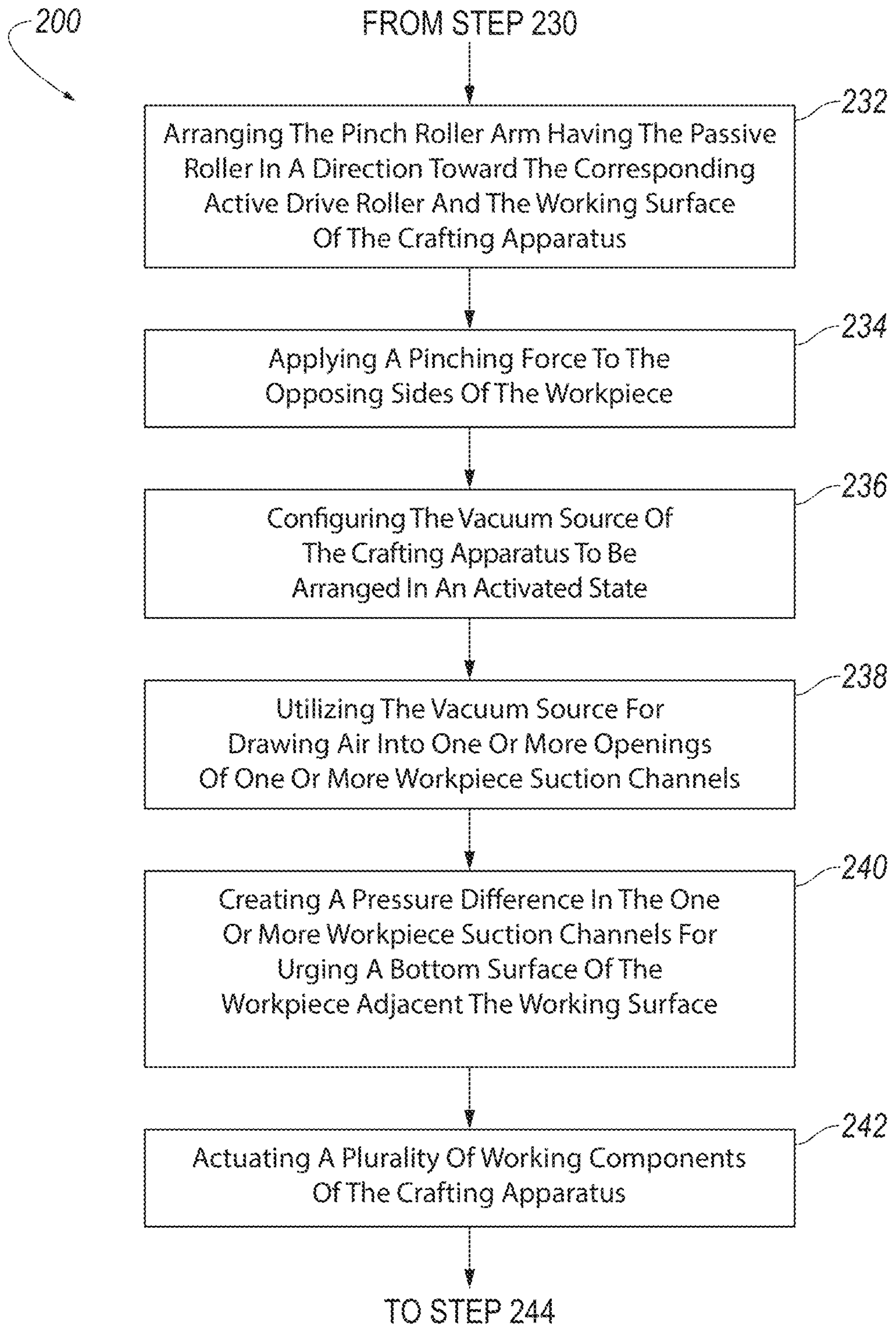
Figure 14D:
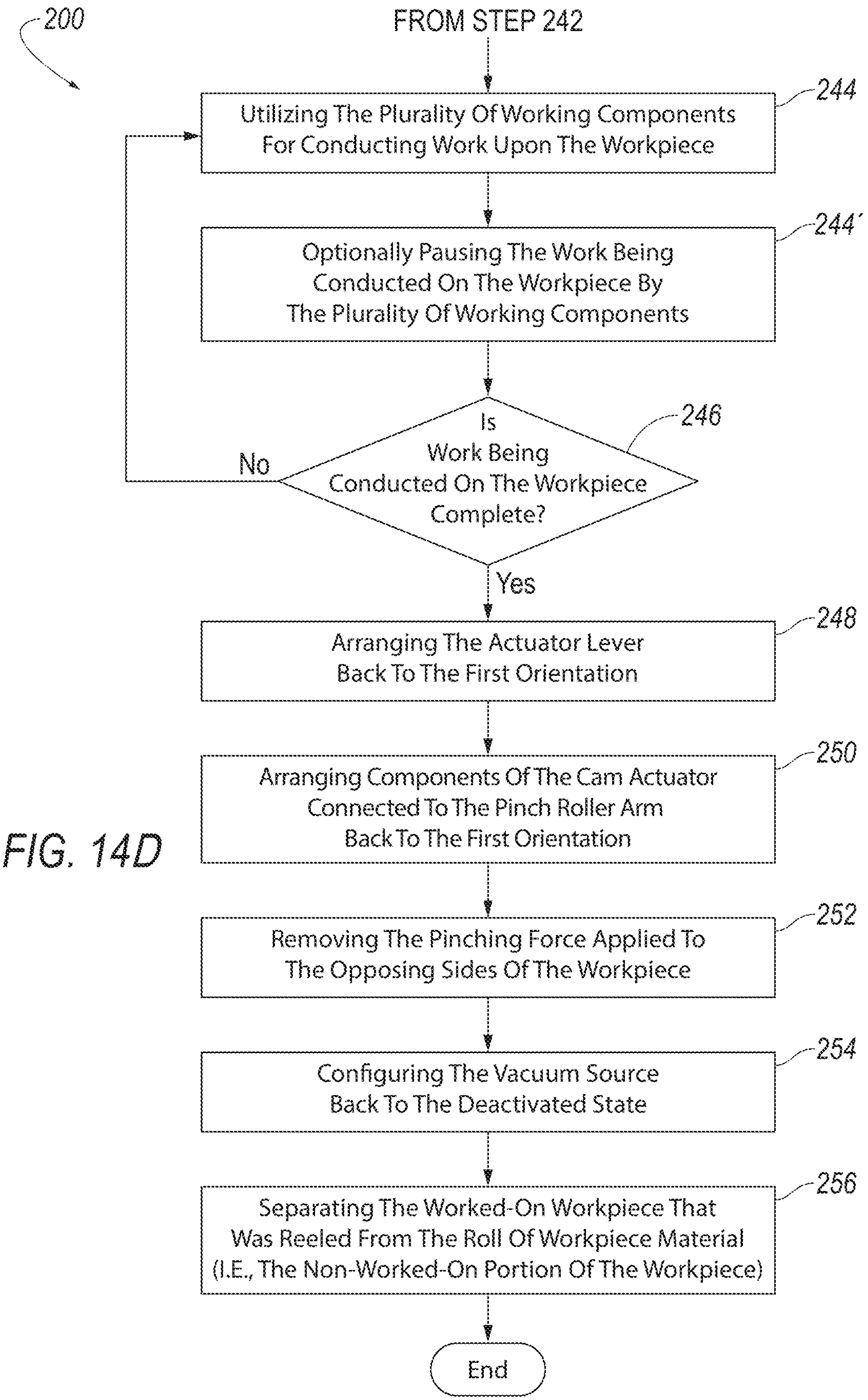

After arranging one or more of the workpiece management components as described above at steps 202-212, the user may then reel 214 a portion of the workpiece W from the roll of workpiece material $W_R$ and then arrange 216 a leading edge of the portion of the workpiece W over the upstream portion $34_U$ of the working surface 34. Thereafter, FIG. 14B of the flowchart depicts the user continuing to reel 214 the portion of the workpiece W from the roll of workpiece material $W_R$ and arranging 218 the leading edge of the portion of the workpiece W over the intermediate portion $34_I$ of the working surface 34. Thereafter, the flowchart in FIG. 14B depicts the user arranging 220 opposing sides extending away from the leading edge of the portion of the workpiece W generally between the pair of workpiece material guides 92*a*, 92*b*, 92*c* of the plurality of workpiece material guides 92 that arranged in the deployed orientation for guiding the leading edge of the portion of the workpiece W in the Y, Y' feed directions of the three dimensional X-Y-Z Cartesian coordinate system.

If the one or more workpiece stoppers 86 have been optionally urged 204 by the stopper linkage structure 90 to the deployed orientation, the user may optionally arrange 222 the leading edge of the portion of the workpiece W adjacent the body portions 88 of the one or more workpiece stoppers 86. The optional arrangement 222 of the leading edge of the portion of the workpiece W adjacent the body portions 88 of the one or more workpiece stoppers 86 arises from the roll of workpiece material $W_R$ (that is stowed opposite the rear surface 28 of the base portion 20 of the crafting apparatus 10) retaining, in a similar fashion to an anchor, the reeled 214 portion of the workpiece W adjacent the working surface 34 such that the reeled 214 portion of the workpiece W is prevented from sliding off of the working surface 34 as a result of gravity G.

Once the leading edge of the portion of the workpiece W is arranged 218 over the intermediate portion $34_I$ of the working surface 34, the user may then axially align 224 opposing sides extending away from the leading edge of the portion of the workpiece W with: (1) passive rollers 58 rotatably-connected to the second end 46*b* of a pair of pinch-roller arms 46; and (2a) a pair of corresponding active drive rollers 60 arranged in respective openings 62 formed in the intermediate portion $\mathbf{34}_I$ of the working surface 34 or (2b) a corresponding active drive roller 60 arranged in a first opening 62 formed in the intermediate portion $\mathbf{34}_I$ of the working surface 34 and a corresponding intermediate drive roller 84 arranged in a second opening 62 formed in the intermediate portion $\mathbf{34}_I$ of the working surface 34, which may result from sliding one pinch roller arm 46 of the pair of pinch-roller arms 46 upon the rail 18. In various embodiments, the proper positioning of the pinch-roller arms 46 along the rail 18 may be detected by a position sensor (e.g., an optical sensor) or other such device that is located on or supported by, for example one or both of the rail 18 and the working surface 34. In some configurations, the position sensor may be coupled in communication with the CPU 3000. The CPU 3000 may be configured to ensure the pinch-roller arms 46 are properly positioned, as determined based on the position sensor and relative to user-inputted data at a user interface pertaining to the dimensions of the workpiece W. That is, the CPU may prevent operation of the crafting apparatus 10 (e.g., activation, initialization, and/or actuation of "work" on the workpiece W) unless the CPU 3000 determines the pinch-roller arms 46 are properly positioned based on user input received by the CPU 3000 pertaining to a size/dimension of the workpiece W. The crafting apparatus 10 may further include one or more position sensors for the plurality of material guides 92, and "operation" of the crafting apparatus 10 may be similarly conditioned to ensure the proper material guides are deployed for the size of workpiece W.

In various embodiments, "operation" of the crafting apparatus 10 may be conditioned on other detected parameters. For example, the crafting apparatus 10 may include a position sensor (e.g., an optical sensor) coupled to the CPU 3000 configured to detect whether the one or more support arms $\mathbf{100}_D$, $\mathbf{100}_U$ are in the deployed orientation or the stowed orientation. The CPU 3000 may be configured to ensure the one or more support arms $\mathbf{100}_D$, $\mathbf{100}_U$ are properly positioned (deployed or stowed), as determined by the CPU 3000 based on the sensed position information from the position sensor and relative to user-inputted data pertaining to the size and/or type of workpiece W. That is, the CPU 3000 may prevent "operation" of the crafting apparatus 10 (e.g., activation, initialization, and/or actuation of "work" on the workpiece) unless the CPU 3000 determines the one or more support arms $\mathbf{100}_D$, $\mathbf{100}_U$ are properly positioned based on user input received by the CPU 3000 pertaining to a size and/or type of workpiece W. For example, if the one or more support arms $\mathbf{100}_D$, $\mathbf{100}_U$ are in the deployed orientation but the user has indicated to the CPU 3000 that the workpiece W is a length from the roll of workpiece material $W_R$, the CPU 3000 may prevent "operation" of the crafting apparatus until the one or more support arms $\mathbf{100}_D$, $\mathbf{100}_U$ have been stowed. Similarly, if the one or more support arms $\mathbf{100}_D$, $\mathbf{100}_U$ are in the stowed orientation but the user has indicated to the CPU 3000 that the workpiece W is a relatively "large" workpiece W having substantially flat, preconfigured shape (having, e.g., a length $W_L$ and a width $W_W$) that may or may not be supported by a support mat $W_M$), the CPU 3000 may prevent "operation" of the crafting apparatus until the one or more support arms $\mathbf{100}_D$, $\mathbf{100}_U$ have been deployed.

Thereafter, the user arranges 226 the actuator lever 52 in a "down orientation" (as seen at FIGS. 1-2, 5, and 13C) whereby the handle portion 54 of the actuator lever 52 generally extends in the Y direction of the three dimensional X-Y-Z Cartesian coordinate system. As a result of the arrangement of the actuator lever 52 in a "down orientation", the rod portion 56 causes the stopper linkage structure 90 to optionally urge 228 the one or more workpiece stoppers 86 in a retracted orientation in the Z' direction of the three dimensional X-Y-Z Cartesian coordinate system such that the top surfaces 86*a* of the one or more workpiece stoppers 86 are arranged in alignment with the intermediate portion $\mathbf{34}_I$ of the working surface 34 and is no longer arranged at the distance $D_{86}$ away from the working surface 34, thereby arranging the body portions 88 of the one or more workpiece stoppers 86 below the working surface 34.

The method 200 may include the rod portion 56 causing arrangement 230 of the components of the cam actuator 48 in a second orientation whereby, as seen at FIG. 8: (1) the bottom end $\mathbf{66}_B$ of the cam member 66 does not engage the top surface $\mathbf{46}_T$ of the first end 46*a* of the pinch roller arm 46; and (2) the top end $\mathbf{66}_T$ of the cam member 66 is configured to engage the pivot bracket 70 for causing the pivot bracket 70 to pivot about the pin 72 to an "up orientation", thereby applying tension to the one or more coil spring members 74 connected to the second end 70*b* of the pivot bracket 70 and the pin 76 extending across the width $W_{46}$ of the first end 46*a* pinch roller arm 46. When rotation of the rod portion 56 arranges 230 the components of the cam actuator 48 as described above and as seen as FIG. 8, FIG. 14C of the flowchart depicts arranging 232 the second end 46*b* of the pinch roller arm 46 in a direction according to arrow Z' toward the active drive roller 60 and the intermediate portion $\mathbf{34}_I$ of the working surface 34 (or the intermediate active drive roller 84 and the intermediate portion $\mathbf{34}_I$ of the working surface 34) for applying 234 a pinching force to opposing sides extending away from the leading edge of the portion of the workpiece W.

Furthermore, the method 200 may optionally include, as a result of the arrangement of the actuator lever 52 in the "down orientation", the vacuum source 95 being configured 236 in an activated state whereby the vacuum source 95 draws air into the opening 98 of each workpiece suction channel 96. The velocity of the air relative to the flow of the air, or lack thereof, at the top surface $W_T$ (see, e.g., FIGS. 7-8) above the workpiece W creates 240 a pressure difference that urges the bottom surface $W_B$ of the workpiece W down and onto at least the downstream portion $\mathbf{34}_D$ of the working surface 34 and the upstream portion $\mathbf{34}_U$ of the working surface 34 that includes the plurality of workpiece suction channels 94.

Further, the user may actuate 242 the plurality of working components 12, 14, 16, 18 of the crafting apparatus 10 that conduct "work" upon the workpiece W. In some implementations, the actuation 242 step may be conducted in response to the user pressing the button 174 (that may include the "triangular play arrow" indicia) on the crafting apparatus 10. In other implementations, the actuation 242 step may be conducted in response to the user selecting a "start conducting work" option from a user interface of the CPU 3000 (e.g., from a screen of the laptop 3000*a*, smart phone, or tablet 3000*b*). After actuation 242, FIG. 14D of the flowchart depicts the method 200 conducting 244 "work" upon the workpiece W using the plurality of working components 12, 14, 16, 18 of the crafting apparatus 10.

Thereafter, the CPU 3000 may monitor 246 if the "work" conducted 244 on the workpiece W is complete. If the "work" conducted 244 on the workpiece W is not complete, the monitoring step 246 returns to step 244. At any time during the conducting "work" step 244, the user may optionally pause 244' the conducting "work" step 244 by, for example, pressing the button 176 (that may include the "pause symbol" indicia) on the crafting apparatus 10. In other implementations, the optional pausing 244' step may be conducted in response to the user selecting a "pause conducting work" option from the user interface of the CPU 3000 (e.g., from a screen of the laptop 3000*a*, smart phone, or tablet 3000*b*).

Once the monitoring step 246 determines that the conducted "work" 244 on the workpiece W is complete, the user may arrange 248 the actuator lever 52 back to the "up orientation" whereby the handle portion 54 of the actuator lever 52 generally extends in the Z direction of the three dimensional X-Y-Z Cartesian coordinate system. Arrangement 248 of the actuator lever 52 back to the "up orientation" causes rotation of the rod portion 56 that results in arrangement 250 of the components of the cam actuator 48 back to the first orientation for removing 252 the pinching force from the workpiece W. In various embodiments, the method 200 may include the vacuum source 95 to be configured 254 being back to the deactivated state whereby the vacuum source 95 does not draw air into the opening 98 of each workpiece suction channel 96.

Thereafter, the user may separate 256 the "worked-on" workpiece W from the "non-worked-on" workpiece W from the roll of workpiece material $W_R$. Separation 256 of the "worked-on" workpiece W from the "non-worked-on" workpiece W from the roll of workpiece material $W_R$ may arise from the user utilizing the blade 180 by sliding the blade 180 across the workpiece W and driving the blade 180 into the blade guide channel 178. In other implementations, the separation 256 of the "worked-on" workpiece W from the "non-worked-on" workpiece W defined by the roll of workpiece material $W_R$ may arise from the user selecting a "separate workpiece" option from the user interface of the CPU 3000 (e.g., from a screen of the laptop 3000*a*, smart phone, or tablet 3000*b*), or by the CPU 3000 recognizing the presence of an automated separation tool, whereby the automated separate tool/blade may cut the workpiece W. In other examples, the separation 256 step may occur automatically once the monitoring step 246 determines that the conducted "work" 244 on the workpiece W is complete; thereafter, the user may arrange 248 the actuator lever 52 back to the "up orientation" in order to for remove 252 the pinching force, configure 254 the vacuum source 95 back to the deactivated state, and the like.

FIGS. 25A-25E include a flowchart of an example arrangement of operations for a method 300 that includes arranging 302 the actuator lever 52 in an "up orientation" (as seen at FIGS. 15, 17, and 23) whereby the handle portion 54 of the actuator lever 52 generally extends in the Z direction of the three dimensional X-Y-Z Cartesian coordinate system. As a result of the arrangement of the actuator lever 52 in an "up orientation", the rod portion 56 may optionally cause the stopper linkage structure 90 to urge 304 the one or more workpiece stoppers 86 in a deployed orientation in the Z direction of the three dimensional X-Y-Z Cartesian coordinate system such that the top surfaces 86*a* of the one or more workpiece stoppers 86 are arranged at the distance $D_{86}$ away from the working surface 34, thereby exposing the body portions 88 of the one or more workpiece stoppers 86. As described above in various alternative embodiments, the deployment of the workpiece stoppers 86 is not automatically actuated in response to movement of the actuator lever 52, but instead the movement of the actuator lever 52 merely "unlocks" a support arm deployment button 126 thereby making it depressible. In other words, it may be the depression of the support arm deployment button 126 that triggers deployment of the one or more workpiece stoppers 86. Thus, step 304 may include depressing the support arm deployment button 126 performed after step 302.

Furthermore, as a result of the arrangement of the actuator lever 52 in the "up orientation", the rod portion 56 causes arrangement 306 of the components of the cam actuator 48 in a first orientation whereby, as seen at FIG. 7: (1) the bottom end $66_B$ of the cam member 66 engages the top surface $46_T$ of the first end 46*a* of the pinch roller arm 46; and (2) the top end $66_T$ of the cam member 66 is configured to engage the pivot bracket 70 for causing the pivot bracket 70 to pivot about the pin 72 to a "down orientation", thereby removing tension from the one or more coil spring members 74 connected to the second end 70*b* of the pivot bracket 70 and the pin 76 extending across the width $W_{46}$ of the first end 46*a* pinch roller arm 46. When rotation of the rod portion 56 arranges 306 the components of the cam actuator 48 as described above and as seen as FIG. 7, the second end 46*b* of the pinch roller arm 46 is arranged 308 in a direction according to arrow Z away from the active drive roller 60 and the intermediate portion $34_I$ of the working surface 34.

Further, the method 300 may optionally include, as a result of the arrangement of the actuator lever 52 in the "up orientation", the vacuum source 95 being configured 310 in a deactivated state whereby the vacuum source 95 does not draw air into the opening 98 of each workpiece suction channel 96. Yet even further, the user may arrange 312 a pair of workpiece material guides 92*a*, 92*b*, 92*c* of the plurality of workpiece material guides 92 in a deployed orientation.

After arranging the one or more workpiece management components as described above at steps 302-312, the user may then obtain 314 a workpiece W that is not sourced from a roll of workpiece material $W_R$ but, rather, includes a substantially flat, preconfigured shape $W_L$, $W_W$ that may or may not be supported by a support mat $W_M$, whereby, in some instances, the workpiece W may be defined as a relatively "large" workpiece W. Thereafter, the user arranges 316 a leading edge of the portion of the workpiece W over the upstream portion $34_U$ of the working surface 34. Thereafter, FIG. 25B of the flowchart depicts the method 300 arranging 318 the leading edge of the portion of the workpiece W over the intermediate portion $34_I$ of the working surface 34. Thereafter, the method 300 may include the user arranging 320 opposing sides extending away from the leading edge of the portion of the workpiece W between the pair of workpiece material guides 92*a*, 92*b*, 92*c* of the plurality of workpiece material guides 92 that arranged in the deployed orientation for guiding the leading edge of the portion of the workpiece W in the Y, Y' feed directions of the three dimensional X-Y-Z Cartesian coordinate system.

If the one or more workpiece stoppers 86 have been urged 304 by the stopper linkage structure 90 to the deployed orientation, the user may arrange 322 the leading edge of the portion of the workpiece W adjacent the body portions 88 of the one or more workpiece stoppers 86. The arrangement 322 of the leading edge of the portion of the workpiece W adjacent the body portions 88 of the one or more workpiece stoppers 86 prevents the workpiece W from sliding off of the working surface 34 as a result of gravity G.

Once the leading edge of the portion of the workpiece W is arranged 318 over the intermediate portion $34_I$ of the working surface 34 and the leading edge of the portion of the workpiece W is arranged 322 adjacent the body portions 88 of the one or more workpiece stoppers 86, opposing sides extending away from the leading edge of the portion of the workpiece W is axially aligned 324 with: (1) passive rollers 58 rotatably-connected to the second end 46*b* of a pair of pinch-roller arms 46; and (2a) a pair of corresponding active drive rollers 60 arranged in respective openings 62 formed in the intermediate portion $\mathbf{34}_I$ of the working surface 34 or (2b) a corresponding active drive roller 60 arranged in a first opening 62 formed in the intermediate portion $\mathbf{34}_I$ of the working surface 34 and a corresponding intermediate drive roller 84 arranged in a second opening 62 formed in the intermediate portion $\mathbf{34}_I$ of the working surface 34, which may result from sliding one pinch roller arm 46 of the pair of pinch-roller arms 46 upon the rail 18.

Next, the user may arrange 326 one or both of the downstream support arm $\mathbf{100}_D$ and the upstream support arm $\mathbf{100}_U$ in a deployed orientation. Thereafter, the user arranges 328 the actuator lever 52 in a "down orientation" (as seen at FIGS. 23-24) whereby the handle portion 54 of the actuator lever 52 generally extends in the Y direction of the three dimensional X-Y-Z Cartesian coordinate system. As a result of the arrangement of the actuator lever 52 in a "down orientation", the rod portion 56 causes the stopper linkage structure 90 to urge 330 the one or more workpiece stoppers 86 in a retracted orientation in the Z' direction of the three dimensional X-Y-Z Cartesian coordinate system such that the top surfaces 86*a* of the one or more workpiece stoppers 86 are arranged in alignment with the intermediate portion $\mathbf{34}_I$ of the working surface 34 and is no longer arranged at the distance $D_{86}$ away from the working surface 34, thereby arranging the body portions 88 of the one or more workpiece stoppers 86 below the working surface 34.

Figure 25A:
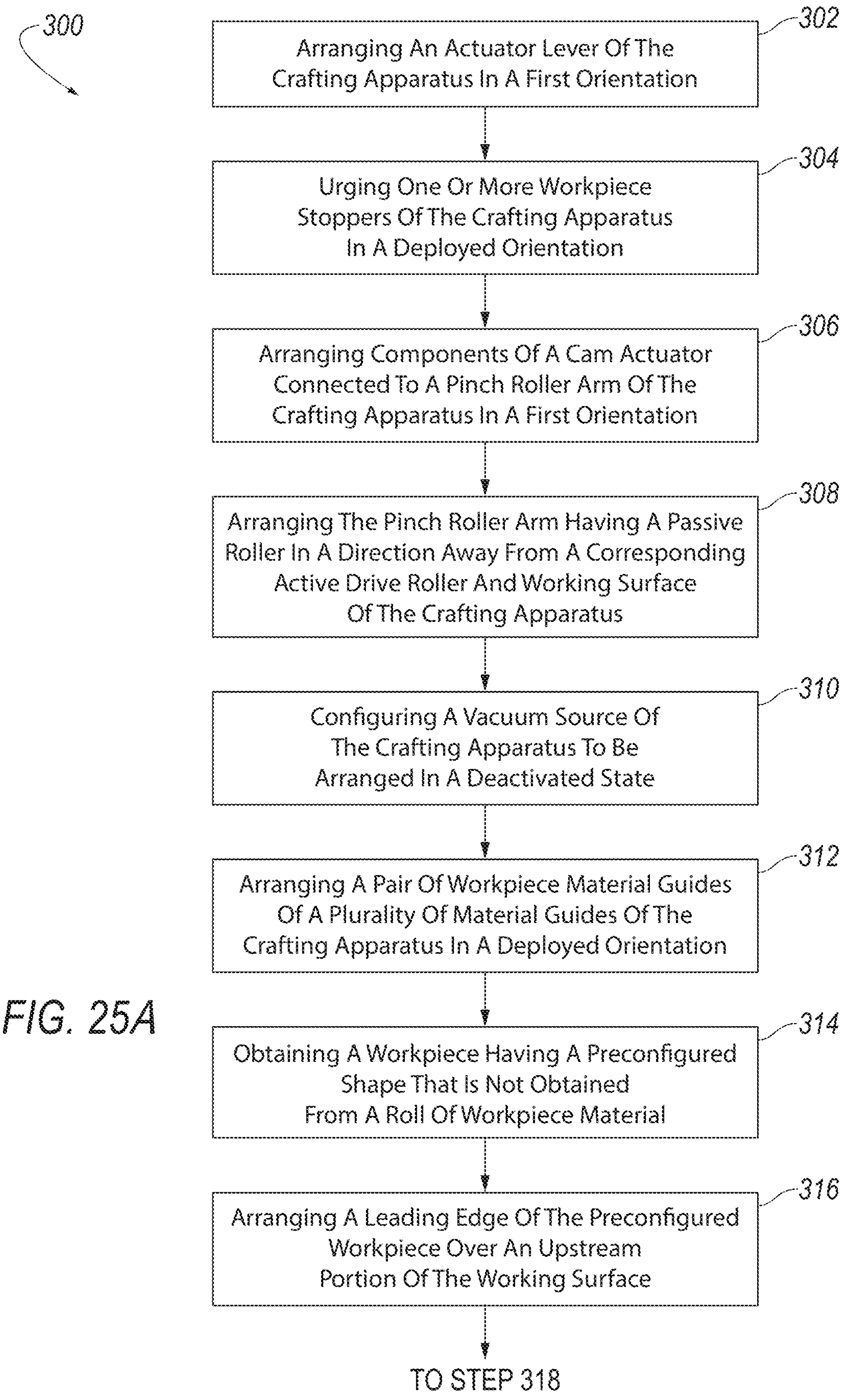
FIGS. 25A-25E is a flowchart illustrating an exemplary arrangement of operations for a method of operating the crafting apparatus of FIGS. 1-13C, 15-24, and 26-30 when conducting work on the preconfigured workpiece of FIG. 24 (that is not derived from the roll of workpiece material arranged upon the roll holder of FIG. 5).
Figure 25B:
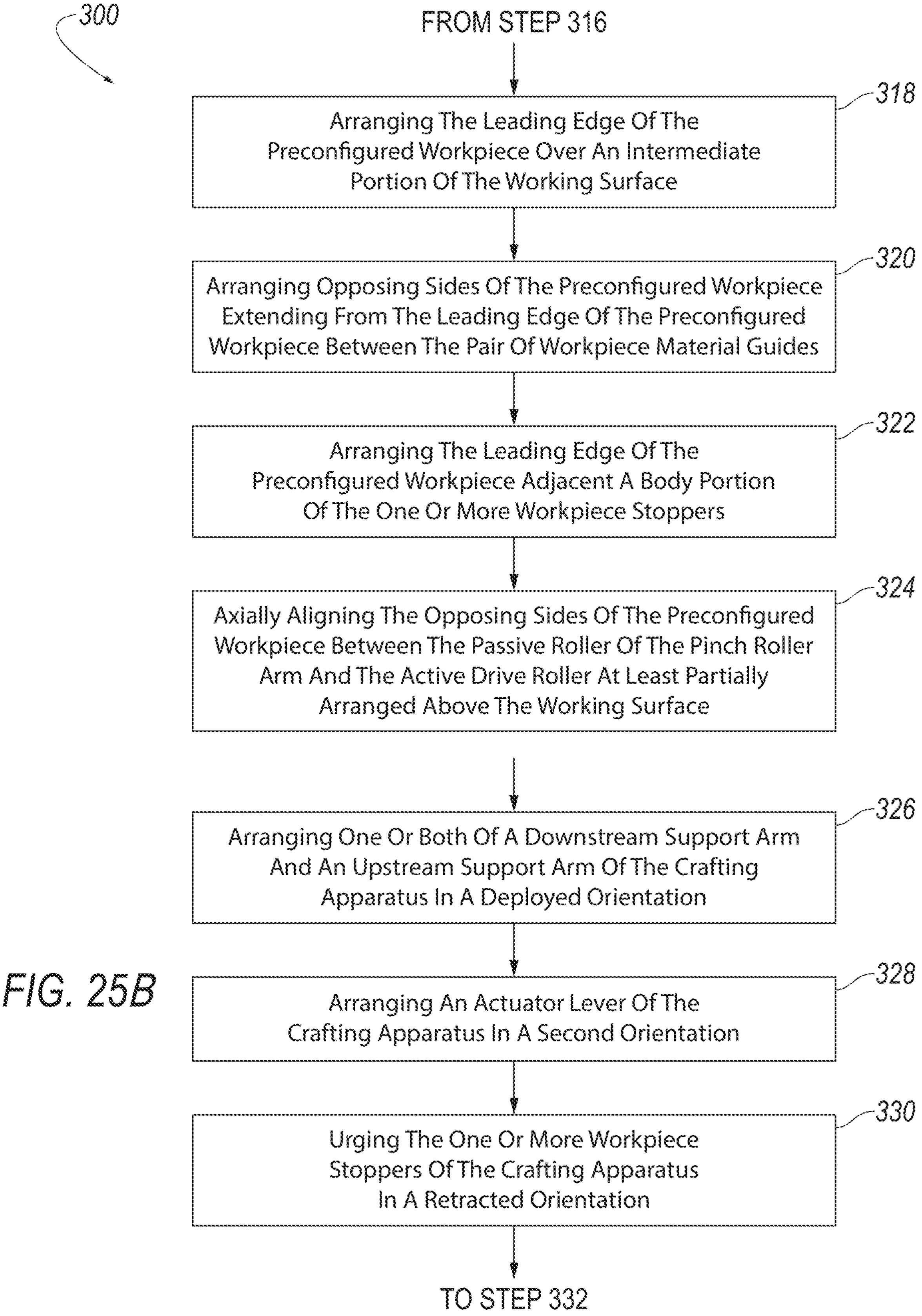
Figure 25C:
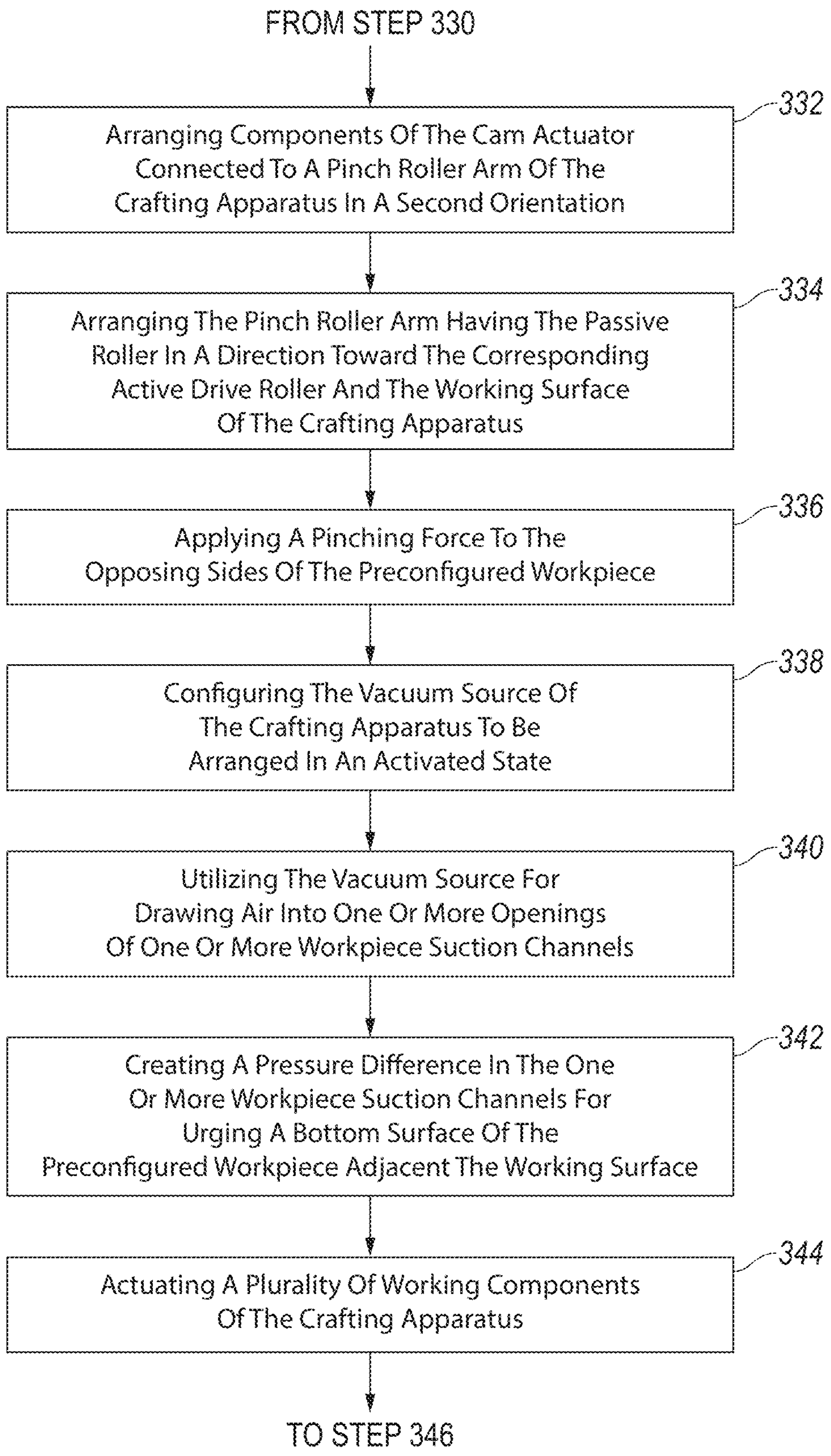
Figure 25D:
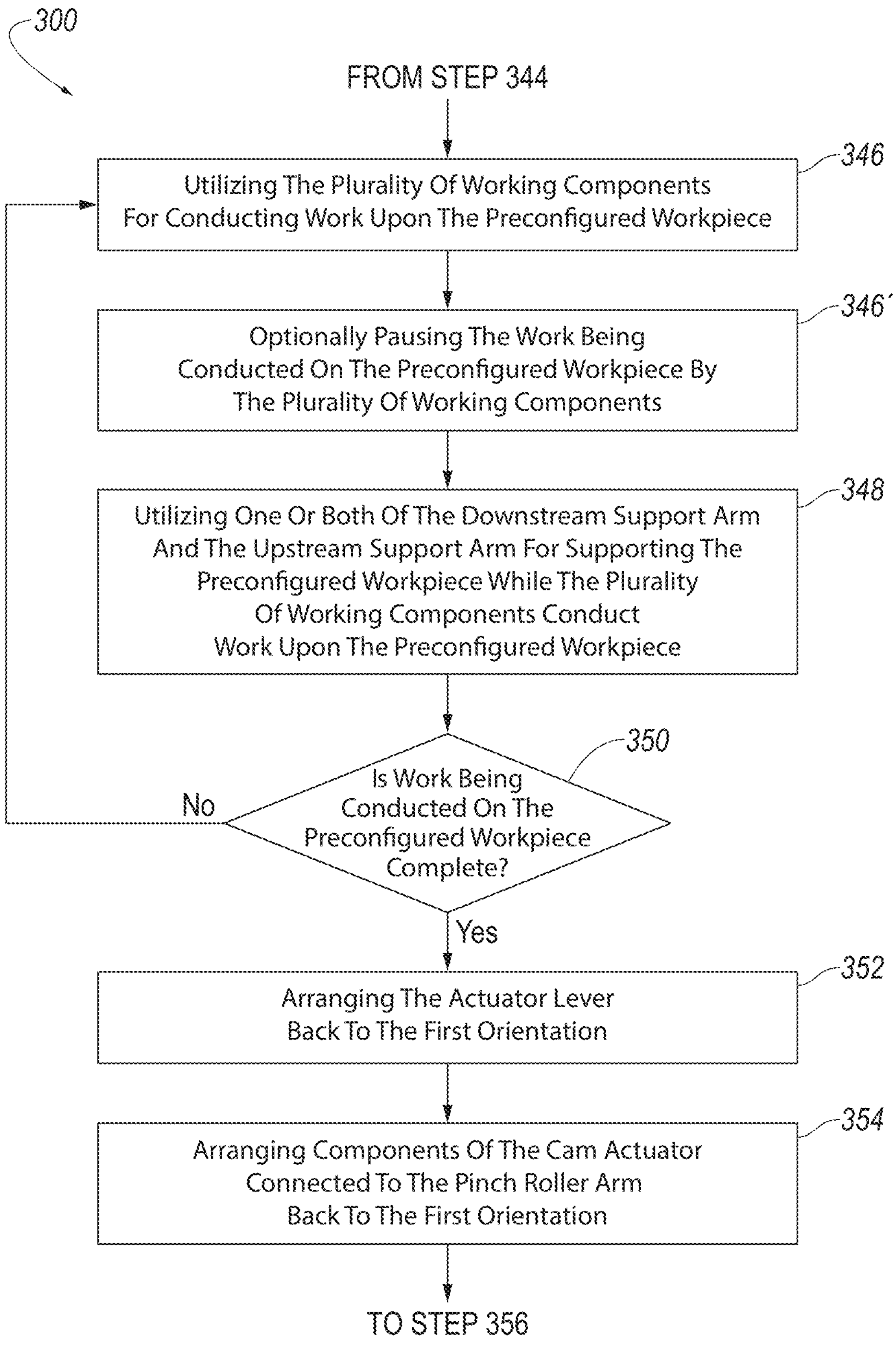
Figure 25E:
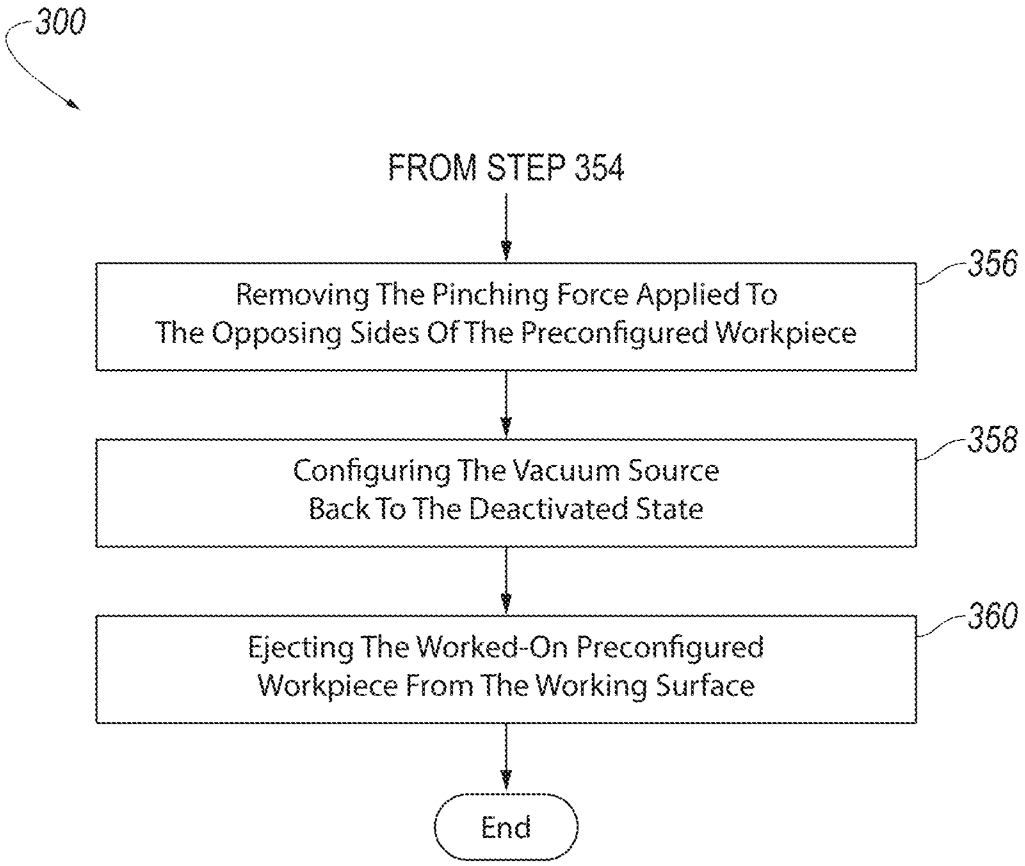

Furthermore, as a result of the arrangement of the actuator lever 52 in the "down orientation", FIG. 25C of the flowchart includes the method 300 causing, by the rod portion 56 (just prior to or simultaneously with the urging step 330), arranging 332 of the components of the cam actuator 48 in a second orientation whereby, as seen at FIG. 8: (1) the bottom end $\mathbf{66}_B$ of the cam member 66 does not engage the top surface $\mathbf{46}_T$ of the first end 46*a* of the pinch roller arm 46; and (2) the top end $\mathbf{66}_T$ of the cam member 66 is configured to engage the pivot bracket 70 for causing the pivot bracket 70 to pivot about the pin 72 to an "up orientation", thereby applying tension to the one or more coil spring members 74 connected to the second end 70*b* of the pivot bracket 70 and the pin 76 extending across the width $W_{46}$ of the first end 46*a* pinch roller arm 46. When rotation of the rod portion 56 arranges 330 the components of the cam actuator 48 as described above and as seen as FIG. 8, the second end 46*b* of the pinch roller arm 46 is arranged 334 in a direction according to arrow Z' toward the active drive roller 60 and the intermediate portion $\mathbf{34}_I$ of the working surface 34 (or the intermediate active drive roller 84 and the intermediate portion $\mathbf{34}_I$ of the working surface 34) for applying 336 a pinching force to opposing sides extending away from the leading edge of the portion of the workpiece W.

Further, as a result of the arrangement 328 of the actuator lever 52 in the "down orientation", the vacuum source 95 may be configured 338 (just prior to or simultaneously with the urging step 330) in an activated state whereby the vacuum source 95 draw air 340 into the opening 98 of each workpiece suction channel 96. The velocity of the air relative to the flow of the air, or lack thereof, at the top surface $W_T$ (see, e.g., FIGS. 7-8) above the workpiece W creates 342 a pressure difference that urges the bottom surface $W_B$ of the workpiece W down and onto at least the downstream portion $\mathbf{34}_D$ of the working surface 34 and the upstream portion $\mathbf{34}_U$ of the working surface 34 that includes the plurality of workpiece suction channels 94.

The steps of arranging 332 the components of the cam actuator 48 in a second orientation and optionally configuring 338 the vacuum source 95 to be in an activated state are conducted just prior to or simultaneously with the urging step 330 in order to retain the bottom surface $W_B$ of the workpiece W down and onto at least one or both of the downstream portion $\mathbf{34}_D$ of the working surface 34 and the upstream portion $\mathbf{34}_U$ of the working surface 34 as a result of the urging 330 of the one or more workpiece stoppers 86 in the retracted orientation. Initially, the one or more workpiece stoppers 86 prevent the workpiece W from sliding off of the angled $\theta_{22}$ working surface 34 as a result of a gravitational pull G on the workpiece W. Accordingly, just prior to or simultaneously with retraction of the one or more workpiece stoppers 86 below the working surface 34, the pinching force to the workpiece W is applied 336 and/or the vacuum source 95 creates 342 the pressure difference within each workpiece suction channel 96 that retains the bottom surface $W_B$ of the workpiece W down and onto at least one or both of the downstream portion $\mathbf{34}_D$ of the working surface 34 and the upstream portion $\mathbf{34}_U$ of the working surface 34.

Thereafter, the user may actuate 344 the plurality of working components 12, 14, 16, 18 of the crafting apparatus 10 that conduct "work" upon the workpiece W. In some implementations, the actuation 344 step may be conducted in response to the user pressing the button 174 (that may include the "triangular play arrow" indicia) on the crafting apparatus 10. In other implementations, the actuation 344 step may be conducted in response to the user selecting a "start conducting work" option from a user interface of the CPU 3000 (e.g., from a screen of the laptop 3000*a*, smart phone, or tablet 3000*b*). After actuation 344, FIG. 25D of the flowchart depicts the method 300 conducting 346 "work" upon the workpiece W using the plurality of working components 12, 14, 16, 18 of the crafting apparatus 10. Furthermore, when "work" is conducted on the workpiece W, movement of the workpiece W in the Y, Y' feed directions of the three dimensional X-Y-Z Cartesian coordinate system may result in the one or both of the downstream support arm $\mathbf{100}_D$ and the upstream support arm $\mathbf{100}_U$ (that is/are arranged 326 in the deployed orientation) supporting 348 the bottom surface $W_B$ of the workpiece W.

Thereafter, the CPU 3000 may monitor 350 if the "work" conducted 346 on the workpiece W is complete. If the "work" conducted 346 on the workpiece W is not complete, the monitoring step 350 returns to step 346. At any time during the conducting "work" step 346, the user may optionally pause 346' the conducting "work" step 346 by, for example, pressing the button 176 (that may include the "pause symbol" indicia) on the crafting apparatus 10. In other implementations, the optional pausing 346' step may be conducted in response to the user selecting a "pause conducting work" option from the user interface of the CPU 3000 (e.g., from a screen of the laptop 3000*a*, smart phone, or tablet 3000*b*).

Once the monitoring step 350 determines that the conducted "work" 346 on the workpiece W is complete, the user may arrange 352 the actuator lever 52 back to the "up orientation" whereby the handle portion 54 of the actuator lever 52 generally extends in the Z direction of the three dimensional X-Y-Z Cartesian coordinate system. Arrangement 352 of the actuator lever 52 back to the "up orientation" causes rotation of the rod portion 56 that results in arrangement 354 of the components of the cam actuator 48 back to the first orientation for removing 356 (FIG. 25E) the pinching force from the workpiece W. In various embodiments, the method 300 may include the vacuum source 95 being configured 358 back to the deactivated state whereby the vacuum source 95 does not draw air into the opening 98 of each workpiece suction channel 96.

Thereafter, the "worked-on" workpiece W may slide off of or be ejected 360 from the working surface 34. The step of separating (see, e.g., step 256 at method 200) the "worked-on" workpiece W is obviated because the workpiece W is preconfigured and not derived from the roll of workpiece material $W_R$ (i.e., a "non-worked-on" workpiece W that would otherwise retain the "worked-on" workpiece W over the working surface 34 until the "worked-on" workpiece W is separated from the "non-worked-on" workpiece W).

Figure 30:
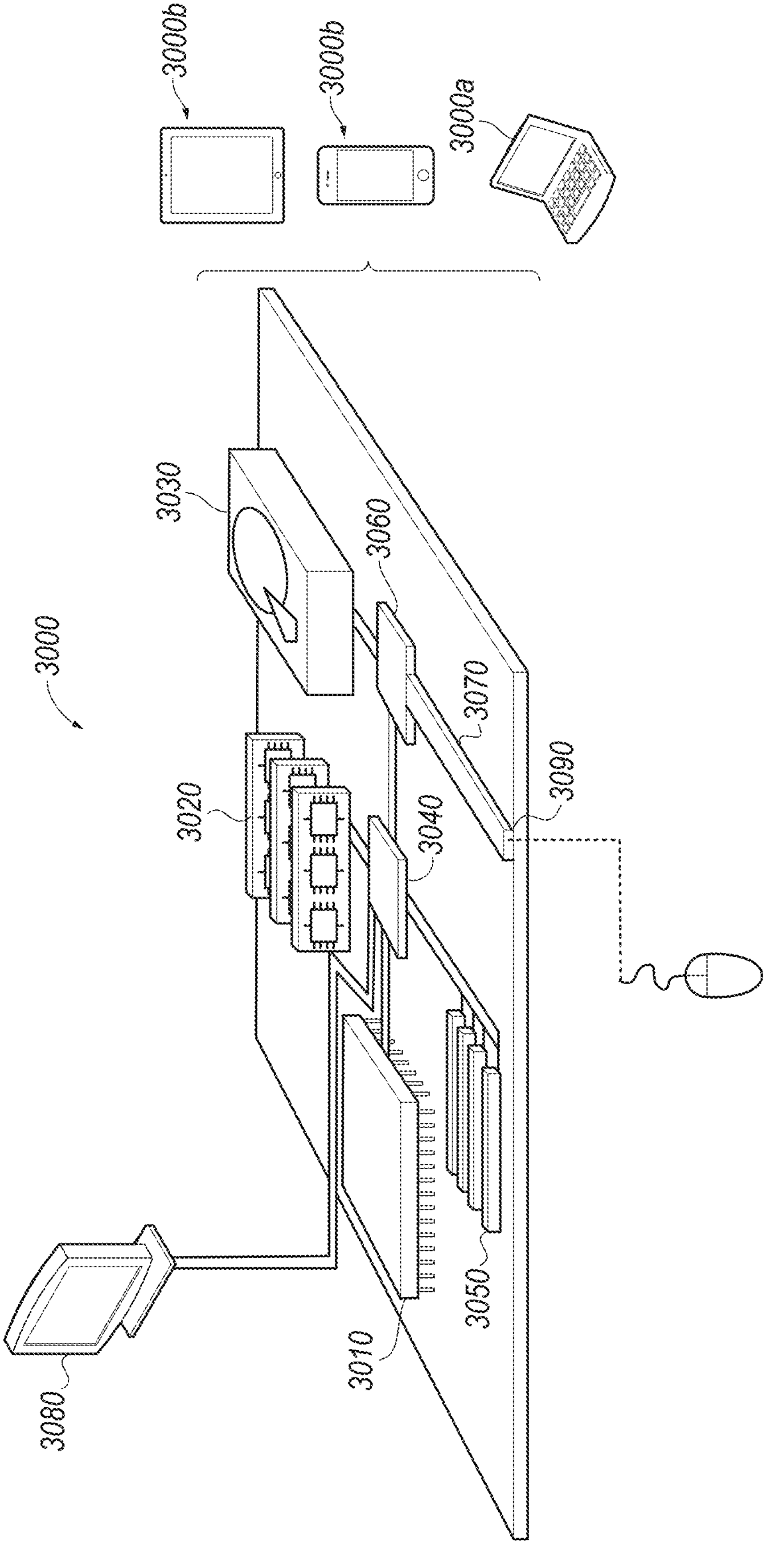
FIG. 30 is a schematic view of an example computing device that may be used to implement the systems and methods described herein.

FIG. 30 is schematic view of an example computing device 3000 that may be used to implement the systems and methods described in this document. The components 3010, 3020, 3030, 3040, 3050, and 3060 shown at FIG. 30, their connections and relationships, and their functions, are meant to be exemplary only, and are not meant to limit the present disclosure.

The computing device 3000 includes a processor 3010, memory 3020, a storage device 3030, a high-speed interface/controller 3040 connecting to the memory 3020 and high-speed expansion ports 3050, and a low speed interface/controller 3060 connecting to a low speed bus 3070 and a storage device 3030. Each of the components 3010, 3020, 3030, 3040, 3050, and 3060, are interconnected using various busses, and may be mounted on a common motherboard or in other manners as appropriate. The processor 3010 can process instructions for execution within the computing device 3000, including instructions stored in the memory 3020 or on the storage device 3030 to display graphical information for a graphical user interface (GUI) on an external input/output device, such as display 3080 coupled to high speed interface 3040. In other implementations, multiple processors and/or multiple buses may be used, as appropriate, along with multiple memories and types of memory. Also, multiple computing devices 3000 may be connected, with each device providing portions of the necessary operations (e.g., as a server bank, a group of blade servers, or a multi-processor system).

The memory 3020 stores information non-transitorily within the computing device 3000. The memory 3020 may be a computer-readable medium, a volatile memory unit(s), or non-volatile memory unit(s). The non-transitory memory 3020 may be physical devices used to store programs (e.g., sequences of instructions) or data (e.g., program state information) on a temporary or permanent basis for use by the computing device 3000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 3030 is capable of providing mass storage for the computing device 3000. In some implementations, the storage device 3030 is a computer-readable medium. In various different implementations, the storage device 3030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 3020, the storage device 3030, or memory on processor 3010.

The high speed controller 3040 manages bandwidth-intensive operations for the computing device 3000, while the low speed controller 3060 manages lower bandwidth-intensive operations. Such allocation of duties is exemplary only. In some implementations, the high-speed controller 3040 is coupled to the memory 3020, the display 3080 (e.g., through a graphics processor or accelerator), and to the high-speed expansion ports 3050, which may accept various expansion cards (not shown). In some implementations, the low-speed controller 3060 is coupled to the storage device 3030 and a low-speed expansion port 3090. The low-speed expansion port 3090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 3000 may be implemented in a number of different forms, as shown in the figure. For example, it may be implemented in one or a combination of the crafting apparatus 10 and a laptop computer 3000*a*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented, unless otherwise specified. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus, comprising:

a working portion having a lower surface and an upper surface, the upper surface supports a workpiece and defines a first three dimensional Cartesian coordinate system, wherein the working portion conducts work on a portion of a length of a workpiece in a Z-direction of the first three dimensional Cartesian coordinate system; and a base portion having a lower surface, an upper surface, and a rear surface extending away from a first end of the lower surface of the base portion, wherein the lower surface defines a second three dimensional Cartesian coordinate system, wherein the lower surface of the working portion is disposed adjacent to the upper surface of the base portion, wherein the upper surface of the working portion extends relative to the lower surface of the base portion at an angle for angularly-offsetting the first three dimensional Cartesian coordinate system from the second three dimensional Cartesian coordinate system, wherein the upper surface of the working portion is defined by:

an upstream portion configured to initially interface with the portion of the length of the workpiece reeled from a roll of workpiece material before the working portion conducts work on the portion of the length of the workpiece, the roll of workpiece material stowed opposite the rear surface of the base portion; and a downstream portion configured to eject the portion of the length of the workpiece from the upper surface of the working portion after the working portion conducts the work on the portion of the length of the workpiece, wherein the portion of the length of the workpiece reeled from the roll of the workpiece material is advanced along the upper surface of the working portion in a Y-direction of the first three dimensional Cartesian coordinate system from the upstream portion of the upper surface toward the downstream portion of the upper surface after the working portion conducts the work on the portion of the length of the workpiece.

2. The apparatus of claim 1, wherein the working portion includes:

a rail;

a carriage movably-disposed upon the rail in a X-direction of the first three dimensional Cartesian coordinate system; and one or both of a printing device and a cutting device removably-secured to the carriage for conducting the work on the portion of the length of the workpiece in the Z-direction of the first three dimensional Cartesian coordinate system.

3. The apparatus of claim 1, further comprising:

a pair of pinch-roller mechanisms; and an intermediate drive roller for imparting movement to the portion of the length of the workpiece in the Y-direction of the first three dimensional Cartesian coordinate system.

4. The apparatus of claim 1, wherein the angle is between 0° and 90°.

5. The apparatus of claim 4, wherein the angle is approximately 45°.

6. The apparatus of claim 1, further comprising a roll holder structure extending from the rear surface of the base portion, wherein the roll of workpiece material is stowed upon the roll holder structure.

7. The apparatus of claim 1, wherein:

the Y-direction of the first three dimensional Cartesian coordinate system comprises a forward Y-direction; and the portion of the length of the workpiece moves in the forward Y-direction or in a backward Y'-direction of the first three dimensional Cartesian coordinate system when the working portion conducts the work on the portion of the length of the workpiece in the Z-direction of the first three dimensional Cartesian coordinate system.

* * * * *